US007693765B2

(12) United States Patent
Dell Orfano

(10) Patent No.: US 7,693,765 B2
(45) Date of Patent: Apr. 6, 2010

(54) SYSTEM AND METHOD FOR CREATING ELECTRONIC REAL ESTATE REGISTRATION

(76) Inventor: Michael Dell Orfano, 151 Mack Hill Rd., Amherst, NH (US) 03031-2407

( * ) Notice: Subject to any disclaimer, the term of this patent is extended or adjusted under 35 U.S.C. 154(b) by 702 days.

(21) Appl. No.: 11/291,358

(22) Filed: Nov. 30, 2005

(65) Prior Publication Data

US 2006/0116952 A1      Jun. 1, 2006

Related U.S. Application Data

(60) Provisional application No. 60/632,473, filed on Nov. 30, 2004.

(51) Int. Cl.
*G06Q 40/00* (2006.01)
(52) U.S. Cl. .............................. 705/35; 705/39; 705/51; 701/208; 702/14; 707/200
(58) Field of Classification Search ................... 705/35, 705/39, 51; 701/208; 702/14; 707/200
See application file for complete search history.

(56) References Cited

U.S. PATENT DOCUMENTS

| 4,742,457 A | 5/1988 | Leon et al. ..................... 705/35 |
| 4,870,576 A | 9/1989 | Tornetta ......................... 705/1 |
| 4,876,648 A | 10/1989 | Lloyd ........................... 705/38 |
| 5,032,989 A | 7/1991 | Tornetta ......................... 705/1 |
| 5,126,936 A | 6/1992 | Champion ................ 705/36 R |
| 5,361,201 A | 11/1994 | Jost et al. ...................... 705/35 |
| 5,414,621 A | 5/1995 | Hough ......................... 705/10 |
| 5,500,793 A | 3/1996 | Deming, Jr. et al. ........... 705/37 |
| 5,584,025 A | 12/1996 | Keithley et al. .......... 707/104.1 |
| 5,636,117 A | 6/1997 | Rothstein ........................ 705/4 |
| 5,644,726 A | 7/1997 | Oppenheimer ............ 705/36 R |
| 5,664,115 A | 9/1997 | Fraser .......................... 705/37 |
| 5,680,305 A | 10/1997 | Apgar, IV .................... 705/10 |
| 5,704,045 A | 12/1997 | King et al. .................... 705/35 |

(Continued)

FOREIGN PATENT DOCUMENTS

AU         2002241908         7/2002

(Continued)

*Primary Examiner*—James P Trammell
*Assistant Examiner*—Sanjeev Malhotra
(74) *Attorney, Agent, or Firm*—William A. Loginov; Loginov & Associates, PLLC

(57) ABSTRACT

A system for providing a registered land asset includes a property transaction database in communication with a computer network the property transaction database provides information related to transactions associated with each registered land asset parcel, each land parcel having a registered land asset identifier representing global coordinates particular to the parcel. The system also includes a location characteristic database in communication with the computer network. The location characteristic database provides socioeconomic data regarding the location wherein the land parcel associated with the registered land asset is situated. A registered land asset contract may give a leaseholder an option to purchase the land by the end of a given term. A computer receives data from the property transaction database and the location characteristic database via the computer network and calculates prices and values associated with a registered land asset contract associated with the land parcel and a registered land asset contract is recorded in association with the land asset identifier corresponding to the land parcel in an electronic land title registry in communication with the computer network.

14 Claims, 24 Drawing Sheets

U.S. PATENT DOCUMENTS

| | | | |
|---|---|---|---|
| 5,742,775 A | 4/1998 | King | 705/38 |
| 5,754,850 A | 5/1998 | Janssen | 707/104.1 |
| 5,794,216 A | 8/1998 | Brown | 705/27 |
| 5,802,501 A | 9/1998 | Graff | 705/36 R |
| 5,870,720 A | 2/1999 | Chusid et al. | 705/38 |
| 5,911,136 A | 6/1999 | Atkins | 705/36 R |
| 5,930,775 A | 7/1999 | McCauley et al. | 705/36 R |
| 5,950,175 A | 9/1999 | Austin | 705/36 R |
| 5,966,700 A | 10/1999 | Gould et al. | 705/38 |
| 5,983,206 A | 11/1999 | Oppenheimer | 705/38 |
| 5,991,745 A | 11/1999 | Kiritz | 705/38 |
| 5,995,947 A | 11/1999 | Fraser et al. | 705/38 |
| 6,006,207 A | 12/1999 | Mumick et al. | 705/38 |
| 6,012,047 A | 1/2000 | Mazonas et al. | 705/38 |
| 6,023,687 A | 2/2000 | Weatherly et al. | 705/38 |
| 6,049,784 A | 4/2000 | Weatherly et al. | 705/38 |
| 6,058,369 A | 5/2000 | Rothstein | 705/10 |
| 6,058,377 A | 5/2000 | Traub et al. | 705/36 R |
| 6,067,533 A | 5/2000 | McCauley et al. | 705/38 |
| 6,070,151 A | 5/2000 | Frankel | 705/36 R |
| 6,115,694 A | 9/2000 | Cheetham et al. | 705/10 |
| 6,141,648 A | 10/2000 | Bonissone et al. | 705/10 |
| 6,148,293 A | 11/2000 | King | 705/35 |
| 6,167,384 A | 12/2000 | Graff | 705/35 |
| 6,178,406 B1 | 1/2001 | Cheetham et al. | 705/10 |
| 6,192,347 B1 | 2/2001 | Graff | 705/36 |
| 6,233,566 B1 | 5/2001 | Levine et al. | 705/36 R |
| 6,253,191 B1 | 6/2001 | Hoffman | 705/35 |
| 6,269,347 B1 | 7/2001 | Berger | 705/38 |
| 6,292,788 B1 | 9/2001 | Roberts et al. | 705/36 T |
| 6,321,202 B1 | 11/2001 | Raveis, Jr. | 705/1 |
| 6,321,212 B1 | 11/2001 | Lange | 705/37 |
| 6,323,885 B1 | 11/2001 | Wiese | 715/835 |
| 6,330,546 B1 * | 12/2001 | Gopinathan et al. | 705/35 |
| 6,334,107 B1 | 12/2001 | Gale et al. | 705/10 |
| 6,345,262 B1 | 2/2002 | Madden | 705/38 |
| 6,385,541 B1 | 5/2002 | Blumberg et al. | 701/213 |
| 6,397,208 B1 | 5/2002 | Lee | 707/3 |
| 6,401,070 B1 | 6/2002 | McManus et al. | 705/1 |
| 6,438,526 B1 | 8/2002 | Dykes et al. | 705/38 |
| 6,484,176 B1 | 11/2002 | Sealand et al. | 707/10 |
| 6,519,618 B1 | 2/2003 | Snyder | 707/104.1 |
| 6,564,190 B1 | 5/2003 | Dubner | 705/36 R |
| 6,594,633 B1 | 7/2003 | Broerman | 705/1 |
| 6,597,983 B2 | 7/2003 | Hancock | 701/200 |
| 6,609,109 B1 | 8/2003 | Bradley et al. | 705/35 |
| 6,609,118 B1 | 8/2003 | Khedkar et al. | 705/36 R |
| 6,615,187 B1 | 9/2003 | Ashenmil et al. | 705/36 R |
| 6,633,875 B2 | 10/2003 | Brady | 705/36 R |
| 6,636,803 B1 | 10/2003 | Hartz et al. | 701/208 |
| 6,671,677 B2 | 12/2003 | May | 705/38 |
| 6,684,196 B1 | 1/2004 | Mini et al. | 705/26 |
| 6,711,554 B1 | 3/2004 | Salzmann et al. | 705/64 |
| 6,751,596 B1 | 6/2004 | Hastings | 705/10 |
| 6,760,707 B2 | 7/2004 | Provost | 705/26 |
| 6,760,709 B2 | 7/2004 | Graff | 705/35 |
| 6,766,322 B1 | 7/2004 | Bell | 707/10 |
| 6,768,788 B1 | 7/2004 | Langseth et al. | 379/67.1 |
| 6,847,943 B2 | 1/2005 | Dubner | 705/36 R |
| 6,847,946 B2 | 1/2005 | Blanz et al. | 705/38 |
| 6,871,140 B1 | 3/2005 | Florance et al. | 701/207 |
| 6,876,955 B1 | 4/2005 | Fleming et al. | 702/194 |
| 6,883,002 B2 | 4/2005 | Faudman | 707/10 |
| 6,898,574 B1 | 5/2005 | Regan | 705/38 |
| 6,904,412 B1 | 6/2005 | Broadbent et al. | 705/38 |
| 6,904,414 B2 | 6/2005 | Madden | 705/38 |
| 6,973,432 B1 | 12/2005 | Woodard et al. | 705/1 |
| 6,983,313 B1 | 1/2006 | Korkea-Aho | 709/219 |
| 6,985,881 B2 | 1/2006 | Johnson et al. | 705/36 R |
| 6,985,886 B1 | 1/2006 | Broadbent et al. | 705/38 |
| 6,985,902 B2 | 1/2006 | Wise et al. | 707/10 |
| 7,024,397 B1 | 4/2006 | Donahue | 705/80 |
| 7,028,005 B2 | 4/2006 | Messmer et al. | 705/35 |
| 7,028,007 B1 | 4/2006 | Abrahams et al. | 705/38 |
| 7,054,741 B2 * | 5/2006 | Harrison et al. | 701/208 |
| 7,076,448 B1 | 7/2006 | Snyder | 705/26 |
| 7,076,452 B2 | 7/2006 | Florance et al. | 705/26 |
| 7,082,411 B2 | 7/2006 | Johnson et al. | 705/37 |
| 7,085,735 B1 | 8/2006 | Hall et al. | 705/26 |
| 7,089,503 B1 | 8/2006 | Bloomquist et al. | 715/780 |
| 7,107,239 B2 | 9/2006 | Graff | 705/36 R |
| 7,107,241 B1 | 9/2006 | Pinto | 705/38 |
| 7,110,970 B2 | 9/2006 | Dingman et al. | 705/36 R |
| 7,130,810 B2 | 10/2006 | Foster et al. | 705/10 |
| 7,143,048 B1 | 11/2006 | Ruben et al. | 705/1 |
| 7,146,337 B1 | 12/2006 | Ward et al. | 705/38 |
| 7,152,037 B2 | 12/2006 | Smith | 705/1 |
| 7,152,044 B2 | 12/2006 | Graff | 705/37 |
| 7,158,956 B1 | 1/2007 | Himmelstein | 705/80 |
| 7,162,445 B2 | 1/2007 | Johnson et al. | 705/35 |
| 7,171,383 B2 | 1/2007 | Johnson et al. | 705/36 R |
| 7,171,389 B2 * | 1/2007 | Harrison | 705/51 |
| 7,174,301 B2 | 2/2007 | Florance et al. | 705/1 |
| 7,203,661 B2 | 4/2007 | Graff | 705/36 R |
| 7,356,406 B2 * | 4/2008 | Harrison et al. | 701/208 |
| 7,376,516 B2 * | 5/2008 | Jones | 702/14 |
| 2001/0005829 A1 | 6/2001 | Raveis, Jr. | 705/1 |
| 2001/0034701 A1 | 10/2001 | Fox et al. | 705/38 |
| 2001/0037273 A1 | 11/2001 | Greenlee, Jr. | 705/35 |
| 2001/0039506 A1 | 11/2001 | Robbins | 705/10 |
| 2002/0004737 A1 | 1/2002 | McVeigh | 705/10 |
| 2002/0007336 A1 | 1/2002 | Robbins | 705/37 |
| 2002/0010674 A1 | 1/2002 | Kent | 705/37 |
| 2002/0013746 A1 | 1/2002 | Bibas et al. | 705/28 |
| 2002/0013750 A1 | 1/2002 | Roberts et al. | 705/35 |
| 2002/0019793 A1 | 2/2002 | Frattalone | 705/36 R |
| 2002/0035494 A1 | 3/2002 | Eckes et al. | 705/7 |
| 2002/0038223 A1 | 3/2002 | Niitsuma et al. | 705/1 |
| 2002/0040335 A1 | 4/2002 | DeVeux et al. | 705/35 |
| 2002/0046144 A1 | 4/2002 | Graff | 705/36 R |
| 2002/0046159 A1 | 4/2002 | Raveis, Jr. | 705/38 |
| 2002/0049624 A1 | 4/2002 | Raveis, Jr. | 705/8 |
| 2002/0052835 A1 | 5/2002 | Toscano | 705/38 |
| 2002/0055905 A1 | 5/2002 | Jannah et al. | 705/38 |
| 2002/0062218 A1 | 5/2002 | Pianin | 705/1 |
| 2002/0062277 A1 | 5/2002 | Foster et al. | 705/38 |
| 2002/0065739 A1 | 5/2002 | Florance et al. | 705/26 |
| 2002/0082903 A1 | 6/2002 | Yasuzawa | 705/10 |
| 2002/0087389 A1 | 7/2002 | Sklarz et al. | 705/10 |
| 2002/0091623 A1 | 7/2002 | Daniels | 705/37 |
| 2002/0099592 A1 | 7/2002 | Donahue | 705/10 |
| 2002/0099650 A1 | 7/2002 | Cole | 705/38 |
| 2002/0103669 A1 | 8/2002 | Sullivan et al. | 705/1 |
| 2002/0103744 A1 | 8/2002 | Llewelyn | 705/37 |
| 2002/0107764 A1 | 8/2002 | McCoy | 705/30 |
| 2002/0128961 A1 | 9/2002 | Dwight | 705/38 |
| 2002/0133371 A1 | 9/2002 | Cole | 705/1 |
| 2002/0133427 A1 | 9/2002 | Shu | 705/26 |
| 2002/0138419 A1 | 9/2002 | Melone et al. | 705/38 |
| 2002/0145617 A1 | 10/2002 | Kennard et al. | 345/634 |
| 2002/0169641 A1 | 11/2002 | Wallace | 705/4 |
| 2002/0174090 A1 | 11/2002 | Dexter | 707/1 |
| 2003/0023462 A1 | 1/2003 | Heilizer | 705/4 |
| 2003/0023610 A1 | 1/2003 | Bove et al. | 707/101 |
| 2003/0033176 A1 | 2/2003 | Hancock | 705/6 |
| 2003/0036922 A1 | 2/2003 | Fries | 705/1 |
| 2003/0036963 A1 | 2/2003 | Jacobson et al. | 705/26 |
| 2003/0041018 A1 | 2/2003 | DeSane | 705/38 |
| 2003/0041063 A1 | 2/2003 | Brady | 707/10 |
| 2003/0046129 A1 | 3/2003 | Brecher | 705/7 |
| 2003/0046205 A1 | 3/2003 | Brier et al. | 705/35 |
| 2003/0064705 A1 | 4/2003 | Desiderio | 455/412.1 |
| 2003/0078897 A1 | 4/2003 | Florance et al. | 705/80 |
| 2003/0101063 A1 | 5/2003 | Sexton et al. | 705/1 |

| | | | |
|---|---|---|---|
| 2003/0101074 A1 | 5/2003 | Suzuki et al. ............... 705/1 |
| 2003/0110111 A1 | 6/2003 | Nalebuff et al. ............ 705/35 |
| 2003/0110122 A1 | 6/2003 | Nalebuff et al. ............ 705/38 |
| 2003/0126052 A1 | 7/2003 | Rademaekers et al. ....... 705/35 |
| 2003/0130865 A1 | 7/2003 | Fitzgibbon et al. ............ 705/1 |
| 2003/0130928 A1 | 7/2003 | Chozick ..................... 705/37 |
| 2003/0144945 A1 | 7/2003 | Opsahl-Ong et al. ......... 705/37 |
| 2003/0149658 A1 | 8/2003 | Rossbach et al. ............ 705/38 |
| 2003/0187756 A1 | 10/2003 | Klivington et al. ........... 705/27 |
| 2003/0191723 A1 | 10/2003 | Foretich et al. ........... 705/400 |
| 2003/0200102 A1 | 10/2003 | Tao .............................. 705/1 |
| 2003/0204406 A1 | 10/2003 | Reardon et al. ................ 705/1 |
| 2003/0216985 A1 | 11/2003 | Kurimoto ..................... 705/35 |
| 2003/0220734 A1* | 11/2003 | Harrison et al. ............ 701/208 |
| 2003/0225656 A1 | 12/2003 | Aberman et al. ......... 705/36 R |
| 2003/0225665 A1 | 12/2003 | Gross et al. ............. 705/36 R |
| 2003/0229504 A1 | 12/2003 | Hollister ........................ 705/1 |
| 2003/0229592 A1 | 12/2003 | Florance et al. ............. 705/51 |
| 2003/0233324 A1 | 12/2003 | Hammour et al. ........... 705/40 |
| 2003/0236733 A1 | 12/2003 | Weeks ........................ 705/37 |
| 2004/0010451 A1 | 1/2004 | Romano et al. ............. 705/26 |
| 2004/0015389 A1 | 1/2004 | Dubner ....................... 705/10 |
| 2004/0015434 A1 | 1/2004 | McCue et al. ............... 705/38 |
| 2004/0019517 A1 | 1/2004 | Sennott ....................... 705/10 |
| 2004/0024605 A1 | 2/2004 | Morris .......................... 705/1 |
| 2004/0030616 A1 | 2/2004 | Florance et al. ............. 705/27 |
| 2004/0030631 A1 | 2/2004 | Brown et al. ................ 705/37 |
| 2004/0039581 A1 | 2/2004 | Wheeler ........................ 705/1 |
| 2004/0044696 A1* | 3/2004 | Frost ......................... 707/200 |
| 2004/0046798 A1 | 3/2004 | Alen .......................... 715/777 |
| 2004/0049440 A1 | 3/2004 | Shinoda et al. ............. 705/35 |
| 2004/0049445 A1 | 3/2004 | Kishore ....................... 705/37 |
| 2004/0049450 A1 | 3/2004 | Lussler ........................ 705/38 |
| 2004/0054605 A1 | 3/2004 | Whittet ........................ 705/27 |
| 2004/0059653 A1 | 3/2004 | Verkuylen et al. ............ 705/35 |
| 2004/0078323 A1 | 4/2004 | Johnston et al. ............. 705/38 |
| 2004/0088181 A1 | 5/2004 | Romanin et al. ............... 705/1 |
| 2004/0098269 A1 | 5/2004 | Wise et al. ..................... 705/1 |
| 2004/0117376 A1 | 6/2004 | Lavin ......................... 707/10 |
| 2004/0133493 A1 | 7/2004 | Ford et al. .................... 705/35 |
| 2004/0139049 A1* | 7/2004 | Hancock et al. ................ 707/1 |
| 2004/0143543 A1 | 7/2004 | Goldman .................... 705/38 |
| 2004/0153330 A1 | 8/2004 | Miller et al. ................... 705/1 |
| 2004/0158515 A1 | 8/2004 | Schoen ....................... 705/35 |
| 2004/0167797 A1 | 8/2004 | Goncalves ..................... 705/1 |
| 2004/0177033 A1 | 9/2004 | Weeks ........................ 705/38 |
| 2004/0205020 A1 | 10/2004 | Halawi ....................... 705/38 |
| 2004/0220820 A1 | 11/2004 | Brush et al. .................... 705/1 |
| 2004/0220823 A1 | 11/2004 | Brush et al. .................... 705/1 |
| 2004/0220885 A1 | 11/2004 | Salzmann et al. ........... 705/80 |
| 2004/0220906 A1 | 11/2004 | Gargi et al. ................... 707/3 |
| 2004/0254803 A1 | 12/2004 | Myr ............................. 705/1 |
| 2004/0260578 A1 | 12/2004 | Jin ............................... 705/4 |
| 2004/0267657 A1 | 12/2004 | Hecht ......................... 705/37 |
| 2005/0004861 A1 | 1/2005 | Bancroft ..................... 705/38 |
| 2005/0004927 A1 | 1/2005 | Singer ...................... 707/100 |
| 2005/0010423 A1 | 1/2005 | Bagbey et al. ................. 705/1 |
| 2005/0010425 A1 | 1/2005 | Mazzochi ..................... 705/1 |
| 2005/0010506 A1 | 1/2005 | Bachann .................... 705/35 |
| 2005/0015326 A1 | 1/2005 | Terry ......................... 705/37 |
| 2005/0021453 A1 | 1/2005 | Lyman ....................... 705/38 |
| 2005/0038726 A1 | 2/2005 | Salomon et al. .......... 705/36 R |
| 2005/0049953 A1 | 3/2005 | Vu ........................... 705/36 R |
| 2005/0071376 A1 | 3/2005 | Modi ...................... 707/104.1 |
| 2005/0075961 A1 | 4/2005 | McGill ....................... 705/35 |
| 2005/0080700 A1 | 4/2005 | Bancroft ..................... 705/35 |
| 2005/0080702 A1 | 4/2005 | Modi ...................... 705/36 R |
| 2005/0096926 A1 | 5/2005 | Eaton et al. .................... 705/1 |
| 2005/0096996 A1 | 5/2005 | Hall et al. .................... 705/26 |
| 2005/0102152 A1 | 5/2005 | Hodges ........................ 705/1 |
| 2005/0108025 A1 | 5/2005 | Cagan .......................... 705/1 |
| 2005/0108029 A1 | 5/2005 | Schneider ...................... 705/1 |
| 2005/0108122 A1 | 5/2005 | Schneider ................... 705/35 |
| 2005/0108123 A1 | 5/2005 | Schneider ................... 705/35 |
| 2005/0108136 A1 | 5/2005 | Schneider ................ 705/36 R |
| 2005/0114259 A1 | 5/2005 | Almeida ..................... 705/38 |
| 2005/0119908 A1 | 6/2005 | Hippe et al. ................... 705/1 |
| 2005/0131713 A1 | 6/2005 | Hammond .................... 705/1 |
| 2005/0144119 A1 | 6/2005 | Monsen et al. .............. 705/38 |
| 2005/0144121 A1 | 6/2005 | Mayo ......................... 705/39 |
| 2005/0154657 A1 | 7/2005 | Kim et al. ................... 705/30 |
| 2005/0160022 A1 | 7/2005 | Chesney ..................... 705/35 |
| 2005/0160033 A1 | 7/2005 | VanKirk et al. .............. 705/38 |
| 2005/0177508 A1 | 8/2005 | Pembroke ................... 705/40 |
| 2005/0187778 A1 | 8/2005 | Mitchell ....................... 705/1 |
| 2005/0216292 A1 | 9/2005 | Ashlock ........................ 705/1 |
| 2005/0216384 A1 | 9/2005 | Partlow et al. ............... 705/35 |
| 2005/0222947 A1* | 10/2005 | Regan ......................... 705/39 |
| 2005/0240419 A1 | 10/2005 | Collins et al. .................. 705/1 |
| 2005/0240426 A1 | 10/2005 | Smith ........................... 705/1 |
| 2005/0240429 A1 | 10/2005 | Dieden et al. .................. 705/1 |
| 2005/0246267 A1 | 11/2005 | Nichols ...................... 705/38 |
| 2005/0246270 A1 | 11/2005 | Goodman ................... 705/39 |
| 2005/0262016 A1 | 11/2005 | Hill et al. .................... 705/39 |
| 2005/0273346 A1* | 12/2005 | Frost ............................ 705/1 |
| 2005/0283503 A1* | 12/2005 | Hancock et al. ............ 707/200 |
| 2005/0288955 A1 | 12/2005 | Lewiss-Hachmeister ....... 705/1 |
| 2005/0289009 A1 | 12/2005 | Martirena et al. ............ 705/23 |
| 2005/0289014 A1 | 12/2005 | Butler ........................ 705/26 |
| 2005/0289046 A1 | 12/2005 | Conyack ..................... 705/38 |
| 2006/0015357 A1 | 1/2006 | Cagan .......................... 705/1 |
| 2006/0015364 A1 | 1/2006 | Hays ............................ 705/1 |
| 2006/0020518 A1 | 1/2006 | Lovison et al. .............. 705/26 |
| 2006/0026136 A1 | 2/2006 | Drucker et al. ................ 707/3 |
| 2006/0069575 A1 | 3/2006 | Watkins ........................ 705/1 |
| 2006/0074781 A1 | 4/2006 | Leano et al. ................. 705/35 |
| 2006/0074794 A1 | 4/2006 | Nespola, Jr. ................. 705/38 |
| 2006/0080204 A1 | 4/2006 | Schaub ....................... 705/35 |
| 2006/0080228 A1 | 4/2006 | McGill et al. ............... 705/38 |
| 2006/0080229 A1 | 4/2006 | Masella et al. .............. 705/38 |
| 2006/0085207 A1 | 4/2006 | Carey et al. .................... 705/1 |
| 2006/0089842 A1 | 4/2006 | Medawar ...................... 705/1 |
| 2006/0089847 A1 | 4/2006 | Dale-Thiebout ................ 705/1 |
| 2006/0100950 A1 | 5/2006 | Hecht ......................... 705/37 |
| 2006/0106625 A1 | 5/2006 | Brown .......................... 705/1 |
| 2006/0106632 A1 | 5/2006 | Stark ............................ 705/1 |
| 2006/0111945 A1 | 5/2006 | Tinsley et al. .................. 705/4 |
| 2006/0136231 A1 | 6/2006 | Thomas ........................ 705/1 |
| 2006/0149663 A1 | 7/2006 | Nichols ...................... 705/38 |
| 2006/0161482 A1 | 7/2006 | Jacobson et al. ............. 705/26 |
| 2006/0178976 A1 | 8/2006 | Vu ............................. 705/35 |
| 2006/0190272 A1 | 8/2006 | Chun ........................... 705/1 |
| 2006/0190285 A1 | 8/2006 | Harris et al. ................... 705/1 |
| 2006/0200492 A1 | 9/2006 | Villena et al. ............ 707/104.1 |
| 2006/0218069 A1 | 9/2006 | Aberman et al. ............. 705/37 |
| 2006/0242054 A1 | 10/2006 | Himmelstein ................ 705/37 |
| 2006/0259419 A1 | 11/2006 | Monsen et al. .............. 705/38 |
| 2006/0282378 A1 | 12/2006 | Gotfried ..................... 705/39 |
| 2006/0294002 A1 | 12/2006 | Brett .......................... 705/38 |

FOREIGN PATENT DOCUMENTS

| | | |
|---|---|---|
| AU | 2005237519 | 11/2005 |
| AU | 2005239401 | 11/2005 |
| CA | 2529644 | 12/2004 |
| CA | 2552803 | 8/2005 |
| CA | 2564440 | 11/2005 |
| CA | 2485927 | 5/2006 |
| EP | 1743292 | 1/2007 |
| GB | 2359390 | 8/2001 |
| GB | 2410100 | 7/2005 |
| JP | 10222488 | 8/1998 |
| JP | 11161699 | 6/1999 |
| JP | 2000353198 | 12/2000 |
| JP | 2001195487 | 7/2001 |
| JP | 2001319046 | 11/2001 |

| | | | | | | |
|---|---|---|---|---|---|---|
| JP | 2002007691 | 1/2002 | | JP | 2005242676 | 9/2005 |
| JP | 2002015130 | 1/2002 | | JP | 2005276138 | 10/2005 |
| JP | 2002024527 | 1/2002 | | JP | 2006053897 | 2/2006 |
| JP | 2002041782 | 2/2002 | | JP | 2006134275 | 5/2006 |
| JP | 2002056192 | 2/2002 | | JP | 2006154936 | 6/2006 |
| JP | 2002092338 | 3/2002 | | KR | 20060108061 | 10/2006 |
| JP | 2002117124 | 4/2002 | | WO | WO 9506917 | 3/1995 |
| JP | 2002183430 | 6/2002 | | WO | WO 0075828 | 12/2000 |
| JP | 2002183448 | 6/2002 | | WO | WO 0152089 | 7/2001 |
| JP | 2002189791 | 7/2002 | | WO | WO 0152091 | 7/2001 |
| JP | 2002215901 | 8/2002 | | WO | WO 0152153 | 7/2001 |
| JP | 2002245239 | 8/2002 | | WO | WO 0159659 | 8/2001 |
| JP | 2002312574 | 10/2002 | | WO | WO 0207048 | 1/2002 |
| JP | 2002373250 | 12/2002 | | WO | WO 0212984 | 2/2002 |
| JP | 2003058616 | 2/2003 | | WO | WO 0223788 | 3/2002 |
| JP | 2003067566 | 3/2003 | | WO | WO 02102131 | 12/2002 |
| JP | 2003067567 | 3/2003 | | WO | WO 03017057 | 2/2003 |
| JP | 2003099615 | 4/2003 | | WO | WO 03048993 | 6/2003 |
| JP | 2003108776 | 4/2003 | | WO | WO 03090130 | 10/2003 |
| JP | 2003223559 | 8/2003 | | WO | WO 2004029761 | 4/2004 |
| JP | 2003308378 | 10/2003 | | WO | WO 2004040484 | 5/2004 |
| JP | 2003331036 | 11/2003 | | WO | WO 2004057442 | 7/2004 |
| JP | 2003345979 | 12/2003 | | WO | WO 2004072771 | 8/2004 |
| JP | 2004070762 | 3/2004 | | WO | WO 2004086179 | 10/2004 |
| JP | 2004070891 | 3/2004 | | WO | WO 2005003908 | 1/2005 |
| JP | 2004126747 | 4/2004 | | WO | WO 2005019995 | 3/2005 |
| JP | 2004265192 | 9/2004 | | WO | WO 2005104710 | 11/2005 |
| JP | 2005018801 | 1/2005 | | WO | WO 2006053247 | 5/2006 |
| JP | 2005084994 | 3/2005 | | | | |

* cited by examiner

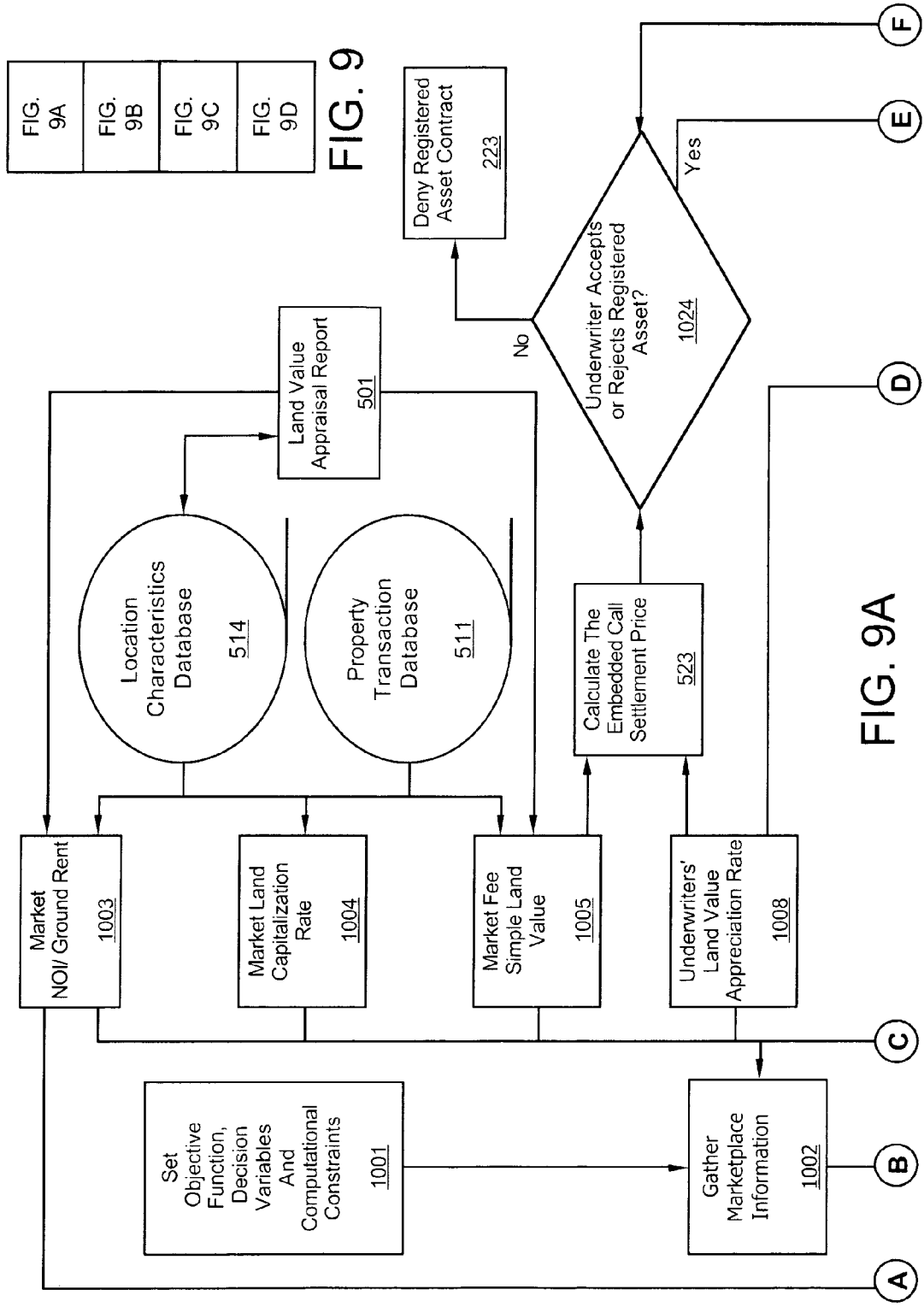

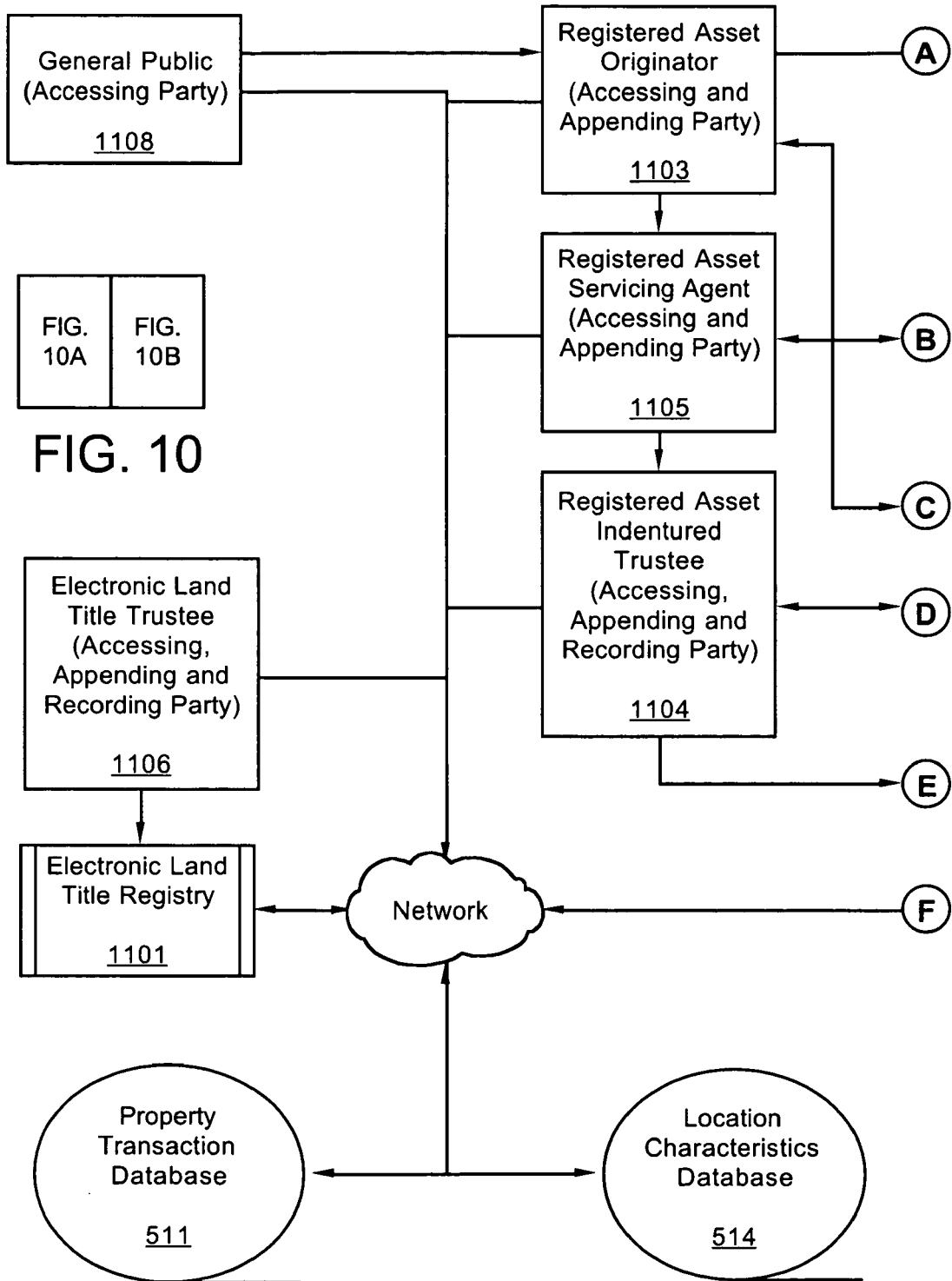

SYSTEM AND METHOD FOR CREATING ELECTRONIC REAL ESTATE REGISTRATION

The present application claims priority from U.S. Provisional Application No. 60/632,473 filed Nov. 30, 2004, which is hereby incorporated herewith, in its entirety, by reference.

TECHNICAL FIELD

The present invention relates to systems and methods for valuing, pricing, acquiring and electronically recording real estate interests, such as, for example, in book entry form. Such systems and methods relate to systems and methods that produce or enable an accounting of successive transactions of real estate interests among and between capital market and real estate market participants.

BACKGROUND ART

Land is the first economic hedge for mankind. Land is a place to begin and to try again. Land underlies all and land is limited. As Mark Twain once said, "Buy land. They've stopped making it."

Government-sponsored enterprises ("GSEs"), such as Fannie Mae (the Federal National Mortgage Association), Freddie Mac (the Federal Home Loan Mortgage Corporation), and the Federal Home Loan Bank System are shareholder-owned corporations, working under a Congressional corporate charter. Each of these entities serves as an instrument of national housing policy to facilitate homeownership. They provide funds for low-cost mortgages to low/moderate and middle-income Americans. Fannie Mae and Freddie Mac are the two largest entities of their kind and their rapidly increasing debt load represents forty percent of the investment grade bond market.

Currently, GSEs use derivative instruments to supplement their debt issuance, to hedge their interest rate and prepayment risks, and to manage their bond duration profile. They use interest rate swaps to transform short-term debt into synthetic long-term debt, and option-based derivatives to hedge prepayment and loan default activity on their assets. Fannie Mae has reported that the aggregate notional amount of its derivatives portfolio as of year-end 2003 was $1.04 trillion, accounting for approximately 0.5% of the entire global derivatives market.

Given the extraordinary volume of derivatives on GSE balance sheets, any instability GSEs may experience is likely to cause systemic ripples among its counterparties. Extensive use of derivative instruments and the lack of transparency of the derivative instruments have raised concerns among policy makers who are uneasy with the growth in debt load and counterparty hedge exposures. The numbers are large and the interest rate swaps, options, and caps counterparties use as financial tools may no longer be sufficient to offset the expanding debt the GSEs carry and the counterparties (e.g., the several largest United States banks) ensure.

Low interest rates and the continued rise of homeownership have led to rapid growth in the mortgage market in recent years coupled with an increasing rate at which mortgages are being refinanced. Since, Fannie Mae and Freddie Mac dominate the mortgage market, any instability among these entities could cause significant financial stress in the United States. Instability in similar international enterprises could cause stress in financial systems worldwide.

In 1994, the U.S. General Accounting Office expressed concern that failure by a large end-user of derivatives could lead to the following sequence of events: 1) one or more dealers who are counterparties could default, causing a chain reaction of counterparty defaults; 2) the opaqueness of derivatives and increased uncertainty associated with these derivatives could result in a general lack of liquidity or a freeze-up of over-the-counter derivatives markets, forcing dealers and others to use the more liquid exchange-traded futures and options markets, and leading to price breaks in those markets; and 3) price breaks in such markets could spread to markets for other assets and create widespread uncertainty about asset values, which could generate widespread panic which, in turn, could lead to widespread selling and plunging asset values throughout the world.

SUMMARY OF THE INVENTION

In accordance with embodiments of the present invention, systems and methods are provided to structure land sale economics such that a leaseholder gains economic advantage while holding favorable land use rights as well as a right to acquire the underlying land at price that is likely to remain within the leaseholder's economic reach.

The systems and methods provide the capital markets and the real estate market alternative financial instruments, which help to reduce economic risks brought about by underlying derivative failures or increasing mortgage market debt loads, while improving transactional transparency and limiting the opportunity for real estate market price breaks.

Further systems and methods of the invention enable a sponsor to convey to a holder or investor, in exchange for the use of its capital for the duration of a land purchase option term, a low risk, unleveraged capital asset that earns a competitive return as a real estate investment and that can be publicly exchanged electronically via a computer network.

In accordance with an embodiment of the invention, a method for originating a registered land asset includes obtaining, via a computer network, at least two of: i) a market value of a parcel of land; ii) a market ground rent associated with the parcel of land; and iii) a land capitalization rate associated with the land. A price associated with an option to purchase the land at the end of a given term is calculated, and a registered land asset contract is offered to an investor. The registered land asset gives the investor ownership of the land subject to the option. In accordance with a related embodiment, the method may also include obtaining, via a computer network: a purchase option term; a prevailing investor cost of capital; prevailing mortgage market terms; and a market land value appreciation rate. A land investment value associated with the purchase of the land may then be calculated. In accordance with a further related embodiment, impacts that externalities have on the market land value associated with the registered land asset may also calculated. Obtaining the market value of a parcel of land may include determining if the land title is encumbered. Additionally, offering a registered land asset contract to an investor may include offering a zero coupon asset contract, offering an income asset contract, or offering a bonded asset contract. Obtaining a market value of a parcel of land may include obtaining a land valuation report.

In accordance with another embodiment of the invention, a method for establishing an electronic land title registry includes determining a geo-referenced address based on a global coordinate position of the land subject to a land title deed and causing a land title deed and registered asset identifier to be recorded in association with one another in an electronic database. The registered asset identifier represents the geo-referenced address. The method also includes causing a registered land asset contract to be recorded in association with the registered asset identifier. In accordance with a related embodiment, the method may also include causing a land title deed and the registered asset identifier to be recorded in association with one another in the local land court. In accordance with another related embodiment, the method may also include allowing the stored registered land asset identifier to be appended to include other information relating to the registered land asset. The geo-referenced address may include a universal transverse mercator (UTM) grid code. Additionally, the registered land asset identifier may be appended with a sequential equity allocation lien (the "SEAL") identifier and the SEAL identifier may include one of: a date associated with the SEAL identifier, a time associated with the SEAL identifier, a document associated with the SEAL identifier, document type associated with the SEAL identifier and a document preparer associated with the SEAL identifier. The registered land asset identifier may also be appended with a vendor identification number (the "VIN").

In accordance with another embodiment of the invention, a computer program product for use on a processor for determining prices and values associated with a registered land asset includes a computer usable medium having computer readable program code thereon. The computer readable program code includes program code for obtaining, via a computer network, at least two of: i) a market value of a parcel of land; ii) a market ground rent associated with the parcel of land; and iii) a land capitalization rate associated with the land; and program code for calculating a price associated with an option to purchase the land at the end of a given term. In accordance with a related embodiment the computer program product may also include program code for obtaining, via a computer network: a purchase option term; a prevailing investor cost of capital; prevailing mortgage market terms; and a market land value appreciation rate and calculating the land investment value associated with the purchase of the land. In accordance with other related embodiments, the computer program product may also include program code for calculating a land par value associated with the registered land asset, program code for calculating land sale proceeds associated with the registered land asset, program code for calculating an embedded call settlement price associated with the registered land asset and/or program code for enabling vendors to access the electronic land title registry via a computer network or the internet. The program code for enabling venders to access the electronic land title registry may include program code for identifying an assigned vendor identification number (VIN).

In accordance with yet a further embodiment of the invention, a system for providing a registered land asset includes a property transaction database in communication with a computer network. The property transaction database provides information related to transactions associated with each registered land asset parcel, each parcel having a registered asset identifier representing global coordinates particular to the land parcel. The system also includes a location characteristic database in communication with the computer network. The location characteristic database provides socioeconomic data regarding the location wherein the land parcel associated with the registered land asset is situated. A computer (used by anyone with access to the network) receives data from the property transaction database and the location characteristic database via the computer network and calculates prices and values associated with a registered land asset contract associated with the land parcel. The registered asset contract is recorded in an electronic land title registry in communication with the computer network in association with the registered asset identifier corresponding to the land parcel. In accordance with a related embodiment, one database may include both the socioeconomic data and the information related to transactions associated with each registered asset parcel.

In accordance with another embodiment of the invention, a method for exchanging registered land assets includes selling a registered land asset relating to land identified by a registered land asset identifier. The registered asset identifier represents a geo-referenced address subject to a registered asset land contract giving a leaseholder an option to purchase the land by the end of a given term. The sale of the registered land asset is recorded in association with the registered land asset identifier in an electronic land title registry.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

The financial products derived herein provide secondary mortgage market participants with an ability to reduce economic risks brought about by derivative failure and increasing debt loads. Embodiments of the present invention improve transactional transparency and limit the opportunity for real estate market price breaks.

As used herein, registered land assets are interests in real property land titles that may be held in book entry (or other) form such that they are suitable for sale or sale, transfer or exchange into and between both capital market and real estate market participants. Registered land assets may offer a fixed rate of return under contract as well as equal or superior collateral value and yield when compared to high-grade corporate bonds and certain mortgage-backed debt instruments of equal duration. For example, in accordance with one embodiment of the invention, a ten year registered land asset may deliver a total return consistently higher than equal term interest rate swaps, many high quality corporate bonds and 30-year mortgages.

Definitions

As used in this description and the accompanying claims, the following terms shall have the meanings indicated, unless the context otherwise requires:

Bonded Asset: A registered land asset wherein the issuer guarantees the performance of registered land asset contract terms directly and/or through an insurance policy, which guarantees the embedded call settlement price at maturity. A government agency, a qualified non-profit enterprise and a local housing authority are examples of issuers that may guarantee registered land asset contract terms directly.

Community Score: A factor representing the effect externalities have on the value of real property.

Embedded Call: A land purchase option that is part of and trades with the registered land asset. Generally, the land may be repurchased at a specific price and time established during registered land asset contract origination.

Free Asset: A registered land asset wherein the embedded call has expired.

Holder: A registered land asset contract owner.

Income Asset: A registered land asset wherein land sale proceeds paid in exchange for the land title underlying the registered land asset are greater than the present worth of its calculated land par value, but less than the appraised market land value determined at the time of the exchange, and wherein a ground rent is due to the holder for a period of time.

Figure 8A:
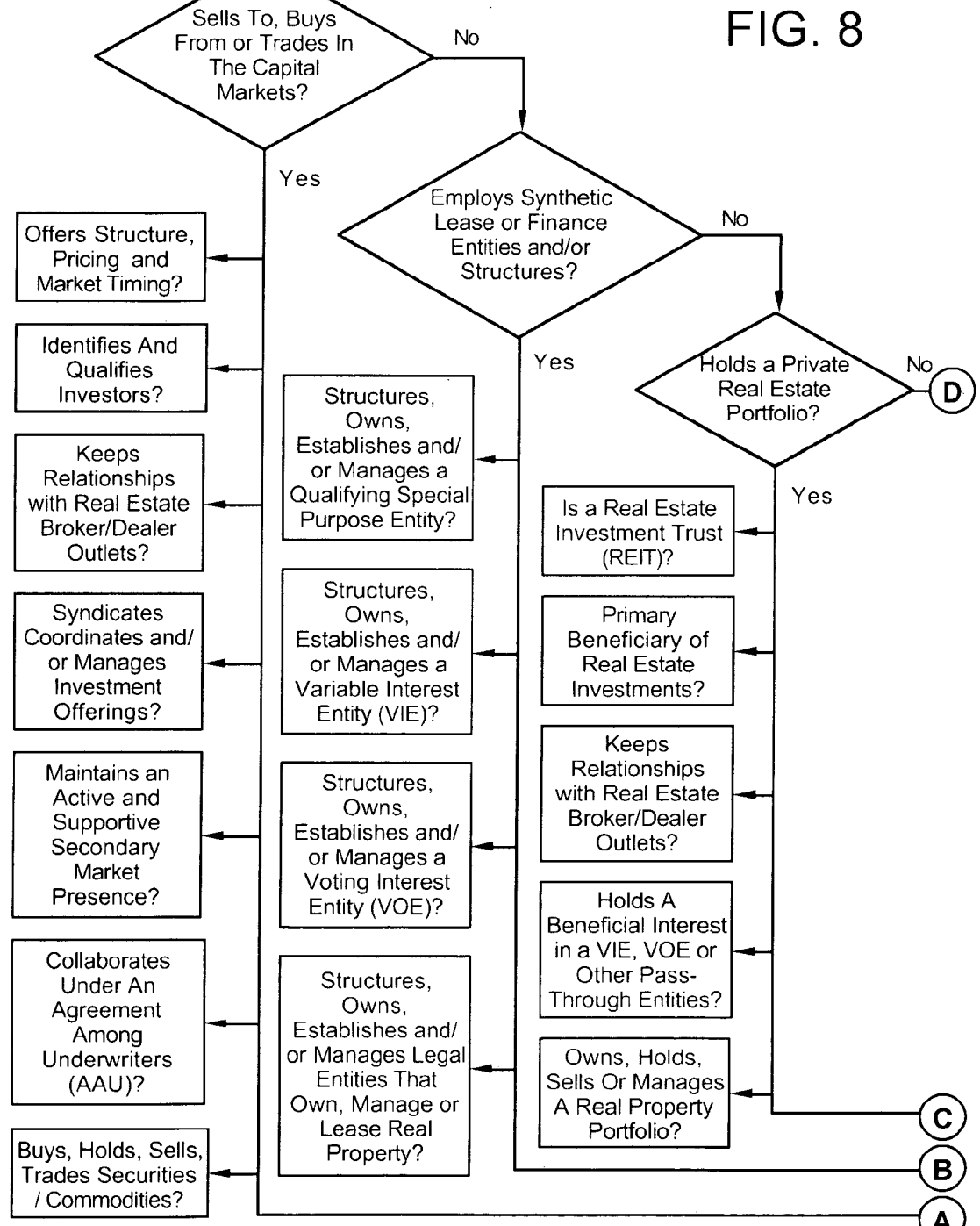
FIG. 8 is block diagram illustrating examples of registered land asset sponsor qualifications and considerations.
Figure 8:
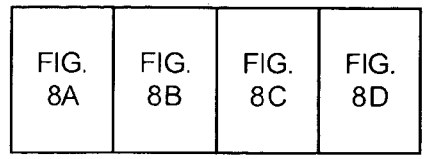
Figure 8B:
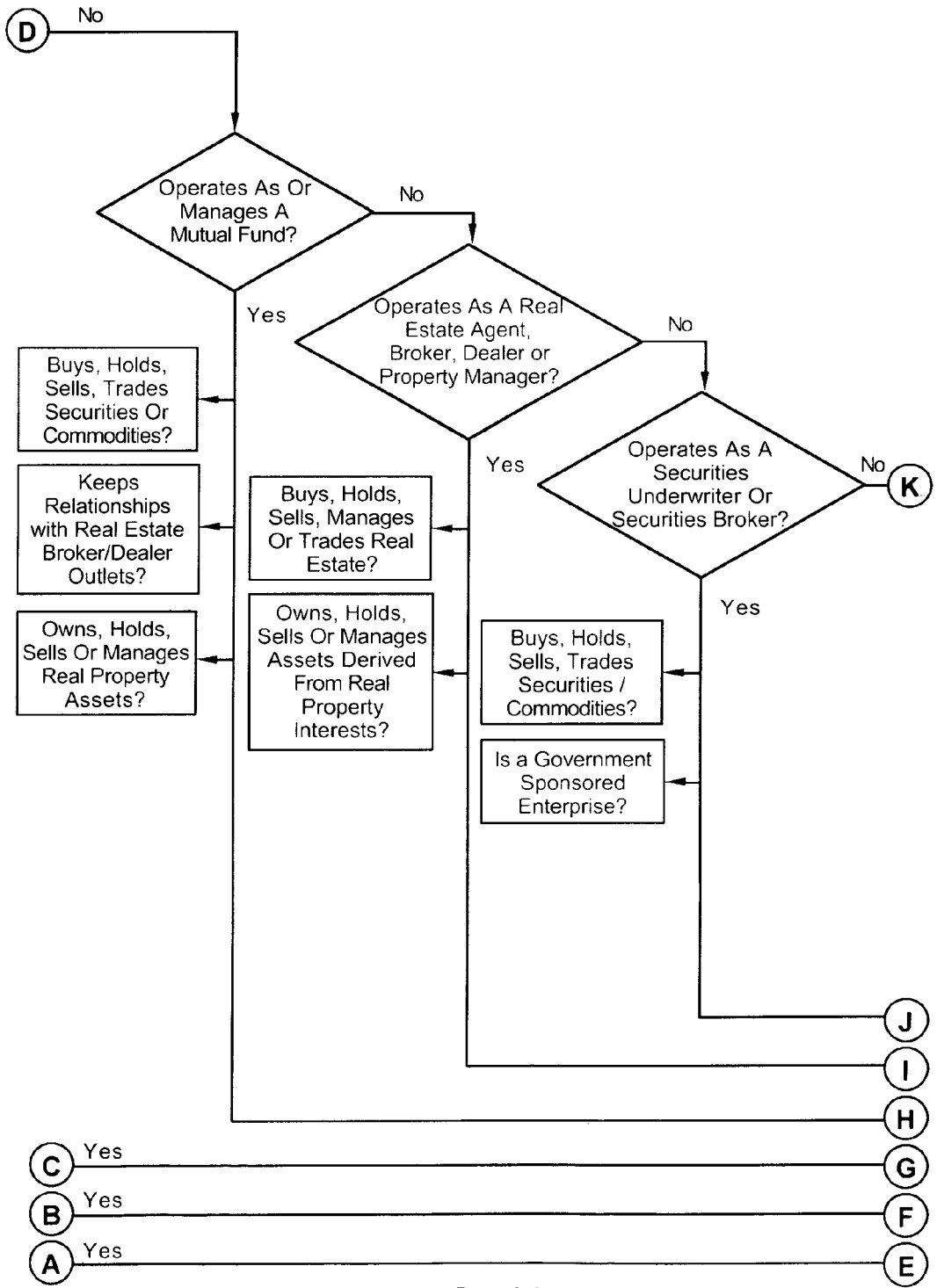
Figure 8C:
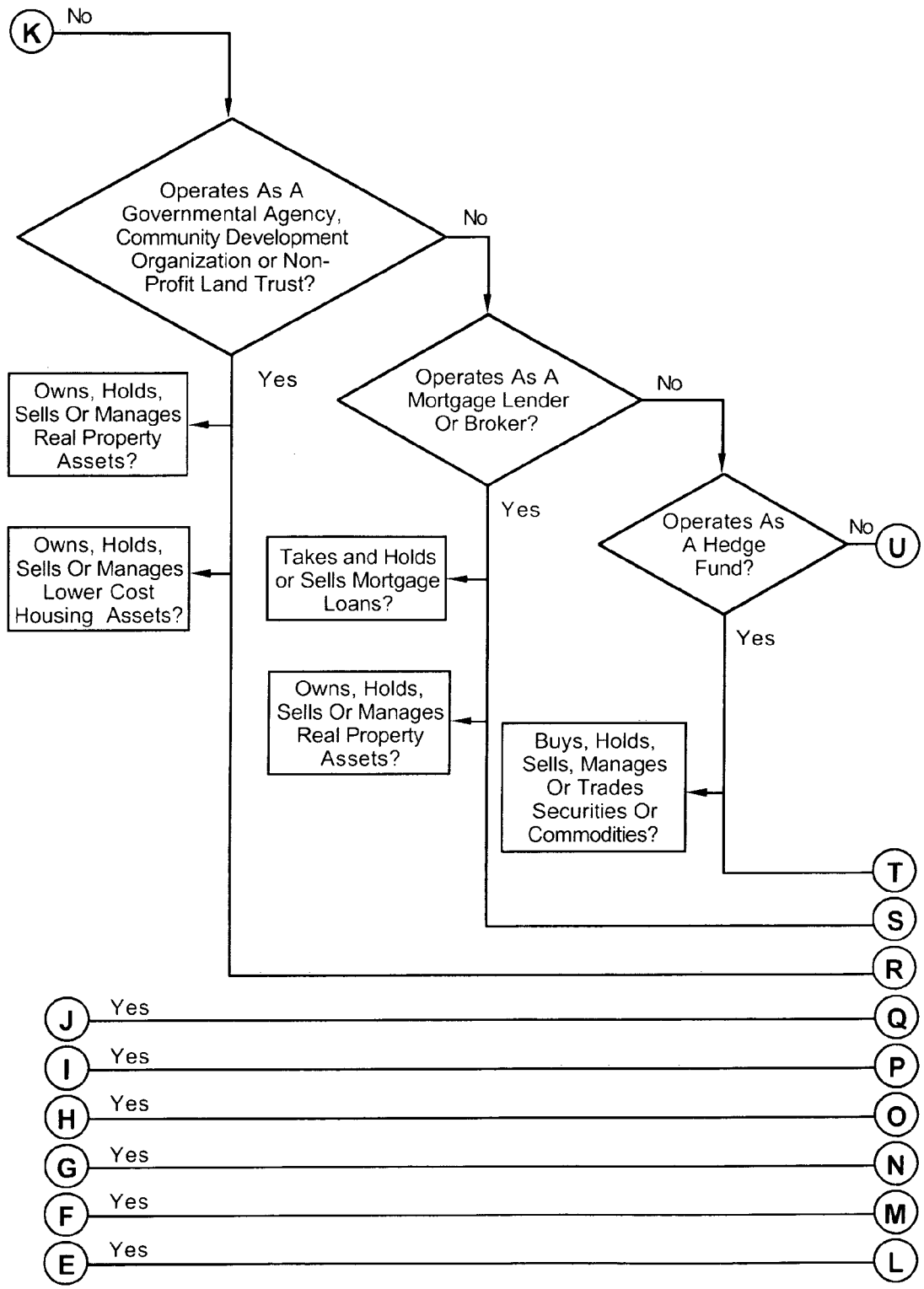
Figure 8D:
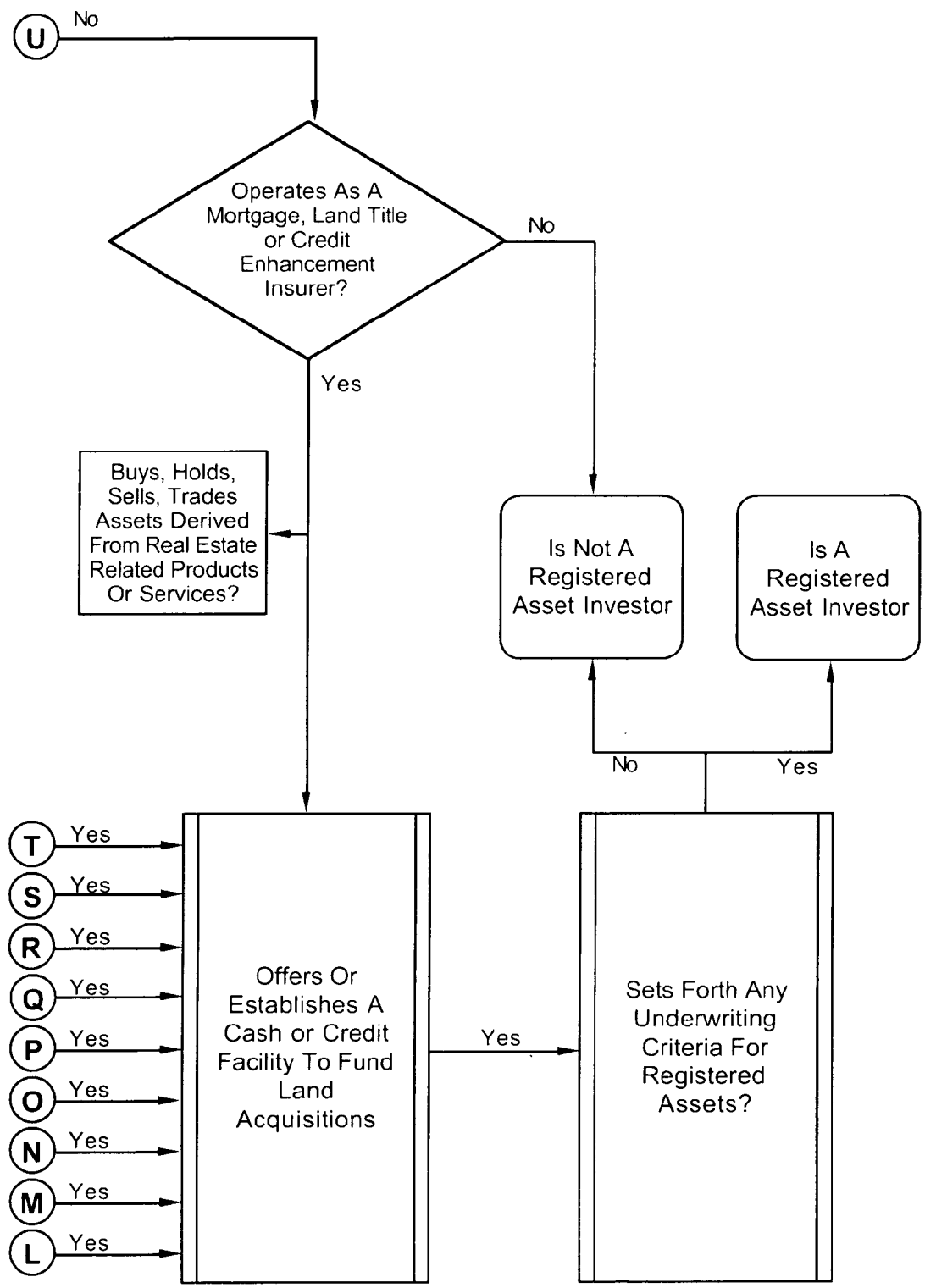

Investor: Investors may include, but are not limited to, high net worth investors that meet the definition of an "accredited investor" as defined in accordance with law, including high net worth investors interested in like-kind property exchanges and institutional investors including, but not limited to insurance companies, pension funds, mutual funds, real estate investors, developers, and dealers. FIG. 8 is a block diagram illustrating registered land asset investor qualifications and considerations.

Land par value: The sum of all future economic values a leaseholder/issuer might expect as compensation for its land.

Leaseholder/Issuer: A current or prospective landowner that causes the issuance of a registered land asset.

Leasehold estate: Improvements and personal property above the land, including, but not limited to, all existing or proposed buildings, machinery, wells, septic systems, storm drains, paved parking lots and landscape features.

Originator: An entity qualified to offer a registered land asset contract.

Purchase Partner Leasehold Mortgage: A mortgage associated with a leasehold estate that is subject to registered land asset contract provisions, and that may be recorded with the registered land asset and be accessed by a registered land asset contract originator or servicing agent.

Registered Land Asset: A financial product representing a leased fee equity interest in land, typically recorded in an electronic land title registry, which is available for sale, transfer or exchange within and between the capital markets and the real estate markets via a bookkeeping and/or book entry method. Typically there is a registered land asset contract associated with the registered land asset product, which defines any terms associated with a land use, ground rent and an embedded call.

Figure 9B:
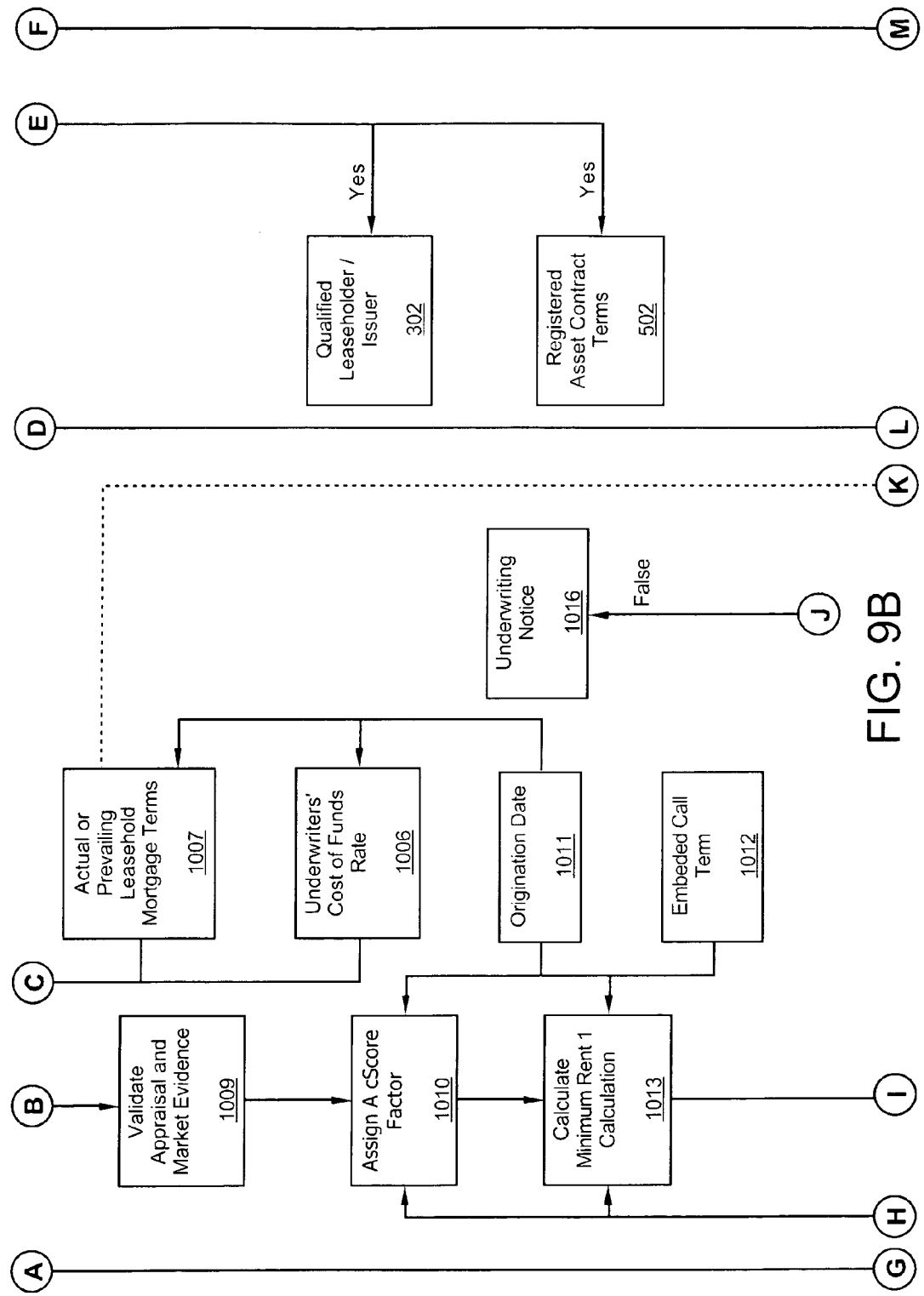
FIG. 9 is a flow chart illustrating an interim pricing method in accordance with another embodiment of the invention.
Figure 9C:
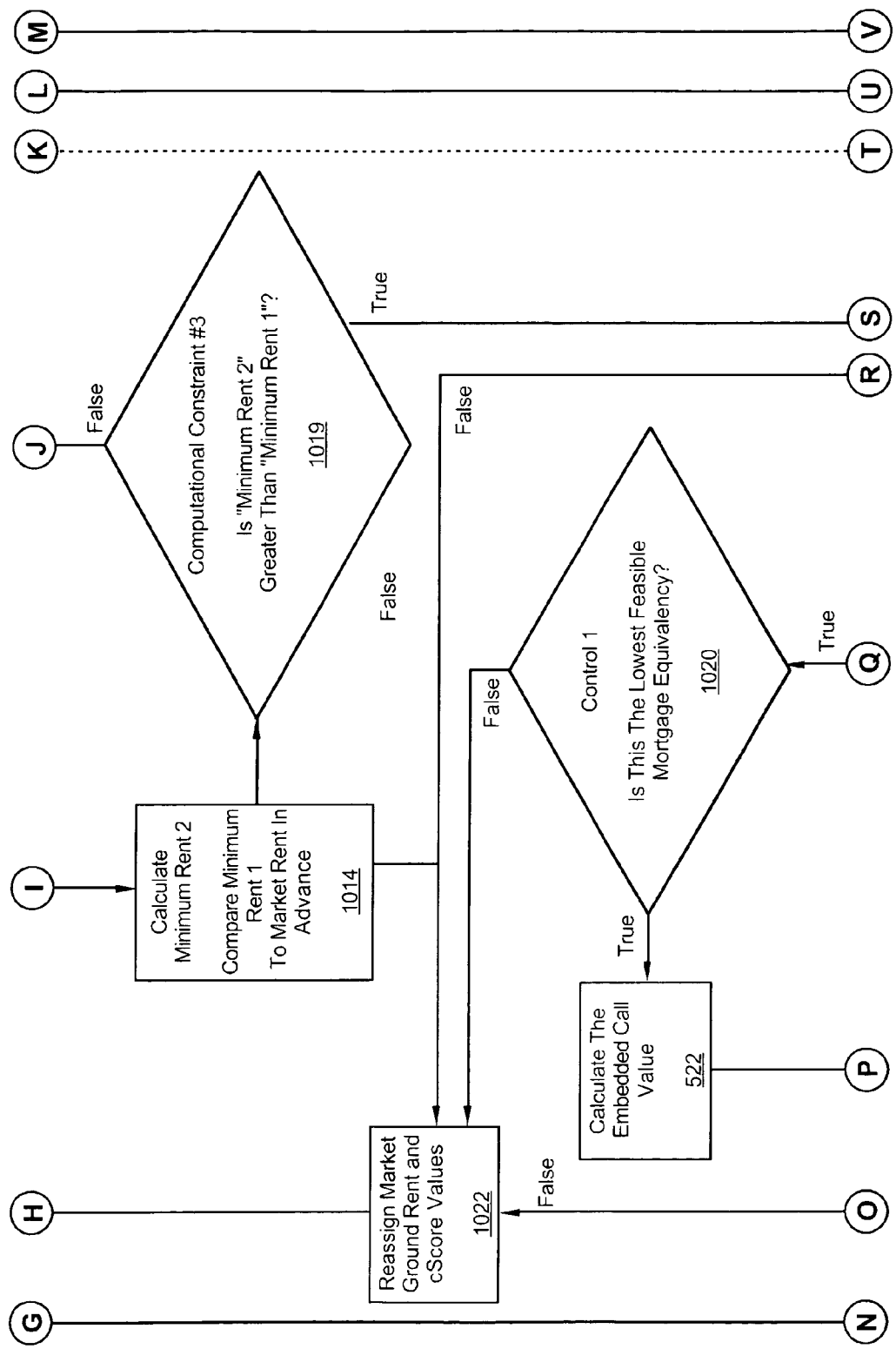
Figure 9D:
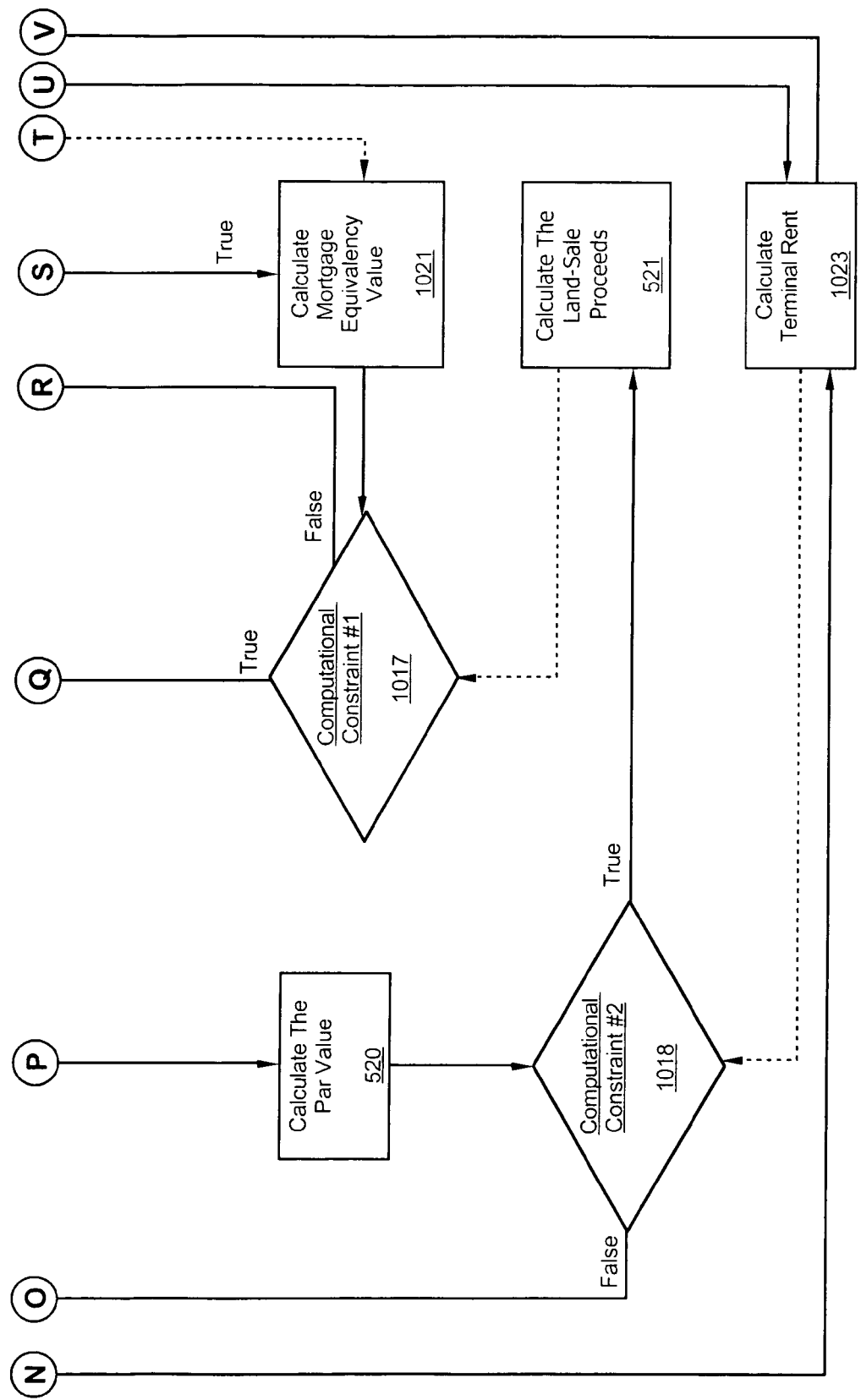

Sponsor: An individual or entity providing capital to consummate the sale of land associated with a registered asset. Such an entity may include a special purpose entity. FIG. 9 is a block diagram illustrating registered land asset sponsor qualifications and considerations.

Zero Coupon Asset: A registered land asset wherein land sale proceeds paid in exchange for the land title underlying the registered land asset are equal to or less than the present worth associated with land's par value, and wherein no ground rent is due.

As will be explained in more detail below, a current or prospective landowner may sell its land through an originator. The capital to underwrite and consummate the sale may be provided by a sponsor. The sponsor may represent itself, one, or several investors, or entities. An originator typically delivers a registered land asset application and any associated contract terms to an underwriter (typically appointed by the sponsor) for review. A ground lease encumbers the land and conveys specific land use rights to present and/or future leaseholders. These land use rights, (together with any other registered land asset contract terms) enhance the marketable value of the leasehold estate. These enhancements may build up the economies of the leasehold estate as well as its mortgage collateral values.

A holder (which may be a capital investor) buys a registered land asset from the sponsor. An indenture trustee or a transfer agent typically represents the holder. Each registered land asset is recorded in an electronic land title registry under the management of a special purpose entity ("SPE") for the duration of the registered land asset contract.

All registered land asset contract types originate with an embedded call. As stated above, the embedded call may enable a leaseholder to purchase the land title underlying its leasehold estate at a predetermined price and date.

A registered asset identifier ("RAI") identifies each registered land asset once recorded within the land court having jurisdiction over the land title and stored in an electronic land title registry or other data repository. All data and analysis associated with the registered land asset may become an addition to a data set associated with the RAI. In this manner appraisal, engineering and other data may be accumulated. The accumulation of data associated with registered assets enables qualitative comparison analysis and each new registered land asset origination may become an information resource. As sales of registered assets and leasehold estates begin to accumulate, repeat sales analysis and forecasting become possible. Consequently, market performance may be measured as a basis for risk analysis and market pricing.

Registered Land Asset Origination

A prospective leaseholder may initiate a registered land asset contract via an originator. The originator is typically a mortgage lender but may also be, but is not limited to, a real estate broker, real estate agent, financial planner, financial advisor, or housing agency. Further, a registered land asset mechanism may be accessed via a network, such as the Internet, to determine if and to what extent that such a registered land asset may enable a prospective leaseholder to purchase property. Similarly, a registered land asset may be originated directly by a prospective leaseholder via an origination process that may be accessed via a computer network such as the Internet.

A registered land asset contract contains all contracts and agreements between all parties to include land asset issuer, sponsor, holder, and lender if a mortgage is given. Together the registered asset contract bundle becomes the foundation upon which mortgage underwriting emerges. The optional purchase partner leasehold mortgage becomes a part of the "contract bundle" for disclosure and transparency reasons. A purchase partner mortgage lowers lenders' collateral risk, and can be easily distributed to and owned by a third party lender. Risk pricing and settlement terms between a mortgagee, mortgagor and any sponsor should reflect local market criteria, and remain a separate agreement between those parties. The registered asset contract contains core provisions to protect holders' interests, which do not change due to negotiated mortgage financing terms. Loan terms may build upon but not change registered land asset core provisions, which contribute to the consistent quality of each registered land asset as a freestanding financial product.

Figure 1:
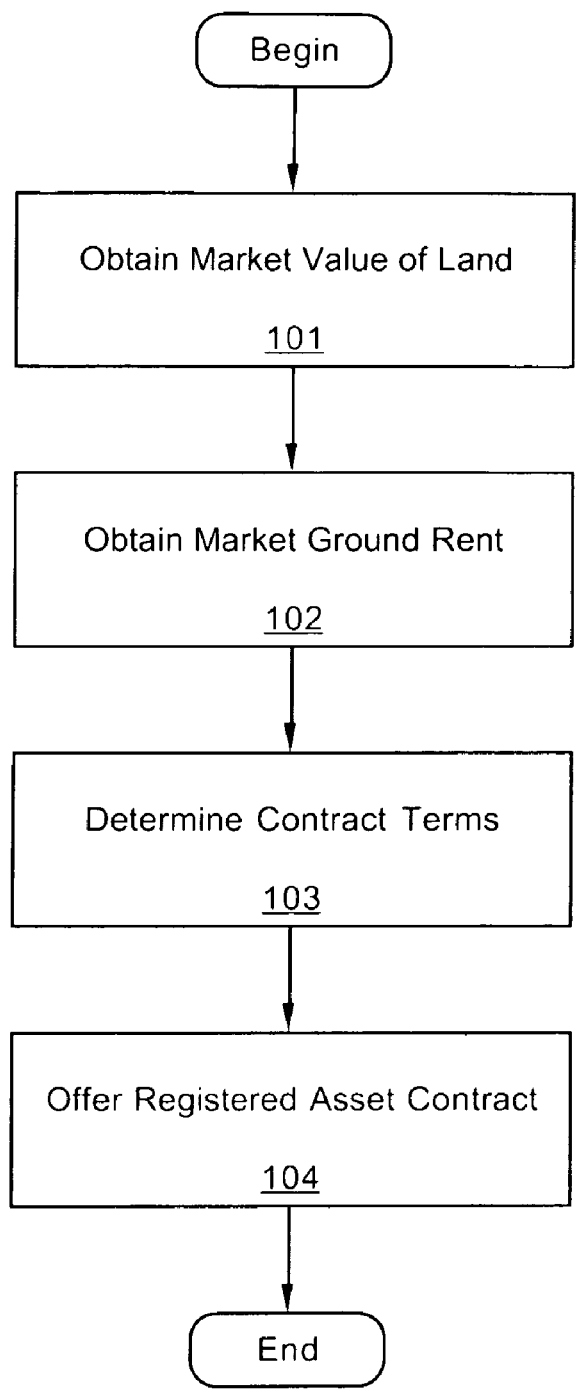
FIG. 1 is a flow chart illustrating one method for originating a registered land asset in accordance with one embodiment of the invention.
Figure 2A:
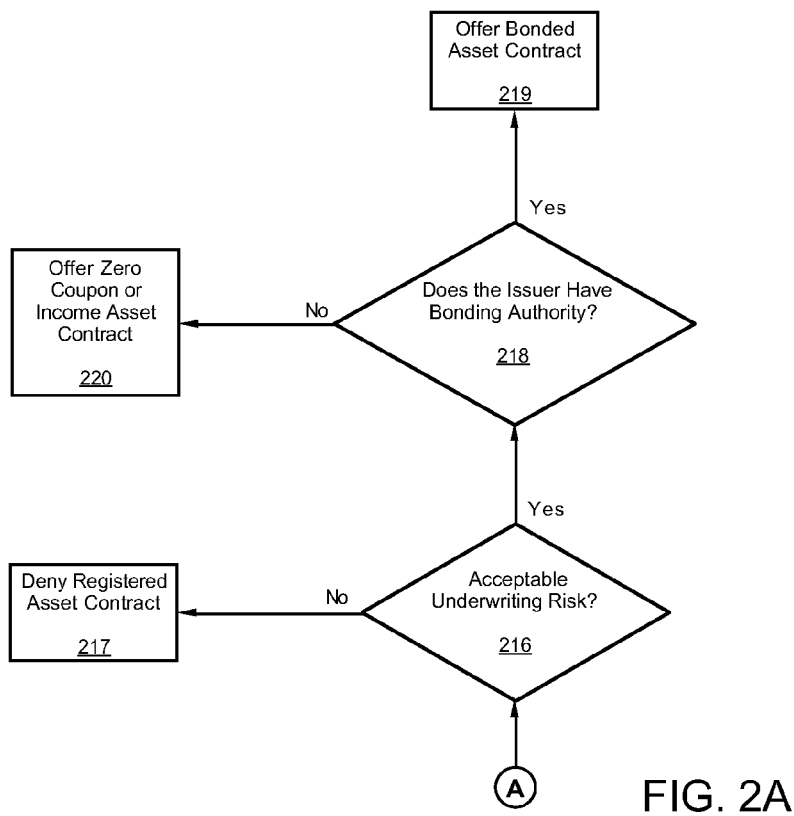
FIG. 2 is a flow chart illustrating a method for determining a prospective leaseholder's qualifications to participate in a registered land asset contract in accordance with another embodiment of the invention.
Figure 2B:
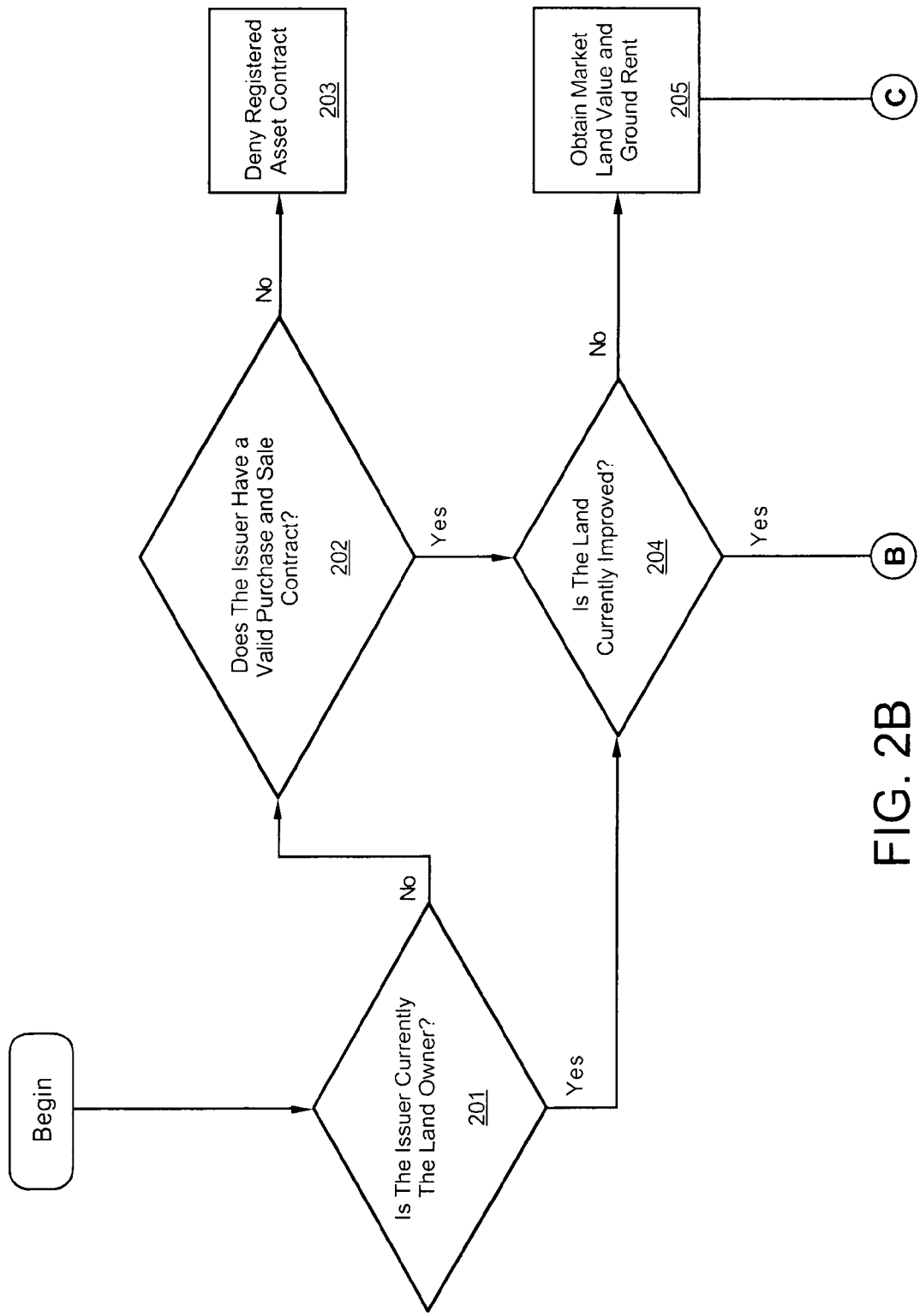
Figure 2C:
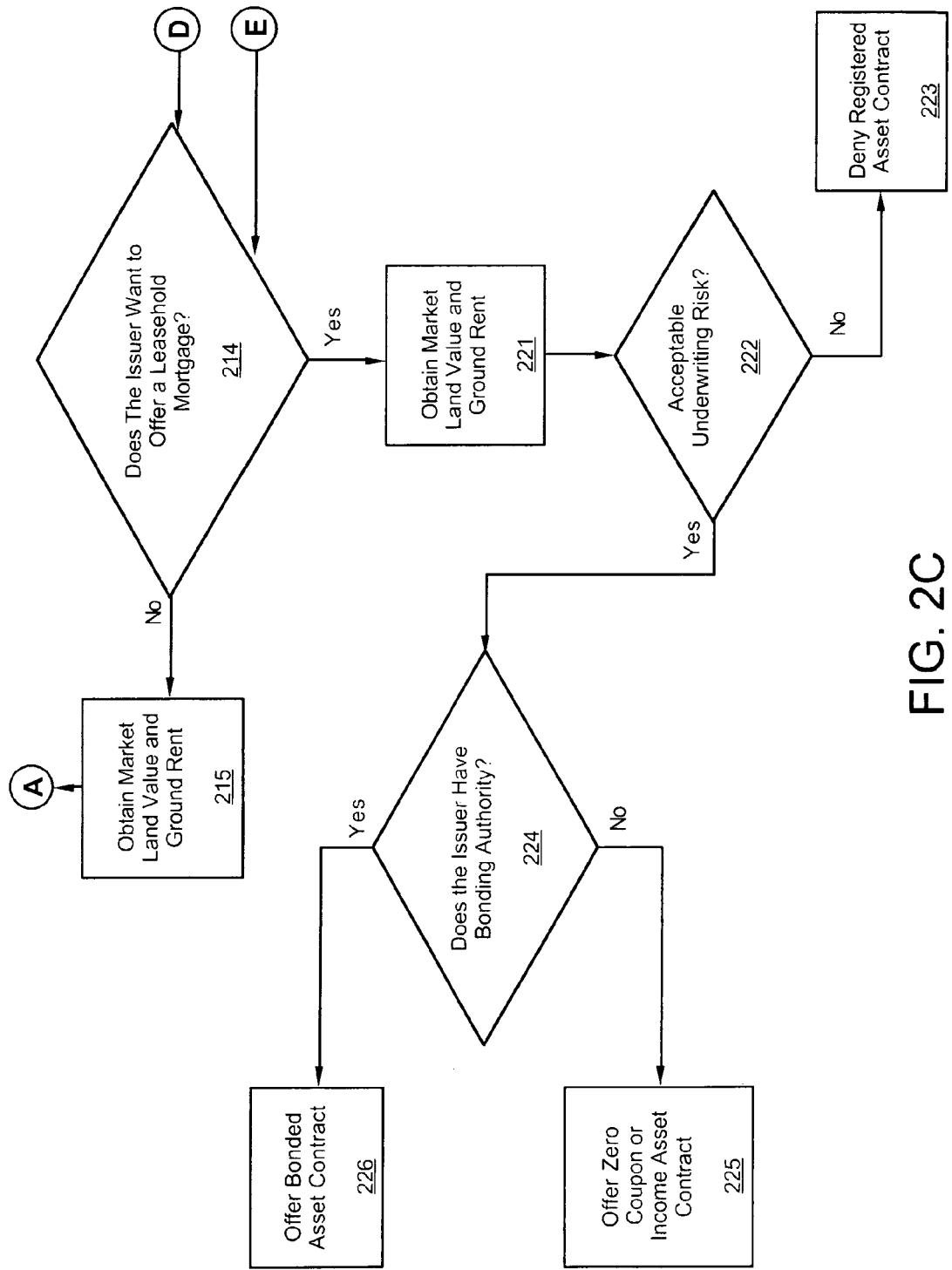
Figure 2D:
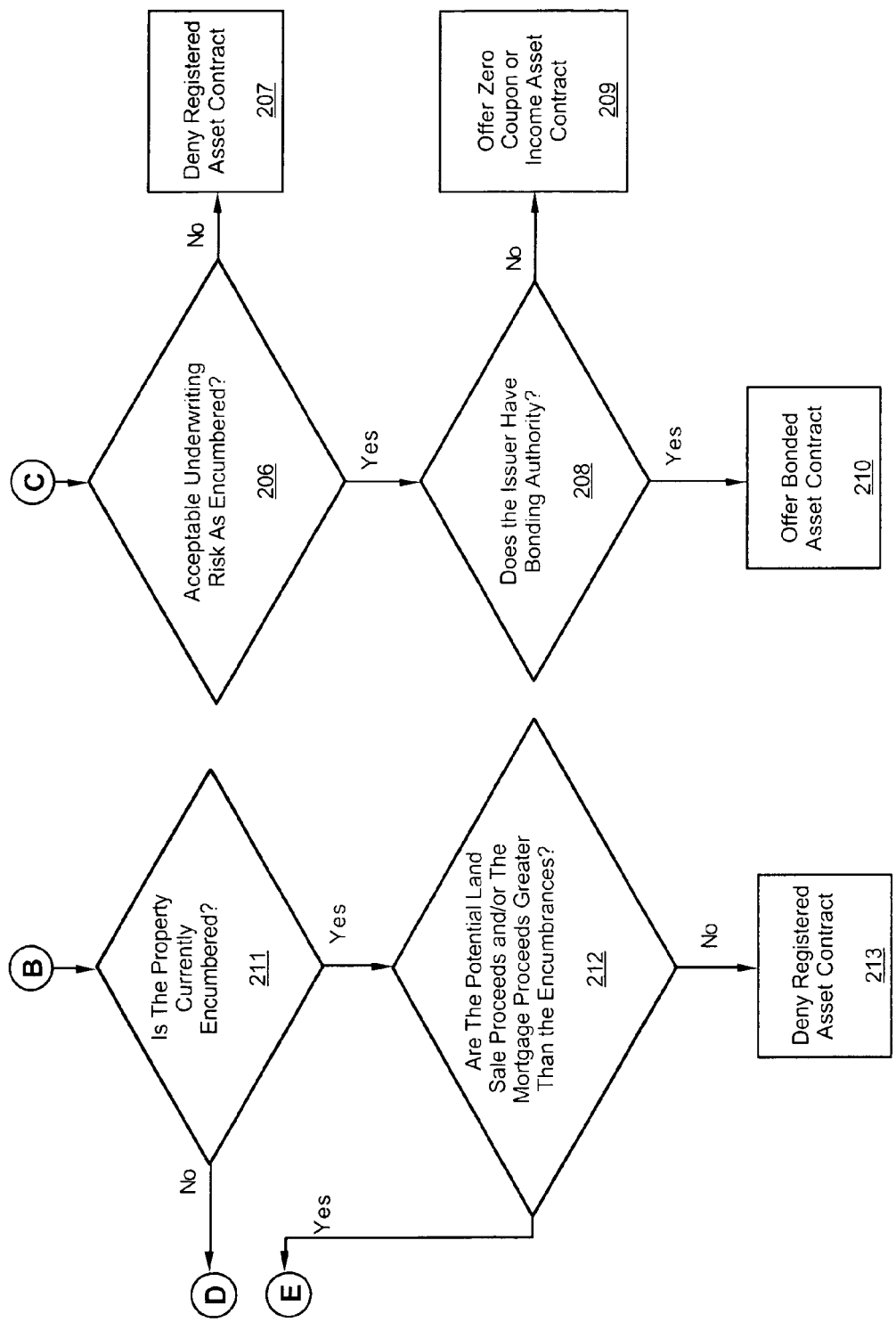

FIG. 1 is a flow chart illustrating one method for originating a registered land asset in accordance with one embodiment of the invention. In process 101, market value of land associated with the registered land asset is obtained. Such information may be obtained via computer network and/or may be provided by an appraiser or an appraisal report. In process 102, the originator obtains a market ground rent associated with the registered land asset contract. The originator determines 103 contract terms associated with an embedded call (including value, price and timing terms) and offers a registered land asset contract to the leaseholder in process 104. While in the example of FIG. 1 only a market value of the land and a market ground rent are obtained, it should be noted that the originator may obtain any two of: a market land value, a market ground rent and a land capitalization rate for land associated with the registered land asset. Given any two of these three elements, the other may be calculated.

FIG. 2 is a flow chart illustrating a method for determining a prospective leaseholder's qualifications to participate in a registered land asset contract in accordance with another embodiment of the invention. FIG. 2 is offered as an example of one such assessment process and it should be understood that the process may alter in light of particular circumstances. Typically, an originator will determine 201 if the prospective leaseholder is the owner of the identified land. If the prospective leaseholder is not the owner of the identified land, the originator will typically determine 202 if the prospective leaseholder has obtained a purchase and sale contract with respect to the identified land. If the prospective leaseholder has not obtained a purchase and sale agreement, the prospective leaseholder may be denied 203 a registered asset. If the originator determines the prospective leaseholder has a purchase and sale agreement, or if the prospective leaseholder is the current landowner, the originator will determine 204 if the land has existing improvements. If the land is vacant and suitable for an intended use, the originator may obtain 205 the market land value (typically, the market land value as though the land is available for its highest and best use) and market ground rent associated with the identified land. Alternatively, the originator may obtain a land capitalization rate associated with the identified land and use a pricing mechanism, such as the pricing mechanism described below.

The originator may then determine 206 if, given the market land value and market ground rent, the land purchase creates an acceptable financial and/or underwriting risk. If the market land value and the market ground rent indicate unacceptable financial and/or underwriting risk, the prospective leaseholder may be denied 207 a registered asset. If the risk is acceptable, the originator may determine 208 if the prospective leaseholder has bonding authority. If the prospective leaseholder does not have bonding authority, the originator may offer 209 the prospective leaseholder a zero coupon asset or an income asset. (The attributes and characteristics of such assets are discussed in detail below.) If the prospective leaseholder has or a third party will provide bonding authority and will guarantee or insure the registered land asset embedded call settlement price, the originator may offer 210 the prospective leaseholder a bonded asset.

If the land is improved, the originator may determine 211 to what extent the property is encumbered. If the property is encumbered, the originator may determine 212 if the sum of the land sale proceeds, the outstanding mortgage loan, and the settlement value to clear other encumbrances exceed the underwriting value of the property. If so, the prospective leaseholder may be denied 213 a registered asset.

If the property is not encumbered, the originator may determine if the prospective leaseholder would like to or needs to offer a mortgage 214. If the prospective leaseholder does not want to offer a mortgage, the originator will obtain 215 the market land value and the market ground rent associated with the registered asset. The originator may determine 216 if the market land value and the market ground rent indicate an acceptable financial or underwriting risk. If the market land value and the market ground rent indicate an unacceptable financial and/or underwriting risk, the prospective leaseholder may be denied 217 a registered asset. If the risk is acceptable, the originator may determine 218 if the prospective leaseholder has or a third party will provide bonding authority and will guarantee the registered asset; and if so, offer 219 a bonded asset. If the prospective leaseholder does not have bonding authority or elects not to insure the payment of the embedded call settlement price, the originator may again offer 220 a zero coupon asset or an income asset.

If the prospective leaseholder would like to offer a mortgage, the originator may obtain 221 the market land value and a corresponding market ground rent. In addition, a mortgage lender may require a market value for proposed or existing improvements on the property. The originator may determine 222 if the market land value and market ground rent (and, perhaps, the market value for improvements on the property) indicate an acceptable financial and/or underwriting risk. If the market land value and the market ground rent indicate unacceptable financial and/or underwriting risk, the prospective leaseholder may be denied 223 a registered asset. If the risk is acceptable, the originator may determine 224 if the prospective leaseholder has or a third party will provide bonding authority. If the prospective leaseholder does not have bonding authority, the originator may offer 225 the prospective leaseholder a registered land asset as a zero coupon or income asset that may be accompanied by an optional leasehold mortgage. If the prospective leaseholder has bonding authority and will or may guarantee the registered land asset contract directly or through a third party, the originator may offer 226 the prospective leaseholder a bonded asset.

The prospective leaseholder may then receive the land sale proceeds in exchange for a good and marketable leased fee land title. The leaseholder (also the issuer, in this case) also receives a ground lease contract conveying to the leaseholder the right to occupy and use the land for a specified period of time, and an embedded call, which provides the leaseholder/issuer with an option to repurchase the land underlying the leasehold estate. The rights to occupy and use may be restricted by the contract so as to restrain acts that may harm the value of the land. Since the land sale proceeds may be received by the leaseholder in exchange for the land title, the proceeds are not debt and the exchange may not impact the leaseholder's credit score. The leaseholder may sell its leasehold estate at any time prior to the expiration of the embedded call and contract provisions may allow the leasehold estate buyer to assume all registered land asset provisions for its remaining term.

Originators may advise with respect to legally allowable land uses that are consistent with those the leaseholder/issuer hopes to have. Originators may also advise with respect to the duration of the embedded call, such that the duration is sufficient for the leaseholder to implement a land use plan that will gain it the financial strength it needs to exercise the embedded call. Originators may take measures to ensure that the leaseholder understands and signs all required disclosure forms to demonstrate for the record that the leaseholder is an informed and willing consumer.

In the example of FIG. 2, the landowner or prospective landowner of real estate initiates a registered land asset contract to sell the land and remain the registered owner of the leasehold estate. Registered land asset contract land sale proceeds, in excess of those funds (if applicable) to clear the land title, flow to the leasehold estate.

The Leasehold Mortgage

A registered land asset may serve to increase effective buying power, particularly if prospective leaseholder lacks the necessary capital, income or both to qualify under conventional mortgage lending terms. In such a case, the absence of land as a part of a mortgage collateral package may be offset by the economic values the registered land asset contract provides the lender through assumable contract provisions. The ground lease, which may offer a free ground rent for a defined term, the embedded call value and related redemption rights, and land sale proceeds paid upon acquisition, and certain mortgagee rights exercisable in the event of a mortgage foreclosure all contribute to leasehold mortgage security. These provisions offer economic values and may serve to minimize traditional leasehold mortgage lending risks. The registered land asset land sale proceeds and contract terms, when valued and added to leasehold estate values (proposed or existing) may enable a qualified leaseholder to offer an optional leasehold mortgage of adequate size to satisfy the purchase and sale agreement or personal financial goals.

A Purchase Partner Leasehold Mortgage ("PPLM") is a model leasehold mortgage designed in accordance with the present invention. PPLM documentation (including its terms and conditions) may be consistent with secondary mortgage market underwriting standards. Further, the PPLM terms and conditions may be combined with the terms of the registered land asset contract and its components. The borrower's personal credit quality and income quantity may be the principal loan repayment security. The leasehold estate might be the sole PPLM collateral.

The registered land asset contract terms may provide for the distribution of land sale proceeds through a mortgage lender. Registered land asset contract terms may authorize the delivery of land sale proceeds, whenever possible, to reduce mortgage debt service either by reducing the mortgage total, by guaranteeing a specific periodic debt service to the lender or some combination of both. Alternatively, the land sale proceeds may be paid directly to the leaseholder if the mortgage lender agrees to accept certain credit risks or if no mortgage is given during the registered land asset origination.

Leasehold Mortgage Default Settlement Price

Should a leasehold mortgage contract go into default such that a lender must foreclose to realize on its leasehold estate collateral, mortgage lenders may be provided with concessionary contract terms for land pricing and acquisition up to the final embedded call maturity date. The mortgagee, upon notice to the indenture trustee of a leasehold foreclosure, may assume and exercise the leaseholder's embedded call to purchase the underlying land title from the holder for a price formulated, for example, as of the date of title transfer to the mortgagee. Typically, a mortgagee foreclosure could serve to terminate all registered land asset contract obligations due the leasehold estate. Upon notice of a leasehold foreclosure action, all registered land asset contract distributions could be held in escrow pending legal settlement.

Should the mortgagee believe a fee simple title might sell faster than a leasehold title, the mortgagee might combine the leasehold estate and the leased fee estate into a fee simple estate. The mortgagee may know the default settlement formula in advance, making it possible for the mortgagee to market the property as a leasehold estate or as a fee simple estate without first exercising the embedded call.

The ability to market the combined property rights prior to exercise of the embedded call (and subsequent transfer of the land title) is referred to herein as an "early retirement call." Such an early retirement call saves a mortgagee time and money. However, the land transfer price continues to grow until the lender exercises the call. An early retirement call settlement analysis compares the outcome of two formulas. The formulas are calculated and the larger of the two outcomes is used as the early retirement call settlement price.

The formulas are as follows:

Formula 1 Adds Three Elements:

Element 1: Accounts for the land sale proceeds plus accumulated interest at the cost of funds rate compounded up to the time of early retirement call. The formula for Element 1 is:

$$\text{Element 1} = L_P \times (1+i)^n$$

Where:

$L_P$=Land Sale Proceeds i=The effective investor cost of funds interest rate;

n=Effective number of periods in the early retirement call term, a quotient found by multiplying the periods of the embedded call term (up to the time of default) by the number of compounding periods (typically monthly);

Element 2: Accounts for any principal balance outstanding if the registered land asset is an income asset. Alternatively, if the registered land asset is a zero coupon asset paying guaranteed periodic payments, Element 2 sums all periodic payments paid to date plus interest accrued at the cost of funds rate compounded for the duration of the embedded call term up to the time of the early retirement call.

If the registered land asset is an income asset that is subject to an early retirement call, one method to determine the outstanding income asset balance is as follows:

$$\text{Additional Principal} - (\text{Additional Principal} \times \text{Percent Paid Off})$$

The formula to determine the outstanding income asset balance is:

$$((V_L \times 1/(1+i)^n) - (L_V \times (1/(1+i)^n))) - (((V_L \times 1/(1+i)^n) - (L_V \times (1/(1+i)^n))) \times ((i/(1-(1/((1+i)^{n1})))/i) - 1) \times ((1+i)^{n2} - 1))$$

Where:

$V_L$=Fee simple Land Value $L_V$=Land Par Value i=The effective investor cost of funds interest rate;

n=Effective number of periods in embedded call term, a quotient found by multiplying the duration of the embedded call term by the number compounding periods (typically monthly);

$n_1$=Effective number of periods in the embedded call term, a quotient found by multiplying the duration of the embedded call term by the number compounding periods (typically monthly);

$n_2$=Effective number of periods in the early retirement call term, a quotient found by multiplying the duration of the embedded call term (up to the time of default) by the number of compounding periods (typically monthly).

Alternatively, if the registered land asset is a zero coupon asset, a method to determine the total present value of installments paid up to the early retirement call is as follows:

Periodic Installment×Factor 2 (Future Worth of One-Dollar Per Period With Interest—see the summary of factors in Appendix B).

To determine the pay off balance of a zero coupon asset, periodic installments must first be established. The periodic installments are then multiplied by a factor representing the future worth of the installments with interest. The product is an amount to which the paid up installments would have grown over the given number of installment periods, including the accumulation of interest at the effective cost of funds rate per period, up to the early retirement call.

The formula to determine the present worth of the periodic installments is:

$(L_V-(\text{Lump Sum Payment}\times(1+i^n)))\times(i/((1+i)^n-1))\times((1+i)^n-1)/i)$ Where:

$L_V$=Land Par Value;

$i$=The effective investor cost of funds interest rate;

Lump Sum Payment=Any Land Sale Proceeds ($L_P$) paid at title conveyance;

$n$=Effective number of periods in the early retirement call term, a quotient found by multiplying the duration of the embedded call term (up to the time of default) by the number of compounding periods (typically monthly).

Element 3: Accounts for any land value appreciation due the holder under the registered land asset contract, which accumulates over the duration up to the early retirement call.

The land value appreciation portion due may be determined as follows:

(Land Market Value ($V_L$)×Factor 1 (Future Worth of One Dollar with Interest)–Land Market Value ($V_L$))

One formula to determine the land value appreciation portion due the holder is:

$((V_L\times(1+R_A)^n)-V_L)$

Where:

$V_L$=Appraised Land Value;

$R_A$=Effective contract Land Value Appreciation Rate;

$n$=Effective number of periods in the early retirement call term, a quotient found by multiplying the duration of the embedded call term (up to the time of default) by the number of compounding periods (typically monthly).

$(1+R_A)^n$=Factor 1 (the future worth of one dollar with interest). The fee simple land value is multiplied by Factor 1 representing the land value growth over the embedded call term at the effective contract land value appreciation rate ($R_A$) per period.

Formula 2:

Formula 2 is the product of the appraised land value multiplied by Factor 1 (see above and Appendix B) representing the effective contract land value appreciation rate compounded for the contract maturity, and that product is multiplied by the ratio of the early retirement call term over the term to maturity. The result is the appreciated land value.

The land value appreciation portion due may be determined as follows:

(Appraised Land Value ($V_L$)×Factor 1 (see above)× (Default duration/Contract duration))

The second formula is:

$(V_L\times(1+R_A)^n)\times(n_2/n_1)$

Where:

$V_L$=Appraised Land Value;

$R_A$=Effective contract Land-Value Appreciation Rate;

$n_1$=Effective number of periods in embedded call term, a quotient found by multiplying the duration of the embedded call term by the number of compounding periods;

$n_2$=Effective number of periods in the early retirement call term, a quotient found by multiplying the duration of the embedded call term (up to the time of default) by the number of compounding periods (typically monthly);

$(1+R_A)^n$=Factor 1 (see Appendix B for a summary of factors).

The second formula multiplies the fee simple land value by Factor 1 representing the land value growth over the embedded call term at the effective contract land-value appreciation rate ($R_A$) per period.

The results of Formula 1 and Formula 2 may be compared to determine the greater of the two. The larger value represents the proportional return of and return on capital due the holder up to the early retirement call.

Land Sale Distribution Options

Figure 3:
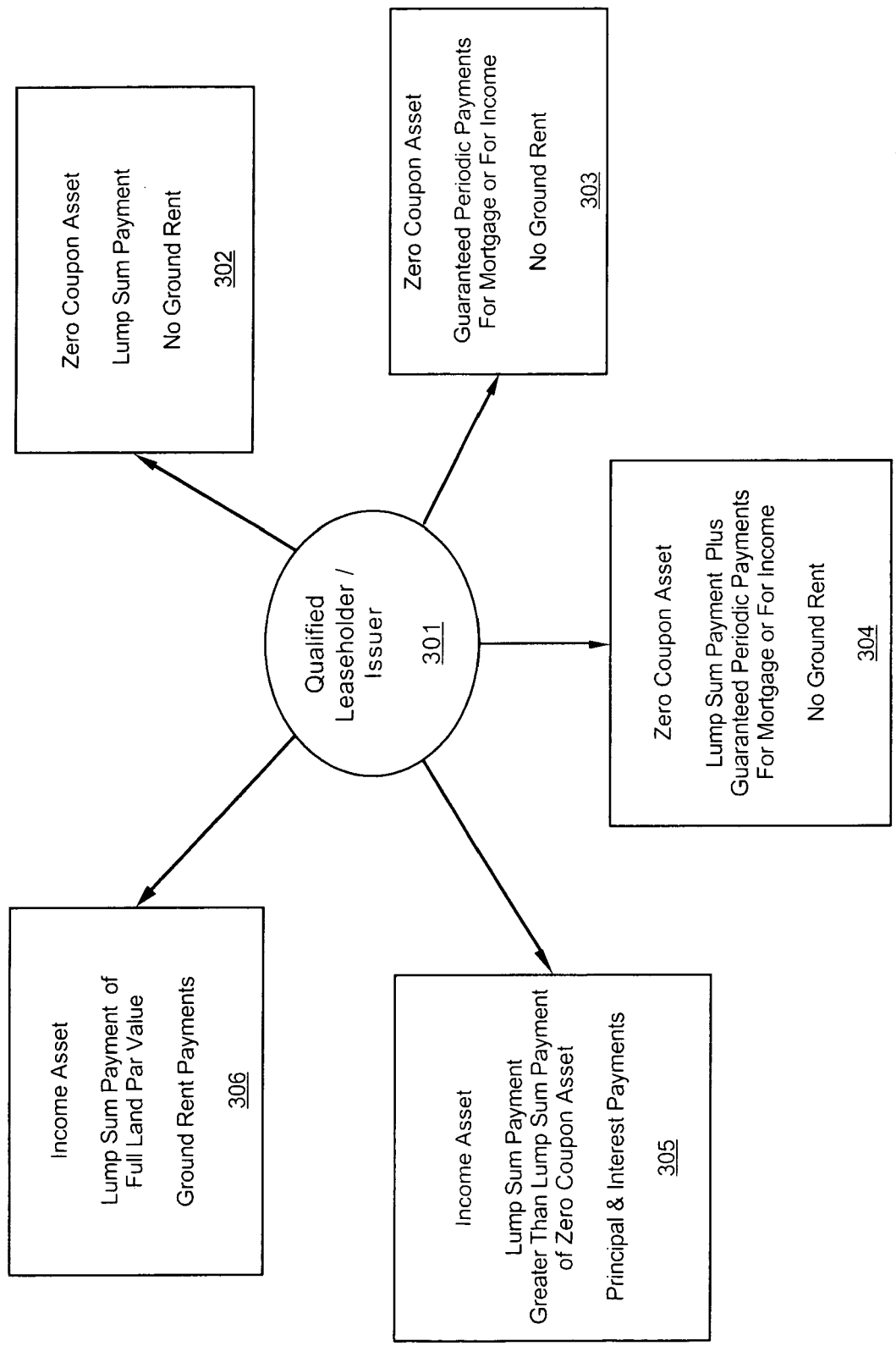
FIG. 3 is a block diagram illustrating land sale distribution options in accordance with a further embodiment of the invention.

FIG. 3 is a block diagram illustrating land sale distribution options in accordance with a further embodiment of the invention. One role of a registered land asset contract originator may be to guide the prospective leaseholder as the prospective leaseholder 301 selects ground lease contract options. The originator may also advise the prospective leaseholder how to best distribute land sale funds to suit the leaseholder's financial objectives. As noted above, if a mortgage loan is a part of that strategy, any distribution plan that optimizes leaseholder opportunity for economic success may have a positive influence on mortgage collateral quality.

Registered land asset contract options may authorize the originator to direct land sale proceeds to pay periodic leasehold mortgage debt (such as payments of principal and interest) or to pay down any leasehold mortgage balance. All principal accumulation from mortgage payments may flow to the leasehold estate (mortgagor).

Land sale proceeds distribution options may meet a broad range of cash flow needs, whether the prospective leaseholder is a new buyer seeking temporary help acquiring a property, a fee simple owner withdrawing equity without debt, a mortgagor seeking to reduce mortgage interest or related periodic costs, or an elderly person converting land value into cash flow without reverse mortgage costs and debt. For example, under certain circumstances registered land assets provide property owners a mechanism to "put" debt to the capital markets. Homeowners, for example, currently have two mechanisms to restructure mortgage debt, refinance or sell. An originator structures existing or new mortgage financing by exchanging the land title for cash used to minimize mortgage debt. Registered land asset proceeds together with a new, smaller purchase partner leasehold mortgage combine with necessary issuer cash and assets to establish or restructure leaseholder occupancy costs for a prescribed term. The leaseholder retains a land "call".

Land sale proceeds may be distributed in a variety of ways, several examples of which are as follows:

Zero Coupon Asset—Option One 302

Cash/Lump Sum Payment: This option delivers a lump sum payment to the leaseholder or leasehold estate at the closing of the registered land asset purchase equal to the present worth of the land par value, discounted over the embedded call term, at an effective cost of funds interest rate determined at registered land asset contract origination.

No ground rent payments are due to holder for the embedded call term.

$$\text{Land Sale Proceeds} = L_V \times (1/(1+i)^n)$$

$$\text{Or, alternatively} = L_V/(1+i)^n$$

Where:

$L_V$=Land Par Value;

n=the effective number of periods in the embedded call term, a quotient found by multiplying the embedded call term by the number compounding periods (typically monthly);

i=the effective cost of funds rate, a quotient found by dividing the annual cost of funds rate by the number of compounding periods.

Zero Coupon Asset—Option Two 303

Guaranteed Annuity Payments: Option 2 pays a series of level periodic installments based upon the calculated present worth of the land par value, discounted over the embedded call term, at an effective cost of funds interest rate determined at contract origination. Payments are made to the leaseholder or leasehold estate, which may be assigned to a mortgage lender for the duration of the embedded call term. No ground rent payments are due for the embedded call term.

$$\text{Periodic Installments} = (L_V \times (1/(1+i)^n))/(1-(1/(1+i)^n))/i$$

Where:

$L_V$=Land Par Value n=the effective number of periods in the embedded call term, a quotient found by multiplying the embedded call term by the number compounding periods (typically monthly);

i=the effective cost of funds rate, a quotient found by dividing the annual cost of funds rate by the number of compounding periods.

Zero Coupon Asset—Option Three 304

Cash/Lump Sum Payment with Guaranteed Annuity Payments:

Option 3 pays both a lump sum payment and a series of level periodic installments that together are equal to the present worth of the land par value, discounted over the embedded call term, at an effective cost of funds interest rate determined at origination. No ground rent payments are due during the embedded call term.

$$\text{Land Sale Proceeds } (L_P) = L_V \times (1/(1+i^n))$$

Where:

n=the effective number of periods in the embedded call term, a quotient found by multiplying the embedded call term by the number of compounding periods (typically monthly);

i=the effective cost of funds rate, a quotient found by dividing the annual cost of funds rate by the number of compounding periods.

$L_V$=Land par value, the land par value equals the appraised market value less the embedded call value.

After the land sale proceeds are determined, the lump sum payment, which may be an amount equal to what the leaseholder needs to supplement its leasehold purchase cash, is determined. If the leaseholder is simply taking cash for its land and has not given a mortgage, the leaseholder may select the lump sum cash amount. In any event, the lump sum cash amount may be deducted from the land sale proceeds total. The balance becomes the basis for the equal installment distribution for the duration of the embedded call term.

A sinking fund factor may determine the level periodic investment or deposit required to accumulate one dollar in a given number of periods including the accumulation of interest at the effective rate. With the single lump sum payment removed, the remaining balance may be converted to periodic installments by multiplying the balance by the sinking fund factor. The following formula may be employed:

$$\text{Periodic Installments} = (L_V - (\text{Lump Sum Payment} \times (1+i^n))) \times (i/((1+i)^n - 1))$$

Where:

$L_V$=Land Par Value

Sinking Fund (Factor 3)=$i/((1+i)^n - 1)$ n=the effective number of periods in the embedded call, a quotient found by multiplying the embedded call term by the number compounding periods (typically monthly);

i=the effective cost of funds rate, a quotient found by dividing the annual cost of funds rate by the number of compounding periods.

Income Asset—Option Four 305

Cash/Lump Sum Payment—Requires Ground Rent Payments: This option distributes a lump sum payout to a leaseholder that is greater than the lump sum proceeds of a zero coupon asset of equal terms. A mortgage lender may underwrite this option when the leasehold estate buyer does not have sufficient funds to convey the leasehold estate title or to pay off an existing mortgage, and a zero coupon asset does not provide the necessary funds for these purposes.

The excess principal becomes the basis of the rental payment due and payable in advance for the duration of the embedded call contract term. The excess principal is fully amortized over the embedded call term, assuming the leaseholder settles the income asset at embedded call maturity and all rental payments are made. A ground rent guarantee may be necessary to meet underwriting standards set from time to time by a sponsor or other entity to include and investor/holder.

An income asset may be calculated in three steps:

First the maximum allowable distribution is calculated in accordance with the market land value. The market land value times a reversion factor, which is the present value of one dollar to be collected at a future time when discounted over the embedded call term, at an effective cost of funds interest rate determined at registered land asset contract origination. Therefore, the maximum cash distribution formula is:

$$\text{Maximum Cash Distribution} = V_L \times (1/(1+i)^n)$$

Where:

$V_L$=Fee simple Land Value;

$1/(1+i)^n$=Reversion Factor (Factor 4, see Appendix B).

Second, the same formula is employed to calculate the land sale proceeds equal to zero coupon asset option 1. This yields a lump sum equal to the present worth of the par value, discounted over the embedded call term, at an effective cost of funds interest rate determined at registered land asset contract origination. Therefore, the lump sum cash formula is:

$$\text{Land Sale Proceeds } (L_P) = L_V \times (1/(1+i)^n)$$

Where:

$L_P$=Land Par Value;

n=the effective number of periods in the embedded call term, a quotient found by multiplying the embedded call term by the number of compounding periods (typically monthly);

i=the effective cost of funds rate, a quotient found by dividing the annual rate by the number of compounding periods.

Third, the monthly ground rent the leaseholder must pay on funds in excess of a zero coupon asset with equal terms and of duration is determined. The result of the first step is subtracted from the result of the second step rendering the excess funds distributed.

The excess funds, if divided by an ordinary annuity coefficient, yield the present value of a series of future payments of rent due per period. The ordinary annuity coefficient is discounted over the embedded call term at an effective cost of funds interest rate determined at registered land asset contract origination. Thus, the third step formula is as follows:

$$\text{Monthly Ground Rent} = ((V_L \times 1/(1+i)^n) - (L_P \times (1/(1+i)^n)))/(1-(1/(1+i)^n))/i$$

Where:

$V_L$=Fee simple Land Value $L_P$=Land Par Value $(1-(1/(1+i)^n))/i$=Ordinary Annuity Coefficient n=the effective number of periods in the embedded call term, a quotient found by multiplying the call term by the number of compounding periods (typically monthly);

i=the effective cost of funds rate, a quotient found by dividing the annual cost of funds rate by the number of compounding periods.

Income Asset—Option Five 306

Land Par Value Requires Ground Rent Payments: This option distributes at land title conveyance the full land par value as a lump sum. Income asset option 5 requires a periodic ground rent payment for the duration of the embedded call term. Certain underwriting limits may restrict the use of this option due to a reliance on leaseholder credit. A ground rent guarantee may be necessary to meet underwriting standards set from time to time by a sponsor or other entity to include and investor/holder.

The ground rental payment calculation multiplies the land par value by the cost of funds rate determined at origination.

$$\text{Periodic Ground Rent} = L_P \times (1+i) - 1$$

Where:

$L_P$=the Land Par Value;

i=the effective cost of funds rate, a quotient found by dividing the annual cost of funds rate by the number of compounding periods.

Property Valuation and Registered Land Asset Pricing

Market price and market value may be different. Market valuation methods and research can and should distinguish related party transactions from open market exchanges. Usually price refers to an amount paid by a particular purchaser to a particular seller under specific circumstances and conditions. When measuring and distinguishing market value transactions, each transaction should be screened for special circumstances and bias before the value conclusion. Since land value may be a primary underwriting decision variable, a land valuation process using state of the art, real estate appraisal practices is provided in accordance with the invention.

Pricing the underlying land is a function of the cost of capital, market circumstances at origination, and property rights under consideration to name just a few. The economic theory supporting the system builds upon the economic principle of balance, which states that there is a sense of proportion in the four agents of production; these agents are "land", "capital", "coordination", and "labor".

Appraisers apply sales and income analysis techniques to "improved" properties as a way to separate values attributable to "capital", "coordination" and "labor", and then allocate these to the improvements. The remainder, after the costs of capital, coordination and labor have been paid, represents the net income to the land. Land, as one of the agents of production, has a logical value relationship to total property value. The income remainder is equivalent to the land's potential rental income. This rental income potential is a prime factor and basis of the appraiser's income approach to determine a current land value. Potential rental income is an element the method employs in pricing the embedded call, that future purchase-option right the issuer either buys in cash or what reduces the land's market value (typical) to a price that a sponsor will pay. The latter, the land value reduction option, lowers the land's market value to set the par value price, or the land's investment value basis.

The method offers an issuer an opportunity to exchange the land at its par value for capital, and certain assumable contract rights specifying among others land use, future purchase rights and economic rents. The land sale proceeds, when added to the issuer's capital position, strengthen the "capital" agent of production. This leaves the issuer specified land use rights in addition to an enhanced capital position, with time and opportunity to apply coordination and labor as a means to grow wealth. The embedded call retains for the issuer the right to realize on that wealth creation at a specific price and future time.

Figures 4, 4A:
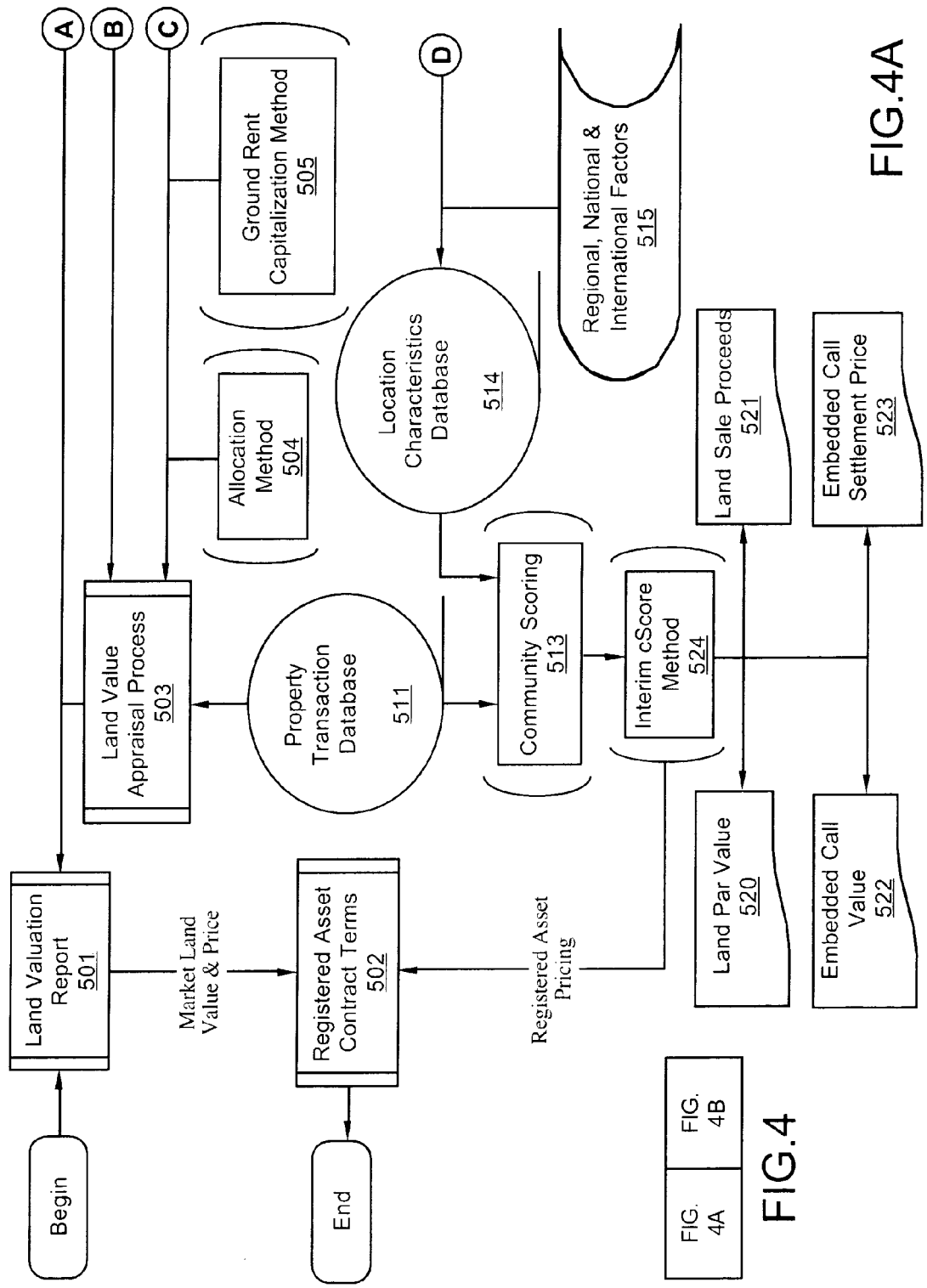
FIG. 4 is a block diagram illustrating a method for determining values and prices associated with a registered land asset.
Figure 4B:
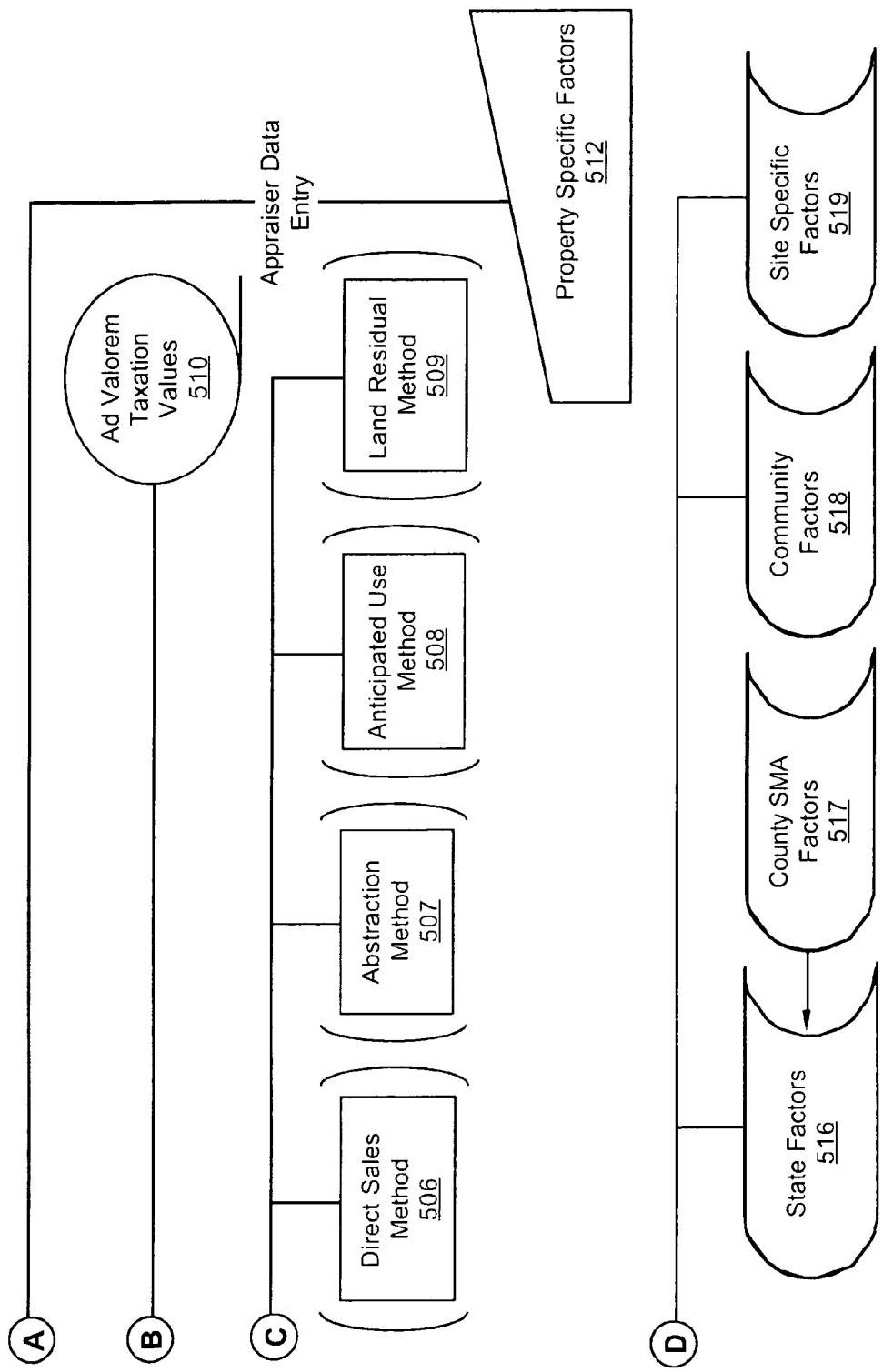

FIG. 4 is a block diagram illustrating a method for determining values and prices associated with a registered asset. In accordance with this embodiment, a land valuation report 501 may be used to determine underlying factors for valuing a registered land asset and appropriate land use contract terms 502. The land valuation report reflects attributes and deficiencies of the associated land, such as location, orientation to sun or water, noise levels, vibration factors, odors, wind exposures, flood zones and other attributes and deficiencies observed during a site review. Subsequent appraisals within the community have the benefit of preceding appraisal data, gathered, for example, via a computer network, to determine value.

The land valuation report 501 may be produced via a land value appraisal process 503. Under appraisal theory, there are several established methods of deriving land value. These methods are known in the art and include, but are not limited to an allocation method 504, a ground rent capitalization method 505, a direct sales method 506, an abstraction method 507, an anticipated use method 508, and a land residual method 509. Ad valorem taxation information 510 may also be a consideration in the appraisal report. A property transaction database 511 may provide information relating to transactions involving the property for the land value appraisal process 503. Property specific factors 512 influence land values and is thus considered within the results of the land value appraisal process in producing the land valuation report 501. Such property specific factors generally result from a site visit (for example, by the appraiser), but may also be obtained from a database associated with a network as described below.

Land may be affected by external economies and diseconomies. Governmental controls and regulations, economic circumstances, social forces and environmental conditions all impact land value in different ways. These forces are dynamic and may influence land values in ways that are as unique as each parcel of land within a community. In accordance with the invention, these external influences are measured at contract origination to produce a land value adjustment factor or community score "cScore" 513. The cScore 513 represents the economic impacts of community and other location related externalities and it may be adjusted for time and material impact. Historical community information accumulated in the property transaction database 511 over time may be used to provide information relating to cScore 513. Absent historical data, an interim cScore calculation method, 524 shown below, establishes the initial cScore data. The cScore 513 impacts the land par value and other registered land asset contract terms that are dependent upon the land par value.

Further, each registered land asset contract, in turn, influences the cScore 513. As registered assets begin to proliferate in and around a community and populate the property transaction database 511, site-specific uses allowed under registered land asset contracts become an informational resource. Ground lease terms from historical contract references that may be used to establish appropriate land use limitations for new contracts and to ensure the uses will remain in harmony with the location and in tune with the costs of community services. Over time, information derived from registered land asset contracts help measure the economic health and life cycle of a community, which in turn influences the cScore calculation and land values.

A location characteristics database 514, which may be combined with or included in the property transaction database 511, includes socioeconomic information that may be cumulative, eventually influencing the cScore 513 calculations. The location characteristic database 514 includes private and public information that may be fed from multiple international, national, state, regional and site-specific sources. The location characteristic database 514 includes information taken from raw economic data, social data, environmental data and governmental data, which are readily available. Further, data collected on a transactional basis may be included in the location characteristics database. These may include, but are not limited to:

1) Regional, national and international factors 515: Federal government data is available by states and by region. It is generally uniform, reliable, timely and cost effective public data. Sub-market segmentation, buyer characteristics, pertinent demand factors and pertinent supply factors are available in government data.

2) State factors 516: State economic influences significantly impact land values. Building on federal level data, many states produce a wide array of information available for this purpose.

3) County—SMA Factors 517: Local developments, jobs, and population data influence demand. Regional trend analysis, for example, can contribute useful insight and help anticipate change.

4) Community Factors 518: Social, economic, governmental, and environmental factors influence property values in the vicinity of the targeted property, and as a result the subject property itself. These factors, if any, may be gathered (for example, by an appraiser).

5) Site Specific Factors 519: Physical characteristics, legal influences, social influences and the physical and functional obsolescence of the improvements, if any, may be gathered (again, perhaps by an appraiser).

The location characteristics database 514 may also contain public real estate transactional data including liens, foreclosures and other activity useful in analyzing current and future risks and other market expectations.

Any developable land parcel within a community may support some site specific, appropriate land use sufficient to sustain some theoretical minimum net operating income ("NOI"). An appraisal may provide an estimated market NOI for, typically, the highest and best use on the subject land. This minimum NOI is used to calculate the return that the land must produce to justify purchase money funds. Following a title conveyance, the resulting cScore and NOI may integrate with all other underwriting information associated with any RAI on file within the property transaction database 511.

The market land value is the basis of the land par value 520, and from the land par value the land sale proceeds 521 is calculated. To calculate these, the theoretical NOI is adjusted in accordance with the cScore and in accordance with a formula representing the future worth of this income stream over the embedded call term. The result equals the embedded call value 522, which is subtracted from the market land value to yield the land par value. The land par value 520 is the total of all future land sale funds that flow to the prospective leaseholder over the embedded call term. The present value of the land par value, discounted at the cost of funds rate for the embedded call term, will yield the land sale proceeds 521.

The embedded call settlement price 523 is the cost to discharge a registered land asset contract. The settlement date and price are generally set at registered land asset contract origination. The principal variables used to determine the embedded call settlement price are duration term and anticipated land value change. The embedded call value 522, the land par value 520, the land sale proceeds 521 and the embedded call settlement price 523, as well as the land valuation report 501, are used to determine the registered land asset contract terms 502.

Interim Pricing Method

FIG. 9 is a flow chart illustrating an interim pricing method in accordance with another embodiment of the invention. See Appendix A for a summary of abbreviations. By employing the interim pricing method, reliable and useful transactional information may be accumulated by community for each registered land asset land title underwritten. The interim pricing method calculates pertinent pricing and values that make registered assets suitable for trade as a commodity within capital markets, while retaining the economic characteristics sought by real estate market investors. The interim pricing mechanism may be embodied within a computer program product, such as computer software or hardware.

The goal of the interim pricing method is two fold, (i) structure the land sale economics so the leaseholder gains economic advantage while holding favorable land use rights, and rights to acquire the underlying land at a future time and at a price that is likely to remain within its economic reach, and (ii) convey to the holder/investor a low risk, debt free capital asset that earns a competitive return on investment in exchange for the use of its capital for the duration of the embedded call.

The method generates a community score (cScore) for each registered land asset it prices. A cScore varies by community and by contract duration. Pertinent cScore factors may be recorded in a database in accordance with each community wherein registered assets are underwritten. Each set of cScore factors accumulate in the database to become the basis for the interim pricing mechanism to account for the economies and diseconomies various community externalities impose on a locus. The cScore reflects these impacts when it values and prices the embedded call ($L_c$). A cScore factor should also influence the resulting land par value ($L_V$) calculation and the several dependant economic values that the interim pricing mechanism will calculate for any given parcel of land, within any community subject to a registered land asset contract.

The interim pricing mechanism can price and value registered land asset elements within any community for any investment duration absent historical market transaction information. Over time and with the accumulation of adequate transactional information by community, a variable attribute econometric pricing model will supplement the interim pricing method. The cScore and registered land asset pricing may then be derived through regression analysis of historical transactional data, initially generated by the interim pricing method.

Appendix C is an illustration which shows a sample embodiment of a user interface as well as Microsoft Excel cell references corresponding to the column and row coordinates found in the sample embodiment.

Computational Constraints, Objective Functions and Decision Variables

The objective function, decision variables and computational constraints are set 1001 and the objective function, decision variables and computational constraints determine the output of the pricing mechanism. A sponsor or an underwriter may set acceptable objective functions, decision variables and computational constraints prior to registered land asset origination.

Computational Constraints

Computational constraints employ a plurality of mathematical limits. Below are three examples:

Constraint #1:=($I_{M2}$/f)<=$L_P$ (Cell G37) 1017;
Constraint #2:=($I_T/L_V$)-I=-0.000001 (Cell G38) 1018;
Constraint #3:=$I_{M1}$>=($I_{M2}$-0.000001) (Cell G39) 1019.

Computational constraints set bounds on decision variables. An example of a physical boundary is ">=(result -0.000001)" where a specific decision variable sets the limit of an acceptable answer.

These following elements have computational results that may change when decision variables change due to computational constraints.

$I_{M1}$=Minimum Ground Rent 1 (Cell E35)
$I_{M2}$=Minimum Ground Rent 2 (Cell E36)
$L_C$=Embedded Call (Cell E39)
$L_V$=Land Par Value (Cell E40)
$L_P$=Land Sales Proceeds (Cell E41)
$L_s$=Embedded call settlement price (Cell E42)
$I_T$=Terminal Rent (Cell F28)

Computational constraint #1 (Cell G37) 1017 is ($I_{M2}$/f) <=$L_P$; it determines if the quotient of minimum ground rent 2 ($I_{M2}$) divided by the debt constant (f) is equal to or greater than the land sale proceeds ($L_P$).

Computational constraint #1 requires the method to repeatedly calculate the embedded call (Cell E39) 522, the land par value (Cell E40) 520 and the land sale proceeds ($L_P$) 521 as a function of each trial minimum ground rent 2 ($I_{M2}$) 1014.

Computational constraint #2 (Cell G38) 1018 is ($I_T/L_V$)-I=-0.000001; it compares the terminal rent 1023 yield on investment ($I_T/L_V$) less the annual cost of funds (I) 1006, to ensure that the terminal rent ($I_T$) delivers the expected yield on the land par value ($L_V$) 520 within the limit of I-0.000001.

The trial terminal rent ($I_T$) 1023 is divided by the land par value ($L_V$) 520. The land par value equals the future worth of the land sales proceeds ($L_P$) 521 distributed at origination; therefore the quotient of ($I_T/L_V$) represents the return on invested capital at the end of the embedded call term 1012.

Computational constraint #3 (Cell G39) 1019 is $I_{M1}$>= ($I_{M2}$-0.000001); it compares the trial "minimum ground rent 1" ($I_{M1}$) 1013 to the "minimum ground rent 2" ($I_{M2}$) 1014 to determine if the trial "minimum ground rent 1" is greater than or equal to "minimum ground rent 2"-0.000001.

Objective Functions

Setting an objective function 1001 defines the solution sought. For example, one objective function may be to find the minimum mortgage equivalency for minimum ground rent 2 within the limits of the computational constraints. In this example, control 1 1020 tests whether the objective set in 1001 is achieved. Determining the minimum mortgage equivalency relies on the system's ability to change the decision variables (collectively in 1022). The computational constraints 1017, 1018, and 1019 manage the values of the decision variables by setting bounds to acceptable results.

Control 1: =MIN(Mortgage Equivalent) (Cell G34)

The objective is to find the absolute "minimum" mortgage equivalency ($M_E$) (Cell E38) 1021 possible within the limits of the computational constraints by changing the decision variables.

Decision Variables

The illustration lists the market ground rent ($I_L$) (Cell G16) 1003 and the cScore (Cell G18) 1010 as the decision variables. As mentioned above, changing these variables change the dependant results within the bounds set by the computational constraints.

Decision Variables=COUNT($I_L$, cScore)(Cell G35)

The pricing mechanism employs computational constraints 1017, 1018 and 1019 to set limits, maximize or minimize or otherwise adjust decision variables to achieve the "optimal solution". A "globally optimal solution" is one where there are no other feasible solutions with better objective function results. This differs from a "locally optimal solution" where there are no feasible solutions within the range of the objective function values and a "best fit" solution returns. In some instances more than one solution is possible so the method returns the best of the "locally optimal solution" options.

Gathering Minimum Marketplace Information

The interim pricing mechanism employs comparable and consistent property specific and marketplace information to accurately value and price registered land asset elements.

Property specific information relating to the subject land parcel is necessary and may come from an independent and supportable real property appraisal report, or from comparable transactions. The appraisal report should support conclusions for at least two of the three market research results listed below:

"Market Ground Rent" as a net operating income ($I_L$) 1003;
"Land Capitalization Rate" ($R_L$) 1004; and
"Fee simple Land Value" ($V_L$) 1005.

In addition, at least three local market-underwriting factors that are relevant as of the time of the transaction 1011 are considered. These three factors come from contractual requirements between the sponsor representing capital investors and the originator, who must enter the factors into the pricing mechanism. The factors are:

Investor "cost of funds rate" (I) 1006 as of the underwriting date;

the cost of funds rate is determined for a period equal in duration to any embedded call term 1012;

actual or prevailing leasehold mortgage terms 1007 needed to develop a debt constant (f) as of the underwriting date 1011; and the contract "land value appreciation rate" ($R_A$) 1008 for the embedded call term 1012.

Validating Appraisal and Market Evidence

A market land value appraisal report 501 is a research study of historical marketplace activity. The appraisal report is the analysis of that marketplace activity and its impact on the resulting property value reconciliation. An underwriter reviews appraisals and other contributing property related reports to validate reconciliation rational and conclusions. These techniques draw from known or previously reported marketplace data 511 and 514 filtered for informational quality and materiality. In accordance with the pricing mechanism, these techniques together with historical data should validate or supplement appraisal results 1009 if reported information is sparse or deemed unreliable by an underwriter. As the ability to capture transactional information broadens, and reliable data accumulates, application methods and formulations will expand as will the scope of data and data combinations by various designated geographical boundaries. These formulas and techniques are an integral part of the appraisal review process, specifically to confirm the usefulness of a market ground rent (NOI) ($I_L$) 1003, a land capitalization rate ($R_L$) (1004) and/or a fee simple land value ($V_L$) 1005 appraisal conclusion.

Market Ground Rent

Market ground rent/NOI ($I_L$) 1003 is the rental income expectation (net of land expenses) for the right to use or occupy the subject land parcel(s). The appraiser must demonstrate adjustments for market forces and other conditions that make comparable and competing rents consistent to the subject land before conclusions are taken as a reliable determinant of obtainable market ground rents, rents the subject parcel might draw as of the valuation date.

After adjusting market ground rents for land expenses paid by a leaseholder, the resulting market rent or net operating income (NOI) 1003 is the income to the land available as a return on capital investment. Principal return, or return of investment, is in the embedded call settlement price ($L_S$) 523 paid on the final anniversary of the purchase option term 1012.

The pricing mechanism uses the NOI ($I_L$) to set the upper limit of marketplace income potential to the land. Absent reliable and timely market land rental data, one technique to approximate market ground rent 1003 is to multiply the fee simple land value ($V_L$) 1005 by an appropriate land capitalization rate ($R_L$) 1004.

Where: net operating income $(NOI)\ I_L = V_L \times R_L$

Land Capitalization Rate

The land capitalization rate ($R_L$) 1004 is a market-derived factor adjusted to local market conditions as of the time of use; it reflects anticipated marketplace returns of and on a property investment adjusted for economic variables influencing its local marketplace and prescribed underwriting data. The appraiser may use a basic capitalization rate or an expanded capitalization rate to mathematically solve for the land's market value given reliable income data. Typically, the appraiser relies on time sensitive and verifiable local market sale prices and rents to derive competing basic capitalization rates. Given reliable land values and market rents, the appraiser can extract the indicated capitalization rate for a number of competing real estate transactions as of the valuation date 1011.

To estimate a land capitalization rate 1004 for a given property divide its market ground rent ($I_L$) 1003 by its fee simple land value ($V_L$) 1005.

Where: $R_L = I_L / V_L$.

Fee Simple Land Value

The appraisal report 501 must indicate the process the appraiser employed to determine the fee simple land value ($V_L$) 1005. A fee simple land value is the absolute upper limit the pricing method might indicate an investor pay in land sale proceeds 521 in exchange for a registered land asset contract 502. Each registered land asset has a targeted investment value that is its land par value ($L_V$) 520.

The fee simple land value may also be expressed in the form of a ratio; the fee simple land value divided by the greater of the total appraised property value or contract sales price, resulting in a "land-to-value" ratio.

Absent competing property or property specific transaction data, dividing an appropriate land capitalization rate 1004 into adjusted market ground rents 1003 from competing properties should generate an approximate fee simple land value 1005 for each. The results can be further evaluated for comparability and consistency.

Where: $V_L = I_L / R_L$

Assigning a cScore

Assigning a cScore 1010 relating to a property underlying a registered land asset includes calculating a cScore factor derived from valuing economies and diseconomies brought about by externalities impacting the locus. In the absence of sufficient community data, the interim pricing method automatically approximates the cScore given certain material inputs.

The cScore factor should vary for each embedded call term N 1012 that an originator might offer within a specific community. The cScore algorithm enables registered land asset pricing in the absence of historical transactional data. An initial cScore factor typically a known approximation is assigned which is always expressed as a positive value that is a percentage of one.

The cScore factor 1010 and the market rent $I_L$ 1003 are the two primary decision variables the method relies upon for its conclusions. The pricing method self-adjusts these primary decision variables to solve for the objective function 1020. In the process of calculating a cScore trial result, each change to the cScore varies the resulting value of any dependant calculation that relies on the market rent $I_L$ 1003 value. The pricing mechanism will automatically adjust the cScore and the market ground rent values within the bounds of the computational constraints 1017, 1018, and 1019 until the method converges on the most favorable objective function 1020 result, the minimum mortgage equivalency 1021.

Minimum Ground Rents

A community market ground rent (NOI) ($I_L$) (Cell G16) 1003 is a dynamic value; it changes as market conditions change over time. In accordance with the pricing mechanism, an initial market ground rent value is assigned as of the origination date that is greater than zero dollars.

The market ground rent source may be an independent land value appraisal 501 by a licensed real property appraiser as of the origination date 1011, or an underwriter may justify a market rent from transaction review data. The pricing mechanism should calculate and then automatically adjust the initial market ground rent (NOI) entry and cScore entry until the method concludes on a dollar amount necessary to support the resulting land par value ($L_p$) 520 and other value and price conclusions, given marketplace variables 1006, 1007 and 1008.

The pricing mechanism employs two competing functions to establish its final minimum ground rent conclusion referred to herein as "minimum ground rent 2". As stated above, the method calculates then compares the results of two competing functions, repeating the calculation and comparison process by repeatedly inserting trial values for the cScore 1010 and market ground rent 1003 (collectively in 1022) until the operational constraints governing the process are met. The resulting periodic installment (typically monthly) represents the theoretical minimum rent land within this community may likely generate irrespective of appraisal conclusions.

The final "minimum ground rent 2" candidate is the lowest possible net operating income the land must be capable of producing, which the method concludes has sufficient capacity to meet the invention's underwriting criteria as of the specific underwriting date 1011.

Minimum Ground Rent 1

The minimum ground rent 1 ($I_{M1}$) 1013 function calculates a monthly installment derived from the remaining land value after the cScore adjustment. This becomes the value of a theoretical minimum ground rent that the land should generate and may be the basis of comparison in the "minimum ground rent 2" ($I_{M2}$) 1014 calculation below.

The cScore value (Cell G18) 1010 should automatically calculate and adjust the resulting "minimum ground rent 1" until the purpose given to the objective function 1001 is met and consistent with the computational constraints 1017, 1018 and 1019.

The formula is: the appraised fee simple land value ($V_L$) 1005, less the product of the land value 1005 times the cScore 1010 which results in a numerator that is further divided by the product of the future worth of $1 per period with Interest (factor 2) times its base factor. The denominator represents the future worth of one dollar per period with interest, paid in advance, at the cost of funds ($CoF_{IN}$) discount rate 1006.

The minimum ground rent 1 ($I_{M1}$) formula is:

$$I_{M1} = (V_L - (V_L \times cScore))/((1+i) \times ((1+i)^n - 1)/i))$$

Where:

$V_L$ = fee simple land value;

cScore = A dynamic value as a percentage of 1 that is greater than 0;

i = The effective cost of funds interest rate;

n = effective embedded call term ($N \times N_C$).

Minimum Ground Rent 2

The minimum ground rent 2 ($I_{M2}$) function 1014 evaluates the greater of a minimum ground rent 1 1013 or a monthly market ground rent 1003 after adjustment for being paid in advance (the product of the initial market ground rent ($I_L$) times the base factor for the $CoF_{IN}$ rate 1006). If minimum ground rent 1 is greater than or equal to the monthly market ground rent paid in advance then the method uses minimum ground rent 1 1013, otherwise, it calculates then carries forward the market rent paid in advance to computational constraint #3 1019 for further evaluation.

Should the final minimum ground rent 2 ($I_{M2}$) 1014 be greater than the market ground rent ($I_L$) 1003 specified in the appraisal report (or a market ground defined by an underwriter) the mechanism will notify 1016 the user of this result. This circumstance may be an underwriting concern.

The formula is:

$$I_{M2} = \text{If } (I_{M1} >= ((I_L/N_C) \times (1+i)), I_{M1}, \text{ else: } ((I_L/N_C) \times (1+i)))$$

Where:

$I_L$ = market ground rent;

$N_C$ = compounding periods;

i = the effective cost of funds interest rate $I_{M1}$ = minimum ground rent 1.

The mechanism should test the minimum ground rent 2 comparison results employing computational constraint #3 1019. Computational constraint #3 is set prior to calculation to establish the relationship between the two monthly rents, minimum ground rent 1 1013 and minimum ground rent 2 1014. For example, the setting below is for illustrating this.

The setting for computational constraint #3 is:

$$I_{M1} >= (I_{M2} - 0.000001)$$

Where:

$I_{M1}$ = minimum ground rent 1;

$I_{M2}$ = minimum ground rent 2.

Computational constraint #3, in this example, ensures minimum ground rent 1 ($I_{M1}$) (Cell E35) is greater than or equal to the sum of minimum ground rent 2 ($I_{M2}$) (Cell E36) minus 0.000001.

A false conclusion for computational constraint #3 will trigger the pricing mechanism to recalculate the minimum ground rent functions. A false answer should cause the pricing mechanism to adjust 1022 the values for cScore factor 1010 and/or the market rent ($I_L$) 1003, the two decision variables, and to recalculate all functions until the terms of constraint #3 1019 are met.

Once constraint #3 is true, minimum ground rent 2 becomes the trial minimum ground rent candidate to measure the mortgage equivalency 1021 value of the minimum ground rent 2 periodic installments.

Mortgage Equivalency Value

Figure 10B:
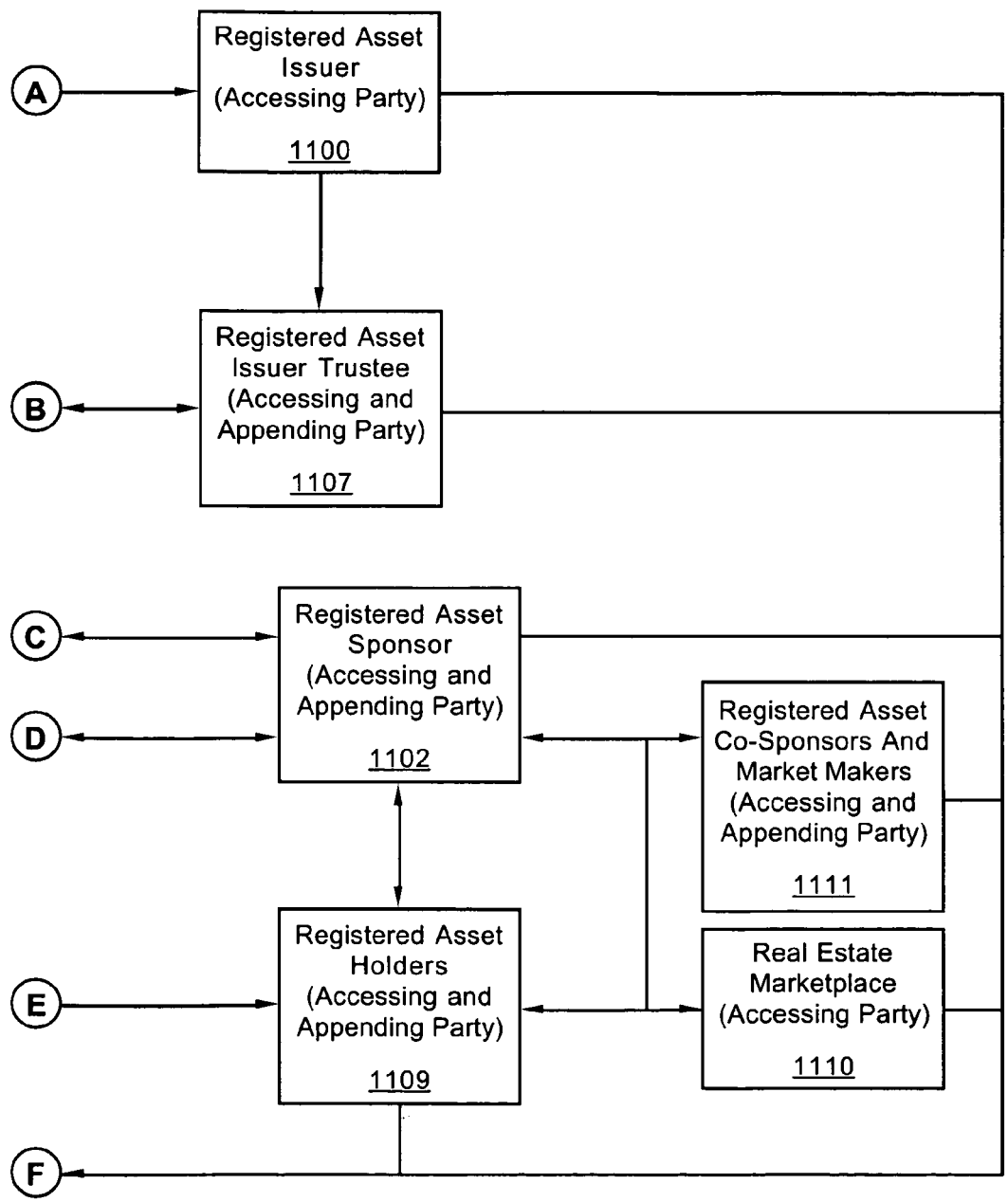
FIG. 10 is a block diagram illustrating a system for providing a registered land asset.

The mortgage equivalency calculation ($M_E$) (Cell E38) 1021 results in a quotient produced by dividing minimum ground rent 2 1014 by the mortgage debt constant (f) derived (as shown in FIG. 10 as a subroutine by the dotted line between block 1007 and 1021) from actual or prevailing mortgage terms 1007.

Mortgage equivalency is determined in order to measure the substitute economic value the minimum ground rent 2 1014 installments represent. By comparing what the imputed minimum ground rent 2 1014 installments could buy if put into a substitute mortgage loan opportunity calculated at an actual or prevailing mortgage rate and duration, the pricing mechanism illustrates any economic advantage the leaseholder gains by exchanging the land for cash. Following a test in accordance computational constraint #3 1019, minimum rent 2 (1014) should be the numerator in the quotient.

The mortgage debt constant (f) (Cell G32) is factor 6 (see Appendix B). Factor 6 is a mathematical representation of an "ordinary annuity" that has a present value of one dollar as a level periodic installment, which will pay interest and provide full amortization or recapture of an investment of one dollar at the actual or prevailing mortgage terms 1007 quoted at origination. The mortgage debt-constant and the cost of funds ($CoF_{IN}$) rate (Cell E29) 1006 should share the same "marked-to-market" date.

The formula to determine a mortgage equivalency value is:

Mortgage equivalency value=$I_{M2}/f$

Where:

$I_{M2}$=minimum ground rent 2 (Cell E36)

The formula for the mortgage debt constant (Cell G33) is:

$f=(R_M/N_C)/(1-(1/(1+(R_M/N_C))^\wedge(N_C \times N_M)))$

Where:

$R_M$=annual mortgage interest rate, (of equal date to $CoF_{IN}$);

$N_M$=mortgage amortization term;

$N_C$=installments per year.

By dividing minimum ground rent 2 ($I_{M2}$) by the mortgage debt constant (f), the result is the total cash proceeds obtainable if the periodic installment $I_{M2}$ 1014 were applied as a mortgage installment at market or quoted mortgage terms. The mortgage interest rate and amortization term should be the prevailing terms as of the date of origination 1011.

The Mortgage Equivalency Test

The mortgage equivalency (computational constraint #1 1017) test determines if the mortgage equivalency value 1021 is less than or equal to the land sale proceeds ($L_P$) 521. Land sale proceeds are the funds paid to the leaseholder at the land title closing and title transfer.

The mortgage equivalency ($M_E$) calculation repeatedly and progressively reduces minimum rent 2 ($I_{M2}$) 1014 within the limits of the computational constraints until the lowest possible mortgage equivalency value 1021 is found.

Minimizing Mortgage Equivalency

As stated above, the goal of the objective function, which will be tested in accordance with control 1 (Cell G35) 1020, is to seek the absolute "minimum" possible mortgage equivalency (ME) value (Cell E38) 1021, which falls within the limits of the computational constraints.

The objective function responds to initial decision variable inputs (Cell G36) 1001. In accordance with the pricing method the decision variables ($I_L$ in Cell 16, and cScore in Cell G18) 1010 and 1003 are adjusted (collectively in 1022) until the computational constraints (Cells G37, G38, G39) 1017, 1018 and 1019 try and test out each computation result until the method narrows the set of possible answers down to the most feasible result.

The objective function drives the pricing mechanism method to find the "minimum" mortgage equivalency value by recalculating for mortgage equivalency each time computational restraints return values outside of set limits. A new market ground rent and/or cScore, the decision variables, are tried 1022 until the most feasible "minimum" mortgage equivalency value is found.

The pricing mechanism relies on computational constraint #1 (Cell G36) 1017 to monitor each mortgage equivalency value 1021, which is subsequently compared to a computational value for land sale proceeds ($L_P$) (Cell E41) 521 to determine if the mortgage equivalency value is less than or equal to the land sale proceeds value. The pricing mechanism calculates the embedded call 522, the land par value 520, and finally the land sale proceeds value for each trial until computational constraint #1 is satisfied. The relationship between the land sale proceeds and computational constraint #1 is illustrated by the dotted line between blocks 521 and 1017 as a subroutine of the pricing mechanism.

The formula for computational constraint #1 is:

Computational constraint #1=$(I_{M2}/f)<=L_P$(Cell G37)

The Embedded Call

To determine the land par value ($L_V$) the method must first determine the embedded call ($L_C$) value (Cell E39). The embedded call ($L_C$) value (Cell E39) 520 is the product of minimum ground rent 2 ($I_{M2}$) value (Cell E36) 1014 times factor 2 (Cell E33).

Factor 2 (see Appendix B) is the future worth of $1 per period with interest discounted at the Cost of Funds ($CoF_{IN}$) terms 1006. Factor 2 represents the total accumulation of principal and interest for a series of "minimum ground rent 2" installments per period ($I_{M2}$) 1014 for a given number of periods ($N \times N_C$) (Cell E30×E31) with interest at the $CoF_{IN}$ effective rate per period 1006.

Calculating the Embedded Call

The value assigned to the embedded call ($L_C$) 522 equals the product of minimum ground rent 2 ($I_{M2}$) 1014 (Cell E36) multiplied by factor 2, discounted at the $CoF_{IN}$ rate 1006 established at origination (where $CoF_{IN}$=I). The resulting product is a lump sum representing the value of the embedded call.

Factor 2, the future worth of one-dollar per period with interest, is a level periodic investment of principal and interest into a series of deposits or installments of one dollar per period for a given number of periods with interest at an effective rate per period. Thus, the embedded call formula is:

$L_C=(I_{M2} \times ((1+i)^n-1)/i)$

Where:

$I_{M2}$="minimum ground rent 2";

i=the effective investor cost of funds interest rate;

n=effective embedded call term ($N \times N_C$);

The Land Par Value

The land par value ($L_V$) (Cell E40) 520 equals the market land value ($V_L$) (Cell G14) 1005 less the embedded call value ($L_C$) (Cell E39) 522. Computational constraints cause the land par value computation to repeatedly recalculate for each trial monthly minimum ground rent 2 value ($I_{M2}$) (Cell E36) 1014 until computational limits are met.

As previously stated, minimum ground rent 2 must first comply with computational constraint #3 1019 before its resulting value becomes the basis for the embedded call value 522 calculation employed to establish a trial par value.

Similarly, computational constraint #2 1018 evaluates each calculated land par value ($L_V$) 520 result by dividing terminal rent ($I_T$) (Cell F29) 1023 by the land par value to ensure the resulting yield ($CoF_{OUT}$) is consistent with the cost of funds rate ($CoF_{IN}$) 1006 set at origination. If computation constraint #2 is not met, the pricing mechanism adjusts the decision variables and calculates a new par value.

As illustrated within the sample embodiment of Appendix C, computational constraint #2 1018 is satisfied when the formula $((I_T/L_V)-I=-0.000001)$ is true. Cell E37 evaluates the result of Cell F29 $((I_T/L_V)$ minus Cell E29 ($CoF_{IN}$) 1006 to determine if the sum satisfies a physical restraint of a minus −0.000001. Thus in accordance with computational constraint #2 1018, the quotient of terminal rent ($I_T$) (Cell F28) 1023 divided by the par value ($L_V$) (Cell E40) 520 less the annualized cost of funds in ($CoF_{IN}$) rate 1006 determined at origination should not deviate more than a minus −0.000001.

The formula to determine the par value (Cell E40) 520 is:

$$L_V = V_L - (I_{M2} \times ((1+i)^n - 1)/i)$$

Where:
$V_L$=fee simple land value;
$I_{M2}$=minimum ground rent 2;
i=the effective investor cost of funds interest rate;
n=effective embedded call term (N×$N_C$);

The Land-Sale Proceeds

The land-sale proceeds 521 are the present value of the land par value ($L_V$) 520. The land sale proceeds are available to the leaseholder at closing, and the land sale proceeds are the product of multiplying the land par value by factor 4 (again, see Appendix B).

Factor 4 represents the present value of one dollar to be collected at a given future time, discounted at the effective interest cost of funds ($CoF_{IN}$) terms 1006 for the embedded call duration 1012, i.e., the effective number of periods between the origination date 1011 to the embedded call maturity date (N×$N_C$)).

Given a land par value (520) that meets the mathematical limits set by computational constraints, the land sale proceeds formula is:

$$L_P = L_V \times 1/(1+i)^n$$

Where:
$L_V$=land par-value
i=The effective investor cost of funds interest rate;
n=effective embedded call term (N×$N_C$).

Establishing the Terminal Ground Rent

The terminal ground rent ($I_T$) (Cell F28) 1023 is the contract ground rent the lessee will pay if at embedded call maturity the leaseholder does not exercise its rights to acquire the land underlying the leasehold estate.

The terminal ground rent 1023 is the indirect result of minimum ground rent 2 1014 in that minimum ground rent 2 and is a factor in determining the embedded call and the land par value. Whereas, the appraised fee simple land value ($V_L$) less the embedded call equals the par value ($L_V$). The quotient found by dividing the terminal rent by the land par value should equal the "cost of funds in" rate 1006 where $I_T/L_V=I$.

To this end, the market ground rent ($I_L$) is a decision variable is a primary element in the terminal rent calculation. The objective function 1020 causes the pricing mechanism to repeatedly adjust the monthly market ground rent ($I_L$) 1003 and the cScore 1010 value (collectively in 1022) until computational constraints are met and the terminal rent meets the limits of computational constraint #2 1018. In accordance with computational constraint #2, the quotient found by dividing the terminal rent by the land par value, less the cost of funds rate ($CoF_{IN}$) should equal a −0.000001 (Cell G38) 1018.

The relationship of the terminal rent to computational constraint #2 is shown in FIG. 10 by the dotted line or subroutine between blocks 1023 and 1018.

The terminal ground rent 1023 formula (Cell F28) is as follows:

$$I_T = (((I_L/N_C) \times (1+R_A)) \times (1+R_A)^n) \times N_C$$

Where:
$I_L$=market ground rent
$R_A$=effective land value appreciation rate;
$N_C$=installments per year;
n=effective embedded call term (N×$N_C$).

Determining The Embedded Call Settlement Price

Determining the embedded call settlement price 523, due at embedded call maturity, employs the fee simple land value ($V_L$) 1005 and the land value appreciation rate 1008 determined at or prior to origination. The pricing mechanism multiplies the fee simple land value by factor 1 representing the future worth of one dollar growing over the embedded call term at the effective contract land-value appreciation rate ($R_A$) 1008 per period.

Thus, determining the embedded call settlement price:

$$L_S = V_L \times (1+R_A)^n$$

Where:
$V_L$=fee simple land value
$R_A$=effective contract land-value appreciation rate
n=effective embedded call term (N×$N_C$).

Registered Land Asset Underwriting

An underwriter, typically an individual or a computational device or both, gathers, stores, manipulates, reviews and reports on the data presented by an originator to determine its quality, relevance and reliability for underwriting purposes. An underwriting decision to grant or deny should be in writing and detail the rationale in support of the decision.

An underwriter ultimately accepts or rejects 1024 the results. The underwriter should document the reasons for such acceptance or rejection and record the data and resulting decision documentation to the appropriate database preserving the data for future underwriting reference. Stored by RAI if accepted, or if rejected, stored RAI (if known) and by property street address, or other identifier such as an identified community by lot, block and local tax map reference.

The Registered Land Asset Contract

Figure 5:
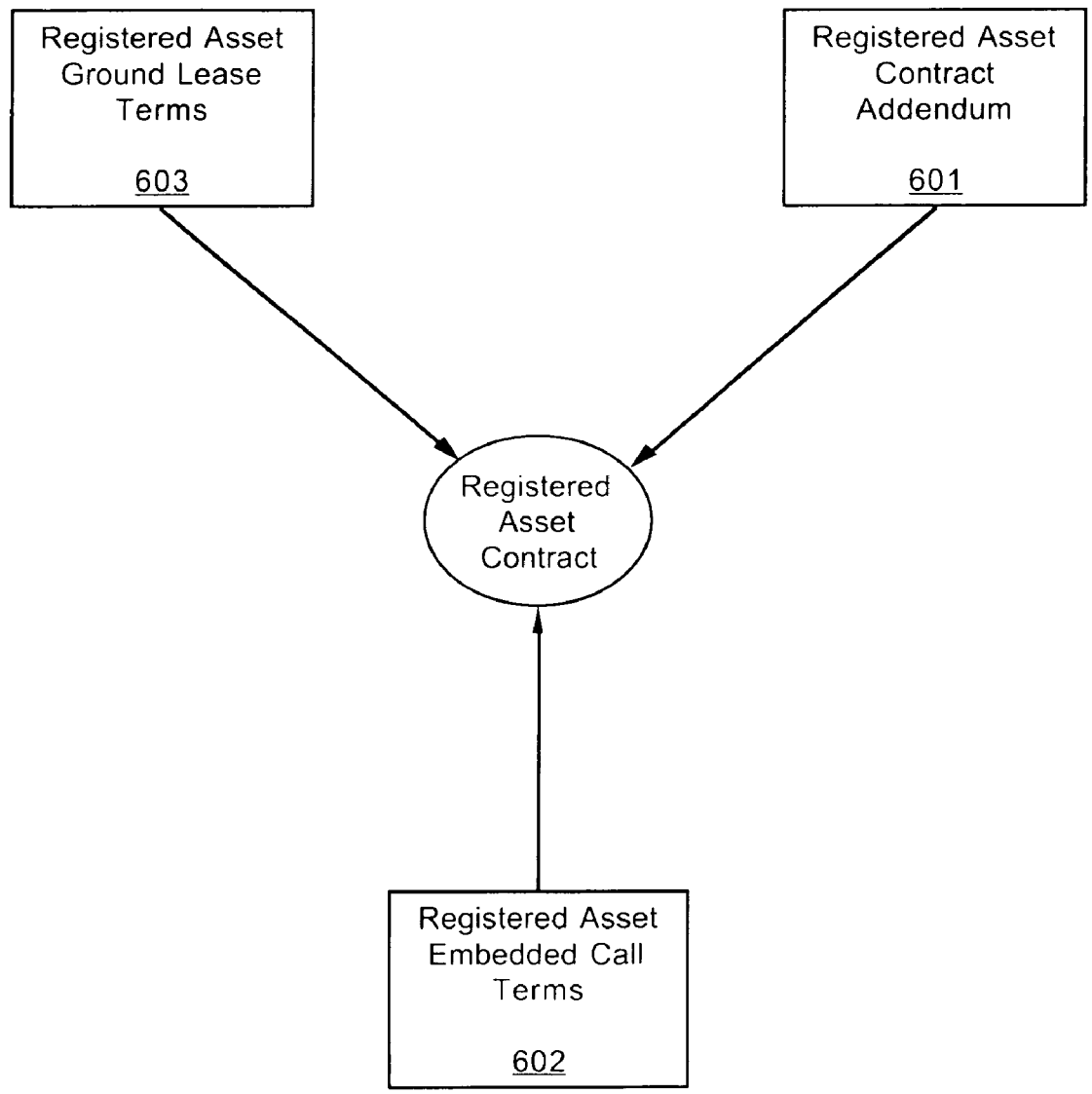
FIG. 5 is a block diagram illustrating possible components of a registered land asset contract.

FIG. 5 is a block diagram illustrating components of the registered land asset contract. The registered land asset contract represents the agreement between the leaseholder and the indenture trustee as land title nominee.

Under the registered land asset contract, the leaseholder should have the right to operate the land, to maximize the economic potential of the leasehold estate's legal use and enjoy the advantages or profits derived from the underlying land owned by another so long as the property is not damaged or altered in any way. All costs associated with leasehold operation may be born by the leasehold estate to include all expenses (e.g., property taxes, betterment assessments, association dues, insurance, permit fees, impact fees, utilities to include water and sewer costs and assessments, and penalties of any type). Resulting operational profits and equity gains flow to the leasehold estate. Any development on the land may become the property of the leasehold estate during the ground lease term. Improvements revert to the land and holder of record at ground lease termination. The holder then becomes the owner of the fee simple land title.

The holder of a free asset, following some predefined time period after expiration of the embedded call, may set the monthly ground rent due. Optional charges may include provisions for a percentage of leasehold production or other terms appropriate for the land use. Notice of contract changes and rental terms should be made to the leaseholder in writing within a time frame set by local laws or as set forth under the registered land asset contract or mortgage contract containing rental escalation provisions in effect. A copy of the notice should be sent to the mortgagee if applicable, to the issuer trustee responsible for the subject registered land asset contract, and to the indenture trustee for registration on the electronic land title registry. All finalized contract changes and rental terms should be posted to the electronic land title registry.

The registered land asset contract terms may be senior to mortgage terms and any subsequent holder assignments may be junior to both. A holder should not be able to disaggregate a registered land asset contract prior to the embedded call expiration, while it remains assumable by a mortgagee or a leasehold estate buyer. Following the final embedded call maturity date, free asset contract rights may be severally assigned upon the recording of each such derivative facility to the electronic land title registry. All derivative rights should terminate and settle when and if the leaseholder of record purchases land underlying its leasehold estate.

The registered land asset contract may be assumable. A subsequent leasehold transferee, who might include the mortgage lender, can take over a leasehold ownership position and benefit from preferential contract terms. When a leasehold estate sells, the transferee may assume the remaining contract life for both the embedded call and the ground lease contract. These transferable rights may provide the new leasehold estate owner the necessary benchmarks for specific performance and land use expectations. The residual rights may serve to facilitate future planning efforts and be the basis of any future land use coordination and labor.

Any registered land asset contract may be sold or traded by its holder. Capital markets may buy, sell and trade various registered land asset contract types. Market makers may establish derivative beneficial interests such as income tranches or may establish such interests by, for example, selling puts and calls on future land title valuations or registered land asset yields. Every electronic land title is held in exchangeable form, such as in an electronic book entry, as a deliverable instrument facilitated by bookkeeping entries to the electronic land title registry with such entries accounting for subsequent transfers of beneficial interests. Local real estate markets may buy and sell various types of registered assets as income producing investment properties. The electronic land title registry keeps track of ownership and notification requirements if the holder decides to sell or to assign beneficial interests.

If a free asset is put up for sale, a notice of sale terms may go to the leaseholder and any registered mortgagee as set forth under contract and the leaseholder or mortgagee may be given priority over a real estate listing. A leaseholder or mortgagee making an offer to purchase the registered land asset underlying its leasehold estate collateral may communicate that offer through a servicing agent or an issuer trustee. The indenture trustee or its agent may communicate with the issuer trustee or servicing agent any counter offer or holder decision of acceptance.

A leaseholder may optionally purchase the free asset contract on the land beneath its leasehold estate via a real estate buyer broker. A real estate agent or broker may list any registered land asset contract. A listing broker through whom the holder offers the registered land asset may have to waive compensation if the leaseholder purchases the free asset, unless a separate contract between the leaseholder and broker replaces the leaseholder's right to acquire the underlying land title directly from the holder without a broker. A real estate agent listing should be on file with the electronic land title registry and the issuer trustee responsible for the subject registered land asset contract should be notified of such a listing.

Registered Land Asset Contract Addendum

A registered land asset contract addendum 601 may be produced for any land acquisition, irrespective of property type. The addendum may be produced in accordance with a RESPA model even though the registered land asset represents a direct purchase of a land title, in cash with no mortgage loan component. RESPA is the "Real Estate Settlement Procedures Act" administered and monitored by the Department of Housing and Urban Development (HUD). RESPA covers loans secured with a mortgage placed on a one-to-four family residential property. These include most purchase loans, assumptions, refinances, property improvement loans, and equity lines of credit. HUD's Office of RESPA and Interstate Land Sales is responsible for enforcing RESPA.

The registered land asset contract addendum 601 lists all fund transfers, fees and charges associated with the registered land asset. These are items such as appraisal and professional fees, tax stamps, real estate brokerage fees, lending origination, title research, recording fees and registered land asset origination costs and distributions. If the property is a one-to-four unit residential property, a HUD approved RESPA statement may also be provided.

The registered land asset contract addendum 601 is produced for each real estate title transfer whether or not a leasehold mortgage is offered by the leaseholder. Transactional transparency prerequisites may require that all registered land asset originators leave an audit trail that is recordable to appropriate database archives and reproducible in the event of any future title challenge.

Embedded Call Terms

Embedded call terms 602 are set at origination. Following embedded call expiration, the registered land asset is a free asset. Its holder may sell a free asset at any time. Further, when the embedded call term expires a ground rent payment may be due to the holder. Registered land asset contract terms may influence the ground rent price and when ground rent payments begin. For example, ground rent payments may be payable in advance of the embedded call expiration date and the ground rent price may be set for a predetermined time period following the embedded call maturity date. After the predetermined time period, the rental amount due may change. Alternatively, the leaseholder may also elect to settle the embedded call terms by paying the embedded call settlement price at maturity, which terminates the registered land asset contract.

As another alternative, the leaseholder may also elect to rewrite a new registered land asset contract following settlement of the preceding contract. This creates a new embedded call contract with prevailing financial terms as of its origination date. Rolling the registered land asset contract over may provide the leaseholder with any excess land value appreciation greater than the contract redemption price. Such an embedded call rollover feature may reduce mortgage loan risks. Both the right to assume the registered land asset contract and the right to reissue a registered land asset contract following the expiration of the embedded call term provide a lender with opportunities to manage collateral risk. In the event the leaseholder causes a ground lease default under its leasehold mortgage financing, registered land asset contract features afford a lender opportunity to protect and realize upon its collateral (the leasehold estate with embedded call and ground lease rights). If a default is due to a breach of lease terms other than financial terms, such as misuse or abuse of the land, the mortgage contract may also be in default, leaving the leaseholder to suffer the remedies prescribed within the mortgage contract if not cured under registered land asset contract terms.

If the market value at the embedded call expiration date is less than the redemption price, the leaseholder may elect not to exercise the embedded call, opting rather to pay a ground rent established at origination, and to bid on the land under free market conditions. After expiration of the embedded call, the leaseholder may have the right to remain on the land as a tenant. Such rights may also be assumable.

The leaseholder may optionally purchase (typically at origination) certain registered land asset contract features that may offer the leaseholder specific rights in the future. One example, the leaseholder may purchase a first right of refusal with respect to the sale of a free asset. This first right of refusal option would provide the leaseholder with notice of a holder's intent to sell the land title to any open market participant, and may also provide the leaseholder with land valuation methods, which may become the basis of price negotiation prior to open market competition. Another example may be an optional land value appreciation contract. This option insures the leaseholder from land value depreciation, due to market or other circumstances, that drive the land's market value below the embedded call settlement price at call maturity.

As discussed above, a mortgage lender holding a leasehold estate lien may have a contractual right to exercise the embedded call if the leaseholder cannot or does not. The mortgagee may have the right to settle the original registered land asset contract to protect its mortgage collateral and then cause the leaseholder to issue a new registered asset. Such action provides the leaseholder time to manage its finances before the next expected maturity date and may limit mortgagee collateral risk.

For example, a mortgagee may hold an adjustable rate mortgage set to roll over on the embedded call maturity date. Combined with the right to re-write and settle an embedded call on behalf of the leaseholder, the mortgagee can roll over the mortgage and add any registered land asset settlement costs or gains to either a new fee simple mortgage or a new leasehold mortgage and registered land asset contract. In either event, if the land call is "in the money" the mortgage loan-to-value ratio should reflect the increased equity captured at embedded call expiration.

If the land value on the final maturity date is greater than the embedded call price, a newly issued registered land asset contract generating proceeds in excess of registered land asset settlement costs may flow to the leaseholder. If the land value at the time is less than the embedded call price, any additional capital costs plus registered land asset contract settlement costs may increase the outstanding leasehold mortgage balance if not paid in cash.

A mortgage lender that opts not to settle and/or renew a maturing registered land asset contract puts its mortgage collateral at risk if the leaseholder fails to meet its contract obligations. For example, a failure to service the lease terms would result in default. A default may result in the indenture trustee taking possession of the leasehold estate, which should clear any lien the mortgage lender may have on the leasehold estate.

The embedded call settlement price does not change if the leasehold estate is sold before the embedded call maturity date. If a mortgage exists, the embedded call rights flow to the mortgage lender under foreclosure who may transfer these rights to the next leasehold estate buyer or, alternatively, purchase the land on the preferential cost basis described above.

Ground Lease Terms

Registered land asset ground lease terms 603 detail the land use rights conveyed to the leaseholder. The ground lease terms may restrict the leaseholder to specific compatible land uses consistent with land location and uses allowable under the law. All ground lease terms are assumable by any subsequent leasehold buyer or mortgage lender exercising its contract rights.

Registered land asset underwriting standards may include ground lease language and contract terms for land use. These may be consistent with a range of underwriting standards that government sponsored enterprises and other secondary mortgage backed obligation product participants put upon leasehold mortgage collateral. Registered land asset underwriting standards and ground lease terms may be adaptable for any land use purpose to include open space, agricultural, multifamily, commercial and industrial land.

Other Registered Land Asset Contract Considerations

The value associated with an assignment of a registered land asset by its holder should not be greater than the registered land asset embedded call settlement price during such time as an embedded call is in force. Any excess assignment value, which exceeds the embedded call settlement price, flows to the holder and/or its guarantors. An acknowledgment by the holder accepting such a limit and liability should be a matter of record on the electronic land title registry prior to any assignment of any beneficial interest in a registered asset. Such acknowledgement should be submitted to an electronic land title trustee, with a date of record preceding any such holder assignment.

The leaseholder should insure the land title, naming the indenture trustee as the insured party for any title insurance policy in effect. This preserves and keeps the title insurance in force irrespective of who holds beneficial interests in the registered asset. In this manner, the holder may be indemnified against loss or damage should matters exist at embedded call expiration that are not shown in the title abstract. The limit of holder indemnification during the embedded call term is equal to the embedded call settlement price; excess insurance payout flows to the leasehold estate. A free asset has no specified contract redemption value; therefore a market value appraisal as of the embedded call settlement date may be necessary to update title insurance coverage to protect both land and improvement property owners.

Large one-off transactions or registered land asset pools organized by any land use, duration or geographic location criteria make it possible for registered land asset pool investors to balance holdings for risk and ownership objectives. Master pools enable single pool tracking and reporting and allow a single set of documents to be used for both term and conduit series.

To change a land use after registered land asset contract origination should require the written permission of the indenture trustee. The leaseholder, at its expense, may give notice to appropriate parties via, perhaps, an issuer trustee. The indenture trustee may initiate any related community land use application that would authorize any variance for such land use application (distinct, perhaps, from home improvements). A substantive change in land use, outside the registered land asset contract land use scope and without written indenture trustee authorization of such change, may result in a breach of ground lease terms and may result in a registered land asset contract default.

In the event of a registered land asset contract default brought about by a leaseholder, any mortgagee of record may receive notice of the impending default from the indenture trustee or its servicing agent. The mortgagee may exercise its right under contract to cure the default by submitting a mitigation plan to the indenture trustee or its servicing agent that, in the opinion of the indenture trustee, eliminates or compensates for the default or compensates for any diminution of land value brought about by any leaseholder action, land use change or any physical or legal changes to the land.

Any diminution of land value brought about by leaseholder action may be cause for default. Deliberate leaseholder actions resulting in a diminution of value will trigger a leaseholder notice to remediate or other legal action brought about by the indenture trustee or its servicing agent. Following a notice to cure, a servicing agent acting in behalf of the indenture trustee may initiate an appraisal or an environmental engineering report at leaseholder expense, to examine and document evidence of leaseholder actions sufficient to support and conclude any diminution of value. Such a conclusion may initiate a mortgagee notice to cure in advance of a notice of default. In any event, the extent of all damages due upon default should not exceed the embedded call settlement price plus expenses.

Mitigating leaseholder damages to a free asset contract may provide the holder of record other options to remediate leaseholder damages and to restore the market land value. Such options could include but are not limited to the greater of an appraised land value as though undamaged or by calculating back to contract issuance the present value of the Holder's land sale proceeds at a prescribed cost of funds rate. Further, a mortgage lender with collateral at risk may initiate remediation efforts at the expense of the mortgagor. Absent a mortgage lien, a leaseholder default should result in the indenture trustee executing a process to remediate, which may include a lien on or taking possession of the leasehold property.

Legal actions resulting in eminent domain, escheat, police powers or zoning restrictions (inverse taking or other public taking during the embedded call term) should entitle the holder to the same remuneration terms as an early retirement call described above. Excess value attributed to the land should flow to the leasehold estate unless otherwise provided for under contract provisions. A free asset holder should be entitled to the full land value received in settlement of such actions.

The Registered Land Asset Closing and the Electronic Land Title Registry

The registered land asset closing process is the actual land title conveyance following origination and registered land asset contract agreement. The registered land asset closing brings together all documentation relevant to the bifurcation and transfer of property rights.

If an optional leasehold mortgage is given on the improvements above the land, the mortgage lender may prepare its own and separate documentation for that purpose. Such documentation may include the HUD settlement statement for any one-to-four family residential mortgage given. If a PPLM is used, then a single set of documentation may provide the leaseholder a single resource to all documents, including the HUD settlement statement if applicable, and the lender certain proprietary contract provisions, such as the early retirement call and other provisions, as noted above.

The registered land asset contract addendum, together with the HUD settlement statement (if applicable) should account for all property settlement distributions and adjustments transferred between parties during the closing procedure. Registered land asset cash settlements may be in electronic fund transfers where and whenever possible. All financial distributions may be drawn from escrowed funds consistent with terms detailed in the HUD closing settlement statement and/or registered land asset contract addendum.

The leaseholder or its agent should deliver a good and marketable land title ready for land court registry recording. That is, the land title and deed should be free of all liens, clear of all claims and insurable under an individual land title insurance policy or under a blanket registered land asset insurance policy. As noted above, the cost of insurance may be borne by the leaseholder unless otherwise agreed to by the sponsor or its agent.

Immediately following the title exchange and financial settlement, two real property titles, one for the land (the leased fee title) and one for the improvements on the land (the leasehold estate title) exist. Legal and mechanical processes known in the art may be used to transfer and record the leasehold and land titles in a local land court registry to consummate a "true sale" of real estate interests.

The indenture trustee (or its agent) records its land title deed (the leased fee title) at the appropriate local land court registry. The leaseholder may also record the leasehold estate title, the embedded call, and the ground lease contract rights at the local land title registry where such recordings are permitted.

Recording the leased fee land title in the local land court registry serves to confirm the registered land asset contract date, from which subsequent anniversary dates may be measured. The registered asset identifier (RAI) should also be recorded at the local land court registry. The leased fee title, once recorded in a local land title registry, is registered (generally by the indenture trustee) in the electronic land title registry naming a holder to receive the beneficial interests from the registered asset. The registered land asset contract is also registered in the electronic land title registry as a land title encumbrance. Note that the holder of record in the electronic land title registry may also be the sponsor of the registered land asset transaction. The local land court title abstract, deed and RAI are also recorded in the electronic land title registry.

The electronic land title registry may be a special purpose entity ("SPE"). A registered land asset contract holder may be a variable interest entity ("VIE") and each registered land asset contract may be a consolidated variable interest within the SPE. The SPE may be a corporation, a grantor trust or other trust or a limited liability company. Each registered land asset contract comprises certain variable interests in assets and liabilities that flow to the capital investor as the holder and primary beneficiary. The SPE has no financial stake, other than management fees, in any registered asset. The SPE may contain a plurality of registered land asset contracts, each a free and clear land title encumbered by a registered land asset contract, each a variable interest within the SPE. The SPE should not have voting or similar rights in any real estate investment decisions. In this manner, the registered land asset is shielded from actions in bankruptcy and actions brought by creditors of the parties having an interest in the registered asset.

The SPE, under management of an electronic land title trustee as registrar, exists to record settlements between parties wishing to convey registered land asset interests. The indenture trustee records conveyances of discrete registered land asset interests associated with each RAI it manages by recording all conveyances between buyers and sellers of beneficial interests in a registered land asset contract. The indenture trustee consolidates and reports all expected losses and expected returns due a holder of a registered land asset interest, no matter the financial form these expected losses and expected returns take. The indenture trustee holds no beneficial interest in any registered land asset contract and lacks rights to receive residual returns beyond any contractually specified servicing fees. An issuer trustee may represent the originator and/or the leaseholder, providing a way for these participants to interact or arbitrate with the electronic land title registry registrar, indenture trustee, sponsor and/or holder. A transfer of assets within the SPE may be governed by local, state, federal or international laws and rules associated with such a transfer.

The RAI assigned to a particular registered land asset should also be recorded in the property transaction database such that it is linked to all relevant documentation that may be put into electronic format and stored in electronic form. The registered land asset contract addendum is part of that documentation as are all signed leaseholder disclosure statements and contracts.

The indenture trustee may delegate the servicing of a registered land asset contract to a servicing agent. The servicing agent may become the primary contact through which the leaseholder communicates with the indenture trustee. Typically, the servicing agent is responsible for monitoring the registered land asset contract terms and related financial transactions. The servicing agent may transmit registered land asset specific activity to the indenture trustee, and record such activity electronically on various network storage sites designated by the indenture trustee (such as, for example, the property transaction database and/or the location characteristics database).

A leasehold mortgage lender, when recording its mortgage liens on collateral subordinated to any registered asset, should file with the electronic land title trustee for the right to receive legal notices. If no such filing is on record at the electronic land title registry, then the mortgagee may send notice to the appropriate servicing agent or issuer trustee to communicate its desire to establish legal notification of actions that affect the registered land asset underlying its mortgage collateral.

Any registered lien holder wishing to initiate the purchase of a registered land asset land title underlying its collateral may contact its issuer trustee or a servicing agent if one exists, of its desire to acquire the registered asset. The issuer trustee or servicing agent may communicate with the indenture trustee representing the holder with written copy sent to all registered lien holders as evidence of such notification.

The indenture trustee may notify the leaseholder and registered lien holders when and if the free asset land title becomes available. Any offers to purchase the free asset which are offered by the leaseholder, mortgagee or registered lien holder may be received by the issuer trustee or servicing agent. A leaseholder, mortgagee or other registered land asset lien holder purchase offer may be given priority over a real estate brokerage listing.

Figure 6:
FIG. 6 is a block diagram illustrating a method for establishing an electronic land title registry in accordance with yet a further embodiment of the invention.
Figure 7A:
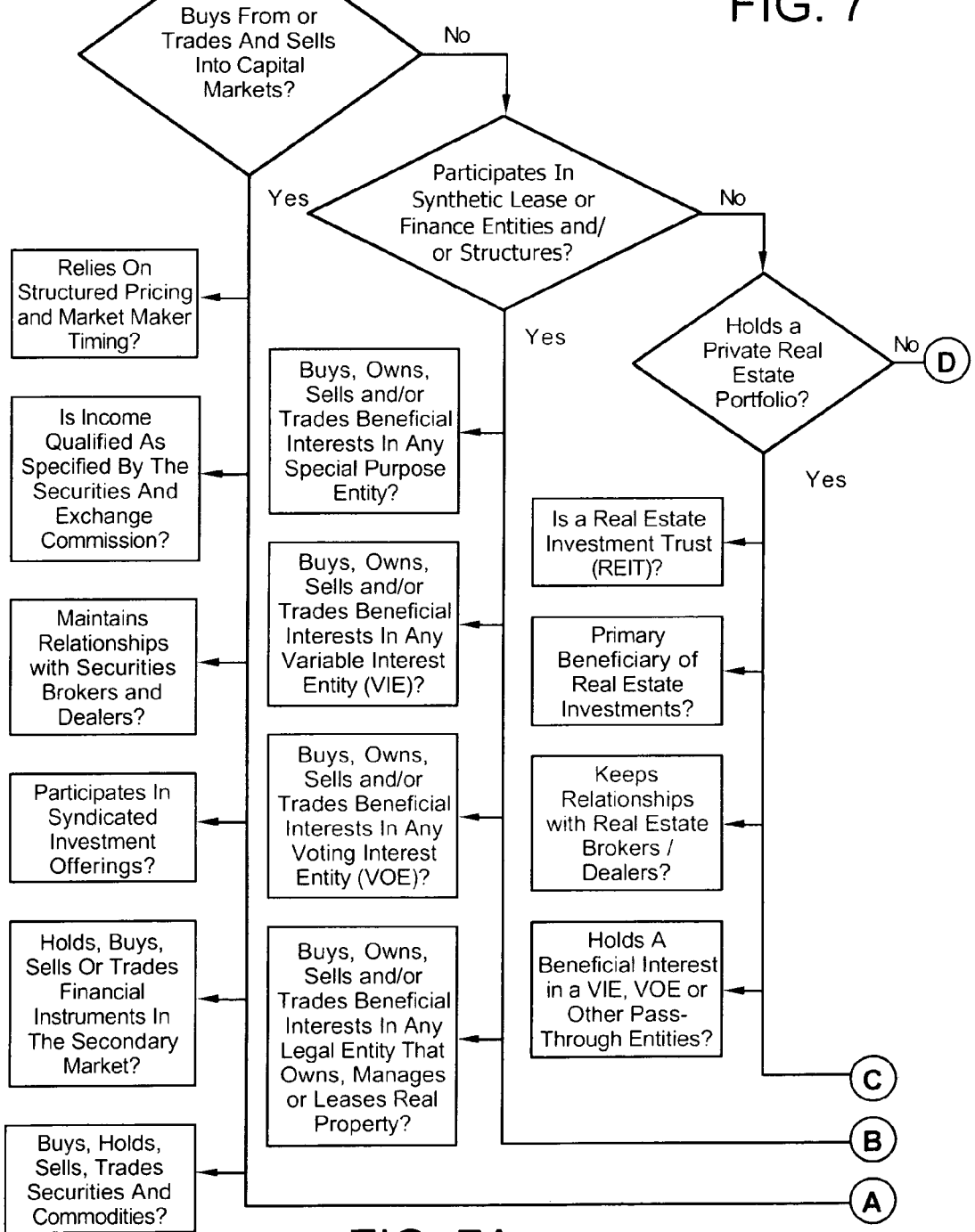
FIG. 7 is a block diagram illustrating examples of registered land asset investor qualifications and considerations.
Figure 7B:
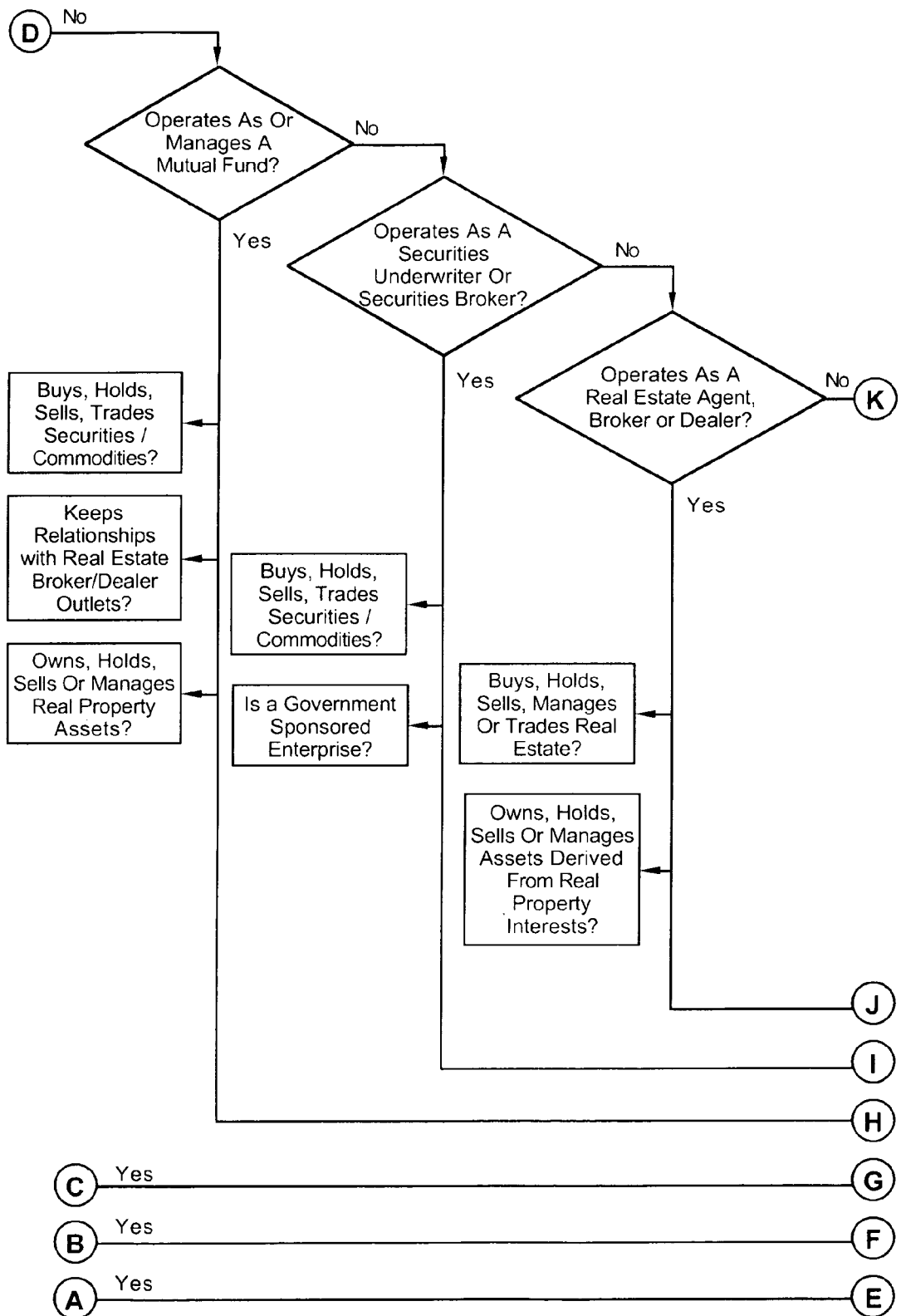
Figure 7C:
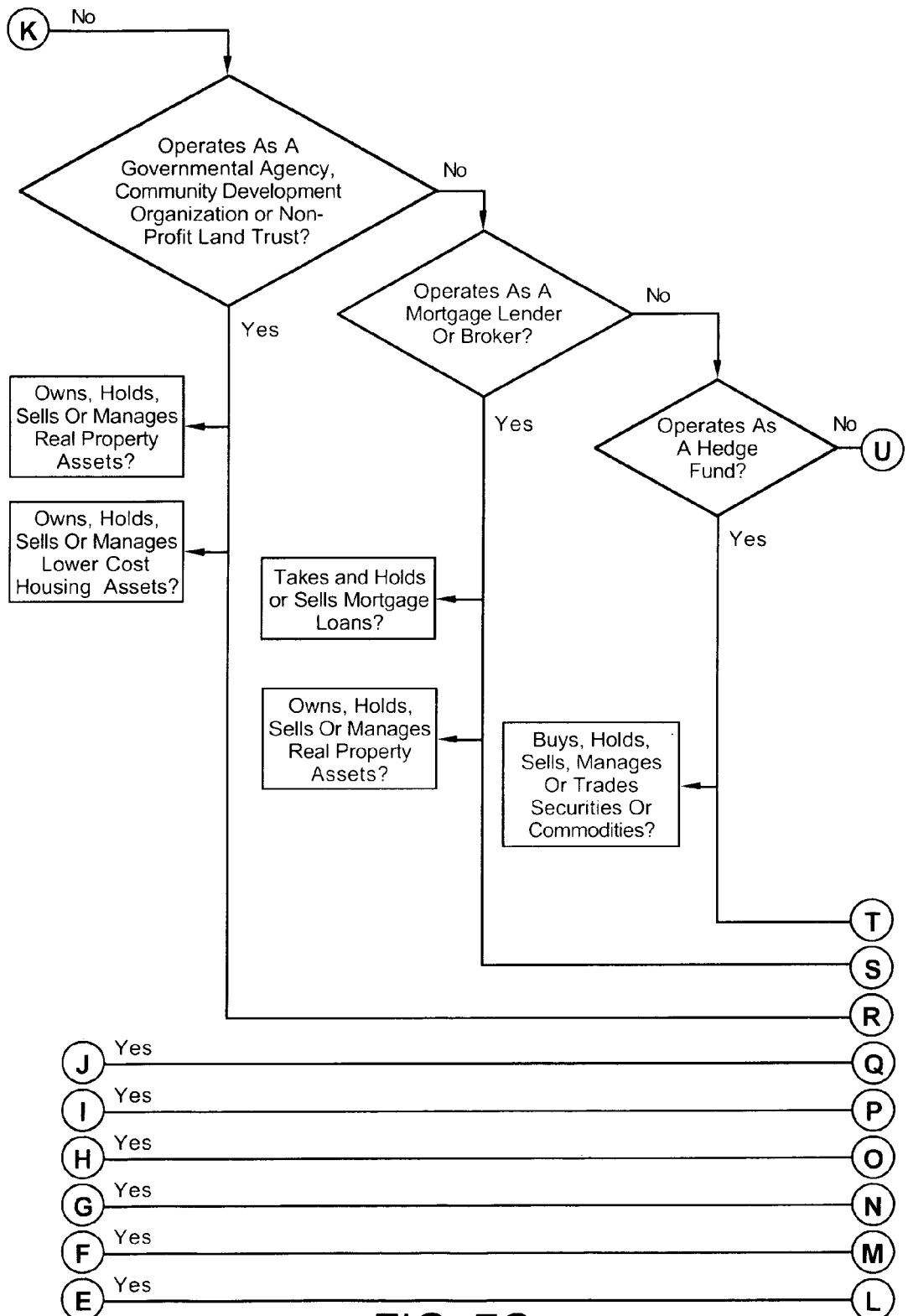
Figure 7D:
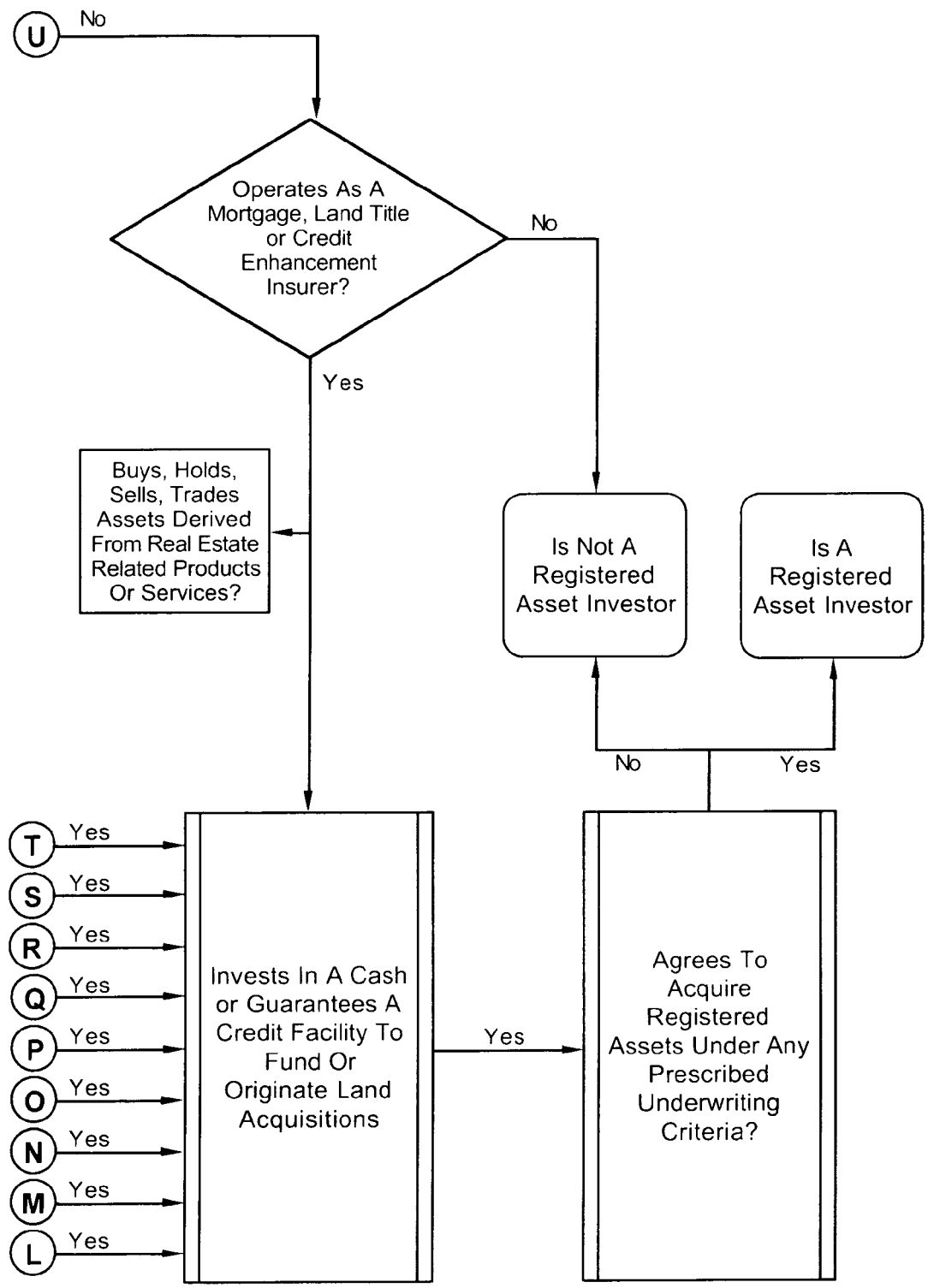

FIG. 6 is a flow chart illustrating a method for establishing an electronic land title registry in accordance with yet a further embodiment of the invention. A land title deed and a RAI related to the land associated with the registered land asset are recorded 701 in a local land title registry. The RAI is stored 702 in a database in communication with a computer network, such as the electronic land title registry. The stored RAI may then be appended 703 to include information relating to the registered asset.

Electronic Land Title Registry Functions

An electronic land title trustee may manage the electronic land title registry and maintain electronic land title records for all registered land asset contract transactions. Ownership rights may be given seniority in accordance with the time one is sold, resold, traded or exchanged. This enables capital market and the real estate market participants to efficiently sell, trade, or hold the land titles without impacting the rights of a leaseholder occupying the underlying land.

Among other purposes, the electronic land title provides means for: tracking registered land asset contractual rights and reporting; tracking the ownership of and changes to beneficial interest in the registered land asset contracts obligations and receipts; tracking the ownership and changes to leasehold estate interest under a registered land asset contract (such as land use changes and other amendments to the original lease and contract agreements); and maintaining the recorded data to facilitate registered land asset release.

The electronic land title registry also serves to facilitate registered land asset liquidity and to streamline the land title tracking process by using electronic registration to eliminate paper. All registered land asset contracts issued in the United States, and in territories and countries where registered assets are legally issued should be registered in the electronic land title registry system. The electronic land title registry serves to maintain the indenture trustee as the nominal owner on record no matter how many times registered land asset contract rights trade or its beneficiaries change.

The electronic land title registry provides means to track subsequent ownership transfers of and encumbrances on each individual registered asset, until its final settlement, wherein the indenture trustee may file an electronic land title discharge and the land returns to a fee simple estate. The electronic land title registry also serves to simplify investor certification and due diligence requirements via information transparency. Such transparency enables proactive risk assessment and improves risk management for investors, broker/dealers, interim funding/warehouse sponsors and investors. Such transparency also facilitates effective management of registered land asset contract pools. The electronic land title registry provides real-time/on-line access to registered land asset information, resulting in faster trading responses that make capital market trading of real property interests efficient.

The electronic land title registry should receive legal service of process relative to foreclosure filings, tax liens, or lease default by RAI. Notices of legal actions may be imaged and forwarded, where appropriate, to the indenture trustee, servicing agent, and others requesting notice from the electronic land title registry. A servicing agent, perhaps acting through a resolution from the SPE and with authorization from the indenture trustee, takes lease default actions in the name of the holder.

The indenture trustee may certify officers of the servicing agent to execute the estoppel certification, lien releases, and deed and title transfer documents. The servicing agent, with authorization from an indenture trustee, may prepare and file lien release and title transfer documents to the local land title registry.

The electronic land title registry may employ stringent security controls so that only the transaction participants that own, service or have a security interest in the registered land asset contract have the capability of updating the data. The electronic land title registry may also employ security controls limiting data access to a "need to know" basis. Integrity controls may provide authorized transaction participants with electronic confirmation of all data submissions through the use of time/date stamps and journaling. The electronic land title registry may also serve to provide audit trails to ensure confirmation of notification from appropriate parties.

In addition to the basic online data service and other services described above, the electronic land title registry may serve to provide reporting on a periodic or ad hoc basis by VIN and password access to the relevant network databases (such as the property transaction database for trustees, settlement agents, and other vendors). Lower level access privileges may be provided to other market participants like real estate brokers and the general public. Browser-based, secured access may be provided to sponsors, title companies, county recorders and others in the electronic land title registry vendor network with dynamic links to vendor sites (if applicable). Customer service/technical vendor support may be provided through interactive systems to include frequently asked questions and email response and other value-added services.

As noted above, accredited lenders and other participants in the mortgage finance industry may originate registered land asset contracts and the electronic land title registry offers these participants new revenue opportunities. Title industry and settlement agents benefit because the electronic land title registry provides easy access to land title information. Local land title registry researchers and recorders benefit from the electronic land title registry by subscribing to electronically transmitted land title transfer data. Leaseholders benefit from the electronic land title registry because the electronic land title registry provides real-time access to the issuer trustee or current servicing agent and expedites communication between parties.

Registered Asset Identifier (RAI)

The electronic land title registry requires every registered land asset to be assigned a unique registered asset identifier. The RAI should seldom be, if ever, retired and should not be duplicated or reused. The RAI may be 18-digit alphanumeric or numeric geo-referenced address. A geo-referenced address is representative of the global coordinates for any given location.

As an example, the RAI may be a Universal Transverse Mercator (UTM) grid code accurate to one meter or may map into such a geo-referenced address. Such an identifier may be determined through Global Positioning Satellite (GPS) instrumentation or manually from US Geological Survey (USGS) maps. Each address is unique and permanently represents the registered land asset land parcel.

If the registered land asset contract is settled and re-originated, the same RAI should apply to the renewed contract. Because the land parcel is immobile, the geo-referenced RAI should never change. The registered land asset originator should establish the identifier as part of its origination process. A licensed independent appraiser, a licensed survey engineer or other qualified individual may produce the RAI quickly and accurately.

Sequential Equity Allocation Lien (SEAL)

A sponsor, upon the initial transfer of registered land asset beneficial interest to a holder, may append to each identifier it underwrites a "Sequential Equity Allocation Lien" (SEAL). A registered land asset SEAL is an electronic land title registry recording number that may consist of 14 alphanumeric or numeric characters. For example, 14-character SEAL identifier may register three distinct information elements: six digits for date, four digits for time and four digits for a document type number. Each SEAL may be appended with a seven-digit number to track the organization registering the SEAL and an eight-digit alphanumeric or numeric number identifying the document preparer. A document preparer may manually enter the document type code or the document type code can be automatic depending on the transaction.

The document type code can represent any document type available. For example, a document type code could represent a title transfer. When a sponsor or co-sponsor sells a registered asset, and the transaction is recorded in the electronic land title registry, the document type can be assigned automatically. Certain document types, such as, for example, a financial attachment may require manual entry. The electronic land title trustee may establish the document type codes, the corresponding alphanumeric or numeric index numbers, and recording requirements.

Vendor Identification Number (VIN)

A vendor organization, which may be a registered land asset originator and/or registered land asset servicing agent, may be assigned a unique vendor identification number (VIN). Each of the vendor's document preparers may receive an alphanumeric or numeric user identification code and a corresponding alphanumeric or numeric user password that authorizes responsible persons within each organization to transmit registered land asset data into the electronic land title registry.

A registered land asset VIN should not change and should not be reassigned. If a servicing agent contract transfers from the originator to another vendor, the VIN of the entity that currently services the registered land asset changes, but the original RAI identifier remains unchanged, as does the archive with the prior VIN assignment. A VIN should remain a permanent record attached to any SEAL. This provides a transparent audit trail and continuity if an electronic land title trustee must arbitrate a recording if challenged.

Other numbering sequences are possible. The following is an example of the data a vendor may submit to enter or to modify a registered land asset transaction:

| Field Name | Description | Data Type | Max Length | Required |
|---|---|---|---|---|
| Submit_orgid | Organizational Vendor Identification Number (VIN) Vendor preparing and submitting the documentation registration request | Alphanumeric or Numeric | 7 | Yes |
| Submit_uid | Authorized Vendor User ID (UID) | Alphanumeric or Numeric | 8 | Yes |
| Submit_upw | Authorized Vendor User's Password | Alphanumeric or numeric | 12 | Yes |
| Submit_rai | Registered Asset Identifier (RAI) | Alphanumeric or numeric | 18 | Yes |
| Submit_seal | Sequential Equity Allocation Lien (SEAL) | Alphanumeric or numeric | 14 | Yes |

FIG. 10 is a block diagram illustrating a system for providing a registered asset. In accordance with this embodiment, an electronic land title registry 1101 is in communication, via a computer network (which may be a local access network, a system access network or a wide access network such as the Internet), with a property transaction database 514 and a location characteristics database 511. An electronic land title trustee 1106 may have direct access to the electronic land title registry 1101. A registered land asset issuer 1100, servicing agent 1105, originator 1103, issuer trustee 1107, indenture trustee 1104, sponsor 1102, holder 1109, and co-sponsors and market makers 1111 may have access to the electronic land title registry 1101 and network databases (including but not limited to the property transaction database 511 and the location characteristics database 514 via the network. The general public 1108 and/or the real estate marketplace 1110 may also be given access to the registered land asset network. Communication between the various above referenced parties may also be provided via the network.

The originator 1103 is the primary point of contact for a potential leaseholder desiring to collaboratively purchase a property under a registered land asset contract, or a current landowner wanting to issue a registered land asset contract. The originator 1103 generally establishes the RAI at origination and is responsible to put the new land title and RAI on record in the local land title registry, naming the indenture trustee assigned by the sponsor as the nominee. Originators subsequently register the RAI on the electronic land title registry, if authorized by the electronic land title trustee. Registered land asset originators may transmit and register documentation to the electronic land title registry through an Internet browser interface or through a system-to-system interface. Registered land asset originators may transmit and record all land title documentation directly into the property transaction database through, for example, an Internet browser interface or through a system-to-system interface. Originators may provide the indenture trustee all original registered land asset contract documentation, along with certain other property-related information when recording registered land asset contracts. A RAI certification may contain a comprehensive list of all property related recordings, to include the recording date and time, and the land title registry "book and page" or other land registration numbers for each document assigned to it by the local land court.

A servicing agent 1105 may notify the appropriate indenture trustee 1104 and other interested parties by filing a SEAL for all subsequent RAI liens or any legal service of process. Among these are any filings relative to foreclosure, tax liens, lease defaults, or claim releases from parties who have previously recorded an interest against a registered land asset in an electronic land title registry.

Servicing agents may also record changes of and to leasehold ownership interests to the property transaction database by the RAI once a RAI is registered to the electronic land title registry. If for example, the leasehold estate is sold, servicing agency rights are transferred, a registered land asset goes into default, or other changes to the registered asset's legal or contractual status occurs, the servicing agent reflects these changes, among others, in the information maintained on the property transaction database 511, which should also reflect any legal service of process recorded to the electronic land title registry 1101.

As mentioned previously, authorized registered land asset originators/servicing agents may have access to information maintained on the electronic land title registry 1101 on a "need-to-know" basis. Trustees representing the leaseholder (such as the issuer trustee 1107) and the holder (such as indenture trustee 1104) have access to information maintained on the electronic land title registry 1101 on a "need-to-know" basis. The electronic land title trustee 1106, who maintains the SPE, should have high-level access rights to the electronic land title registry.

A registered land asset sponsor 1102 may be any individual or entity with the financial resources at its disposal to underwrite and originate a debt free registered land asset through a qualified registered land asset originator. Typically, a sponsor 1102 will take delivery of registered assets, which it holds as primary beneficiary or until it's resold for profit to other entities or individual investors. FIG. 9 is block diagram illustrating examples of registered land asset sponsor qualifications and considerations.

A sponsor 1102 should have at its disposal the facilities to service its investors (FIG. 8 is a block diagram illustrating examples of registered land asset investor qualifications and considerations.) A sponsor 1102 may be directly responsible for the distribution of its registered land asset contracts throughout its syndicate. A sponsor 1102 may, via its indenture trustee, clear all registered land asset purchases with the electronic land title registry. The sponsor 1102 may handle marketing, sales execution and delivery of registered land asset contracts to high net worth investors or institutions. Each RAI recorded in the electronic land title registry may show the sponsor as the initial beneficial owner of a registered asset. If a sponsor transfers a registered land asset to a holder 1109, the holder may receive an account statement from the sponsor on, for example, a quarterly and annual basis.

Sponsor functions may include: making structural recommendations to registered land asset originators; coordinating rating agency negotiations concerning registered land asset products; overseeing the registered land asset documentation process; managing the registered land asset distribution process; coordinating any co-sponsors and market makers 1111; maintaining an active and supportive secondary market for future registered land asset offerings; establishing working relationship with real estate brokerage outlets; coordinating like-kind exchanges for registered assets by providing Qualified Exchange Accommodation Arrangements (QEAA), (IRC, Section 1031); and maintaining an active and supportive secondary market for future offerings of registered assets.

The electronic land title trustee 1106 is responsible for maintaining the technological environment necessary to record and track all transactions generated by a plurality of sponsors and co-sponsors. Each registered land asset transaction will generate a plurality of documents that the electronic land title registry trustee 1106 should capture, process, store, maintain and output transaction data as accessible and retrievable archives. The electronic land title registry trustee (1106 should be responsible for maintaining the official list of all SEAL identifiers, by establishing and maintaining document type code identifiers as set from time to time under the SPE charter. The electronic land title registry trustee (1106 should be responsible for vendor certification. Distribution of VIN identifiers may be awarded based on competence and other criteria set from time to time under the SPE charter.

The electronic land title registry trustee 1106 should be responsible for user identification codes and user certification and password management. Distribution of user identification codes may be based on competence and other criteria set from time to time under the SPE charter. The electronic land title registry trustee 1106 should also ensure that each registered land asset contract is assigned a RAI, that each RAI is unique and that each RAI links a particular land title to its primary land court registry (county recorders office) book and page or land court registration entry.

The electronic land title registry trustee 1106 should ensure that each related transaction, for example any transfer of a variable or fractional land title interest, receives a SEAL identifier. A SEAL identifier allows the electronic land title trustee 1106 to quickly determine the when, who and what of pending issues on any registered land asset contract by its identifying SEAL.

Relying on easily acceptable archival records, the electronic land title trustee 1106 may act as one member of a three-member arbitration panel empowered to resolve contested title issues.

The electronic land title trustee 1106 should maintain electronic land title registry transparency. Each RAI may provide a reference into the property transaction database 511 wherein the electronic land title trustee 1106 can locate all property specific documentation such as a deed, estoppel certification, appraisal reports, registered land asset contract documents, discharges, and other appropriate documents. Each RAI has a SEAL archive, listing all transactions between investors tracking any beneficial interest transfers subsequent to the registered land asset contract conveyance and registration in the electronic land title registry.

Upon final settlement of a registered land asset and upon authorization from an indenture trustee 1104 following its consolidation of SEAL identified records relating to each outgoing registered asset, the electronic land title registry trustee 1106 should ensure that an estoppel certificate and electronic land title discharge is filed onto the electronic land title registry 1101. These recorded documents may be then forwarded to the leaseholder (or his agent) for recording at an appropriate land court registry. The documents should also be filed under the RAI in the property transaction database.

An issuer trustee 1107 may be an attorney or any qualified vendor with qualifications defined by an electronic land title trustee 1106. The issuer trustee 1107 may have minimal ongoing involvement in registered land asset title conveyance and no on-going transactional activity within the SPE. The issuer trustee 1107 is the primary point of contact for the leaseholder, through whom the leaseholder (or its agent) 1100 may interface with appropriate entities concerning any aspect of registered land asset contract terms.

The originator 1103 may appoint an issuer trustee 1107 following a registered land asset origination. If a leaseholder gives a mortgage, the issuer trustee 1107 represents the mortgage lender acting as originator. If no mortgage is given the issuer trustee represents the leaseholder. A leaseholder wishing to address any matter concerning a registered land asset it issued, may direct the matter to the issuer trustee directly when no mortgage exists or while a mortgage is in force, via counsel representing the leaseholder.

In an event of a leasehold mortgage default, the issuer trustee may act as one member of a three-member arbitration panel empowered to resolve contested issues, and is responsible to the mortgagee and to ensure default resolution in the most effective and legal manner.

The indenture trustee 1104 holds the land titles as nominee and represents the sponsor 1102, registered land asset co-sponsors and market makers 1111 and its investors (such as holders 1109). The indenture trustee 1104 has involvement with on-going registered land asset transactions. The indenture trustee 1104 should make principal and rental income distributions to holders and retains signature authority to the registered land asset land titles and all documentation concerning the land title deed. The indenture trustee 1104 should maintain archival records of property deeds, estoppel certifications, appraisal reports, registered land asset contract documents and other appropriate documents. When a land title conveys to a leaseholder, perhaps exercising its embedded call or other purchase rights, the indenture trustee 1104 (either the indenture trustee of record or an alternative and qualified indenture trustee appointed by the electronic land title trustee 1106) may prepare estoppel certification and a land deed suitable for recording the redemption at the appropriate local land court registry. The estoppel certificates may serve to clear the title of any and all registered land asset contract encumbrances and transactions occurring over the contract's duration, including all transactions occurring during the time when the registered land asset contract was held by the indenture trustee as nominee.

In the event of a registered land asset contract default, the indenture trustee 1104 may be in charge of making sure the sponsor 1102, co-sponsors and market makers 1111, the holder 1109 and subordinated investors if any, get resolution in the most effective manner by acting as one member of a three-member arbitration panel empowered to resolve contested title issues.

Final Settlement of the Registered Land Asset Contract

Final registered land asset settlement occurs under several circumstances: 1) the leaseholder exercises and settles its embedded call opting to purchase the land title underlying its leasehold estate; 2) the leaseholder purchases the land title underlying its leasehold estate as a market transaction after the embedded call expiration date; 3) the holder takes possession of the leasehold estate either by acquiring leasehold rights or as a result of leasehold default; 4) the contract ground lease expires, terminating the tenancy; or 5) legal actions commence resulting in eminent domain, escheat, police powers or zoning restrictions (inverse taking or other public taking).

The described embodiments of the inventions are intended to be merely exemplary and numerous variations and modifications will be apparent to those skilled in the art. All such variations and modifications are intended to be within the scope of the present invention.

Various embodiments of the invention may be implemented in any conventional computer programming language. For example, the various embodiments may be implemented in a procedural programming language (for example, "C") or an object-oriented programming language (for example, "C++"). Similarly, embodiments of the invention may also be implemented as preprogrammed hardware elements (for example, application specific integrated circuits or digital processors), or other related components.

Embodiments of the invention may be also implemented as a computer program product for use with a computer system. Such implementation may include a series of computer instructions fixed either on a tangible medium, such as a computer readable media (for example, a diskette, CD-ROM, ROM, or fixed disk), or transmittable to a computer system via a modem or other interface device, such as a communications adapter connected to a network over a medium. The medium may be either a tangible medium (for example, optical or analog communications lines) or a medium implemented with wireless techniques (for example, microwave, infrared or other transmission techniques). The series of computer instructions preferably embodies all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (for example, shrink wrapped software), preloaded with a computer system (for example, on system ROM or fixed disk), or distributed from a server or electronic bulletin board over the network (for example, the Internet or World Wide Web).

Appendix A

Summary of Abbreviations

An "effective" rate is a quotient found by dividing an annual rate by the number of installments per year.

| | |
|---|---|
| Annual (investor) Cost of Funds: | I |
| Annual Mortgage Rate: | $R_M$ |
| Effective Contract Land-Value Appreciation Rate: | $R_A$ |
| Effective Embedded Call Term (N × NC): | n |
| Embedded Call: | $L_C$ |
| Embedded Call Settlement Price: | $L_S$ |
| Embedded Call Term in Years: | N |
| Fee simple Land Value: | $V_L$ |
| Installments per Year: | $N_C$ |

-continued

| | |
|---|---|
| Land Capitalization Rate | $R_L$ |
| Land Par Value: | $L_V$ |
| Land Sale Proceeds: | $L_P$ |
| Market Ground Rent (NOI): | $I_L$ |
| Minimum Rent: | $I_M$ |
| Mortgage Amortization Term: | $N_M$ |
| Mortgage Debt Constant: | f |
| Mortgage Equivalency: | $M_E$ |
| Overall Property Value or Contract Selling Price: | V |
| Terminal Rent: | $I_T$ |

Appendix B

Summary of Factors

Base Factor:

A base factor is one dollar plus the effective interest rate. The method employs the base factor when a payment or installment is due in advance. A rent payment, for example is due at the beginning of the month while a mortgage payment is due in the arrears at the end of the month. The product of any dollar amount times its base at the cost of funds rate, then times the appropriate annuity factor at the same cost of funds rate results in the value of that installment when paid in advance. (For an example of base, see Cell E36.)

Base factor=$(1+i)$

Factor 1: Future Worth of One Dollar with Interest:

The future worth of one dollar with interest is the amount to which an investment or deposit of one dollar will grow in a given number of time periods, including the accumulation of interest at the effective rate per period.

Future worth of one dollar with interest=$(1+i)^n$

This factor may be employed to solve for any compound simple interest calculation.

Factor 2: Future Worth of One-Dollar Per Period With Interest:

The future worth of one-dollar per period with interest is a level periodic investment of principal and interest into a series of deposits or installments of one dollar per period for a given number of periods with interest at an effective rate per period.

Future Worth of $1/period with Interest=$((1+i)^n-1)/i$

The interim pricing mechanism uses this factor to sum a series of deposits with interest at the effective cost of funds rate pricing the embedded call is an example where the product of the minimum rent 2 ($I_{M2}$) times its base, times factor 2 determines the value of the embedded call ($L_C$). (Also see Cell E35 for an example).

Factor 3: Sinking Fund:

A Sinking fund factor is the level periodic investment or deposit required to accumulate one dollar in a given number of periods including the accumulation of interest at the effective rate.

Sinking Fund=$i/((1+i)^n-1)$

The sinking fund factor is used to determine the periodic installment of principal that must be made at an achievable savings rate to accumulate the proceeds necessary to pay the embedded call settlement price ($L_S$) at the end of the embedded call term (N).

Factor 4: Reversion:

The reversion factor is the present value of one dollar to be collected at a given future time when discounted at the effective interest rate for the number of periods from origination to the date of collection.

Reversion factor=$1/(1+i)^n$

The reversion factor is used to value what to pay as a single installment today in exchange for some future single installment or repayment that includes accumulated interest. That is, it answers the question: What is the maximum land sale proceed ($L_P$) distribution the method will pay today for the appraised fee simple land value ($V_L$), to be repaid with interest ($CoF_{IN}/N_C$) over ($N \times N_C$) months.

Factor 5: Ordinary Annuity Coefficient:

The ordinary annuity coefficient is the present value of a series of future installments or payments of one dollar per period for a given number of periods when discounted at the effective interest rate.

Ordinary Annuity Coefficient=$(1-(1/(1+i)n))/i$

The ordinary annuity coefficient is used to determine what should be paid today for some future economic benefit that includes interest, e.g., what land sale proceed ($L_P$) distribution to pay today in anticipation of the land par value ($L_V$) in the future.

Factor 6: Ordinary Annuity that has a Present Value of One Dollar:

An ordinary annuity that has a present value of one dollar as a level periodic installment, which will pay interest and provide full amortization or recapture of an investment of one dollar in a given number of periods with interest at a given rate per period.

Ordinary annuity that has a present value of one dollar=$i/(1-(1/(1+i)^n))$

Factor 6 is used to determine mortgage installments and refers to factor 6 as the mortgage debt constant (f).

Appendix C

Sample Embodiment

The illustration below is an instance of the interim pricing mechanism. The illustration below is a data entry screen that also shows the computational results below. Following this illustration is a table detailing the features and functions of each operation for the interim pricing mechanism.

The tables that follow the illustration define operations by location. The "Description" column begins with a data source followed by a functional description. If a cell in the illustration does not appear in the table below, the cell in question does not materially impact the land pricing mechanism.

| Community Assumptions: | | | |
|---|---|---|---|
| Typical Ownership Term: | Underwriting Date: | | Dec-03 |
| Community Resale Cycle/Embedded Call Tenure: | | | 5 Years |
| Escrow Fund Rate (Land Repurchase Pool): | | | 2% |

| Single Family | |
|---|---|
| Going-In Accepted Offer: | $177,000 |
| Appraised Land-to-Improvement Value Ratio: | 33.90% |
| Appraised Single Family Land Value: | $60,000 |
| Typical Single Family Total Living Area: $/Sf: $75.80 | 1,658 Sq Ft |
| Market Single Family Ground Rent is $132.93 per Month: | $1,595/Yr. |
| 0.000 Basis Pts. Under the 5 Year Cost of Funds Rate for Dec, 2003 | |
| cScore Adjustment (14.46% reduction): | 85.502% |
| Cost of Funds Spread in Basis Points: | 0.0 |
| Contract Land Value Appreciation: | 1.00% |
| Mortgage Insurance (PMI) Threshold Down Payment: | 20.00% |
| PMI Rate Factor: | 0.79000% |
| Community Mortgage Loan-to-Value Ratio: | 78.50% |
| Community Property Tax Rate per $1,000 Valuation: | $12.52 |
| Community Property Insurance per $1,000 Valuation: | $4.12 |

| Single Family | In | Out | Mort. Terms |
|---|---|---|---|
| Rents: | $ 1,595.12 | $1,678.90 | |
| Cost of Funds Rate: | 3.270% | 3.270% | 5.925% |
| Compound: | 12 | | 3.85% Pts. |
| Term: | 5 | | 30 |
| Base: | 1.002725 | 1.00083 | 0.005974 |
| Factors: | 65.08753 | 1.05125 | 0.8493553 |
| Minimum Ground Rent 1: | 133.2885787 | $1,596.46 | $22,411 |
| Minimum Ground Rent 2: | 133.2885787 | $1,596.46 | 2 |
| Rate Delta: | 0.00000 | 3.270% | TRUE |
| Mortgage Equivalent: | $22,411 | | FALSE |
| Embedded Call | $ 8,675 | | TRUE |
| Par Value | $51,325 | | 200 |
| Land Sale Proceeds: | $43,593 | Yield | |
| Embedded Call Settlement Price: | $63,075 | 6.902% | |

| Cell | Symbol/Formula | Description |
|---|---|---|
| E28 | $I_L$ | User Defined = market ground rent ($I_L$): The opening market ground rent ($I_L$) may be any value greater than zero dollars, but typically the originator enters the market ground rent as a net operating income |

-continued

| | | |
|---|---|---|
| | | (NOI) as the opening value; the research product of the real estate appraiser as reported in the appraisal report. Thus, $I_L$ = NOI.<br>If the mechanism's final "minimum ground rent 2" ($I_{M2}$) determination results in a dollar value greater than the market ground rent ($I_L$) determined by the property appraisal analysis, the method will notify the originator with an underwriting warning. The market ground rent NOI ($I_L$) typically sets the upper limit of marketplace income potential to the land. |
| E29 | I | User Defined = cost of funds in ($CoF_{IN}$):<br>The Cost of Funds on investor capital ($CoF_{IN}$) is set at origination, is the rate selection should be of equal duration to the embedded call term (a.k.a.: embedded call term) in Years (N). |
| E30 | $N_C$ | User Defined = compound periods:<br>Installments per year, typically monthly, used to determine the effective payments per year as (N × $N_C$), which is normally represented by the exponential symbol$^N$. |
| E31 | N | User Defined = embedded call term in Years (N):<br>The embedded call term is the effective life of the leaseholder's land purchase option. The long-term lease contract term is separate and distinct from these. |
| E32 | $(1 + i)$ | 1 + (E29/E30) = $CoF_{IN}$ base:<br>The $CoF_{IN}$ base is always one dollar plus the interest on one dollar at the "effective rate" for a single conversion period. Used to determine the value of an installment paid in advance, for example, rent paid at the beginning of the month. |
| E33 | $((1 + i)^n - 1)/i$ | $(((1 + (E29/E30))^{(E30 \times E31)}) - 1)/(E29/E30)$ = factor 2:<br>The future worth of $1 per period with interest (factor 2) represents the total accumulation of principal and interest for a series of ground rent installments per period for a given number of periods with interest at the $CoF_{IN}$ effective rate per period. |
| E35 | $(V_L - (V_L \times cScore))/((1 + i) \times ((1 + i)^n - 1)/i))$ = | $(G14 - (G14 \times G18))/(E32 \times E33)$ = "minimum ground rent 1" ($I_{M1}$):<br>"Minimum ground rent 1" is a function of the appraised Fee Simple Land Value ($V_L$), less the product of the land value ($V_L$) times the cScore. This product becomes the numerator of a quotient, where the denominator is the base (Cell E32) times factor 2 (Cell E33), representing the future worth of one dollar per period with interest, paid in advance, at the $CoF_{IN}$ (Cell E29) discount rate.<br>"Minimum ground rent 1" ($I_{M1}$) flows to Cell F36, where the "minimum ground rent 1" trial minimum rent value is annualized and displayed.<br>"Minimum ground rent 1" ($I_{M1}$) also flows to Cell E36 where the greater of "minimum ground rent 1" (Cell E35) or the monthly market rent ($I_L$) (Cell G16) are compared, and the greater of the two becomes "Minimum Market Rent 2" ($I_{M2}$).<br>Constraint #3 (Cell G38) checks to determine if "minimum ground rent 1" ($I_{M1}$) is greater than or equal to "minimum ground rent 2" ($I_{M2}$) minus −0.000001.<br>"Minimum ground rent 2" ($I_{M2}$) flows to Cell E38 and to Cell E39 for further processing and evaluation by Constraint #1 (Cell G36) and by Cell G34, where the product of Cell E38 is measured and tabulated as a trial minimum mortgage equivalency value. The method tests the "minimum ground rent 2" ($I_{M2}$) value to determine whether to accept or reject the results, returning rejections to Cell G16 or Cell G18 after tabulating trial results. |
| E36 | If $(I_{M1} >= ((I_L/N_C) \times (1 + i)), I_{M1}$, else: $((I_L/N_C) \times (1 + i))$ = | IF (E35 >= G16/(E30 × E32), E35, else G16/(E30 × E32)) = "minimum ground rent 2" ($I_{M2}$):<br>Calculates and compares the results of two minimum rents. The monthly "minimum ground rent 1" (Cell E35), which is a function of the appraised fee simple land value ($V_L$), less the product of the land value ($V_L$) times the cScore, to determine if it is greater than or equal to the monthly "minimum ground rent 2" (Cell E36), which is the product of the initial market ground rent ($I_L$) (Cell G16) times the base of the $CoF_{IN}$ rate (Cell E32).<br>The larger of "minimum ground rent 1" (Cell E35) or "minimum ground rent 2" (Cell E36) is further qualified by Constraint 3 (Cell G38) to determine if "minimum ground rent 1" (Cell E35) is greater than or equal to "minimum ground rent 2" (Cell E36) plus a minus −0.000001. The results flow to Cell F36 where the resulting monthly rental figure is annualized and displayed.<br>Cell F36 also flows to Cell E38 where it becomes the trial candidate for a mortgage equivalency test by Constraint #1 (Cell G36), while simultaneously flowing to Cell E40 for a land par value calculation, where a trial par value is determined, and to Cell G34 for the Minimum mortgage equivalency test and tabulation if acceptable or rejecting the value for recalculation. |
| E37 | $((((I_L/N_C) \times (1 + R_A)) \times (1 + R_A)^n) \times N_C)/(V_L - (IF (I_{M1} >= (I_L/N_C) \times (1 + i)), I_{M1}, else: ((I_L/N_C) \times (1 + i)) \times ((1 + i)^n - 1)/i))) - I$ = | F29 − E29 = ($CoF_{out} - CoF_{IN}$):<br>Calculates the basis point spread between two cost of funds (CoF) capital return rates. The formula subtracts $CoF_{OUT}$ rate, a function of the quotient $I_T$ divided by the land par value ($CoF_{OUT}$) (that represents the return on investment the end of the purchase option term), and I, where I equals $CoF_{IN}$ selected at origination. The result then displays the decimal difference between the yield on the trial Terminal Rent ($I_{M2}/L_V$) and I.<br>Constraint #2 subsequently measures if the basis point spread between the $CoF_{OUT}$ rate minus the $CoF_{IN}$ rate is equal to a minus −0.000001. This helps ensure that the contract terminal rent provides an equal return on the mature par value at end of year N, as the $CoF_{IN}$ rate determined at origination. The terminal rent is due and payable in advance beginning in year N + 1, which is the first year of the long-term lease contract following the expiration of the embedded call. (Note: I = $CoF_{IN}$ = Cell E28 and $I_T/L_V$ = $CoF_{OUT}$ = Cell F28/E40.) |

| | | |
|---|---|---|
| E38 | (If $(I_{M1} >= ((I_L/N_C) \times (1 + i)), I_{M1}$, else: $((I_L/N_C) \times (1 + i)))/(R_M/N_C)/$ $(1 - (1/(1 + (R_M/N_C)) (N_C \times N_M))) =$ | E36/G32 or $(I_{M2}/f)$ = mortgage equivalency $(M_E)$: A quotient where the numerator is minimum ground rent 2 $(I_{M2})$ from Cell E36, and the denominator is the mortgage debt constant from Cell G33 (f), calculated using the prevailing mortgage terms at the date of origination. The result is the mortgage equivalency of the minimum ground rent 2 $(I_{M2})$ trial value. Cell E38 does the calculation for Constraint #1 Cell G36. The "Objective Function" Cell G34 tests the results of Cell E38 in tandem with Constraint #1. The "objective function" $(MIN(M_E)$ determines if the trial minimum ground rent 2 $(I_{M2})$ results in the minimum mortgage equivalency $(M_E)$. The method tabulates each mortgage equivalency trial and stores each with the trial rental value and trial cScore value results. |
| E39 | If $(I_{M1} >= ((I_L/N_C) \times (1 + i)), I_{M1}$, else: $((I_L/N_C) \times (1 + i)) \times ((1 + i)^n - 1)/i) =$ | E36 × E33 or $(I_{M2} \times ((1 + i)^n - 1)/i)$ = embedded call $(L_C)$: The embedded call is the product of minimum ground rent 2 $(I_{M2})$ times factor 2. The embedded call $(L_C)$ value deducted from the fee simple land value $(V_L)$ results in the land par value $(L_V)$. The embedded call is the right a leasehold estate owns, guaranteeing it the right to purchase the land underlying its leasehold estate at the embedded call settlement price $(L_S)$, on the final anniversary of the embedded call term $(N)$. |
| E40 | $V_L$ − (If $(I_{M1} >= ((I_L/N_C) \times (1 + i)), I_{M1}$, else: $((I_L/N_C) \times (1 + i)) \times ((1 + i)^n - 1)/i)) =$ | G14 − E39 $(V_L - L_C)$ = land par value $(L_V)$: The land par value $(L_V)$ results from deducting the embedded call value $(L_C)$ from the fee simple land value $(V_L)$. The land par value is the future value total of all compensation adjusted for time that the Leasehold Estate will receive for the land title transferred at origination. The land par value $(L_V)$ flows to Cell F29 where it is a determinate of each $CoF_{OUT}$ rate trial. Each trial $CoF_{OUT}$ rate less the $CoF_{IN}$ rate, where the $CoF_{IN}$ rate equals I. The results are displayed in Cell F29. |
| E41 | $(V_L$ − (If $(I_{M1} >= ((I_L/N_C) \times (1 + i)), I_{M1}$, else: $((I_L/N_C) \times (1 + i))) \times ((1 + i)^n - 1)/i)) \times$ $(1/(1 + i)^n) =$ | E40 × factor 4 $(L_V \times$ factor 4) = land sale proceeds $(L_P)$: The total cash proceeds available to the land seller at origination. This value must be greater than the mortgage equivalency value $(M_E)$ calculated in Cell E38 as validated by Constraint #1 (Cell G36). The land sale proceeds $(L_P)$ are the product of the land par value $(L_V)$ multiplied by factor 4, the reversion factor of one dollar, discounted at the $CoF_{IN}$ rate over the embedded call term. The reversion factor (factor 4) calculates the present value of the par value, the amount the land sale proceeds will be worth at the end of the embedded call term $(N)$, when discounted at the effective interest rate $(I/N_C)$ for each of the compounding periods from origination to the end of the embedded call term $(N \times N_C)$. |
| E42 | $V_L \times (1 + R_A)^n =$ | G14 * F33 = embedded call settlement price $(L_S)$: The product of the market land value $(V_L)$ times factor 1 discounted at the land value appreciation rate $(A)$ over the embedded call term $(N)$. |
| F28 | $(((I_L/N_C) \times (1 + R_A)) \times (1 + R_A)^n) \times N_C =$ | $((E28/E30) \times F32 \times F33) \times E30$ or $(I_T \times N_C)$ = the annualized terminal rent: The calculation is a function of $I_L$ (Cell E28) times the land value appreciation base factor (Cell F32) and factor 1, discounted at the land value appreciation rate $(A)$ time the compound period $(N_C)$. |
| F29 | $((((I_L/N_C) \times (1 + R_A)) \times (1 + R_A)^n) \times N_C)/(V_L$ − (If $(I_{M1} >= ((I_L/N_C) \times (1 + i))$, $I_{M1}$, else: $((I_L/N_C) \times (1 + i)) \times ((1 + i)^n - 1)/i)))$ | F28/E40 or $((I_T \times N_C)/L_V)$ = calculates the $CoF_{OUT}$ rate: The $CoF_{OUT}$ rate is the quotient of the terminal rent $(I_T)$ over the land par value $(L_V)$. Its results flow to Cell E37 where the difference of the $CoF_{OUT}$ rate less the $CoF_{IN}$ rate is calculated and displayed. |
| F32 | $(1 + R_A) =$ | 1 + (G20/E30) or $(1 + (A/N_C))$ = the land value appreciation base: The base of the sponsor-defined annual land value appreciation rate $(A)$ (Cell G20) is always one dollar plus the interest on one dollar at the "effective rate" for a single conversion period; used to determine the value of an installment paid in advance. The method employs Cell F32, which is dependant on Cell G20, to calculate the terminal rent $(I_T)$ in Cell F28, which will be received at the beginning of each month if the lessee does not exercise its embedded call option. Cell F28 flows to Cell F29 to calculate the $CoF_{out}$, then on to Cell E37 where the investor cost of funds are compared and tested against operational Constraint #2 in Cell G37. |
| F33 | $(1 + R_A)^n =$ | $(1 + (G20/E30))^{(E30 \times E31)}$ = Factor 1: The future worth of $1 with interest, discounted at the investor defined annual land value appreciation rate $(A)$ (Cell G20). Factor 1 is the amount to which an investment of 1 dollar will grow in a given number of time periods, including the accumulation of interest at an effective rate per period. The method employs Cell F33 to calculate the terminal rent $(I_T)$ in Cell F28. Cell F28 flows to Cell F29 to calculate the $CoF_{out}$, then on to Cell E37 where the investor Cost of Funds are compared and tested against operational Constraint #2 in Cell G37. |
| F35 | $(V_L - (V_L \times cScore))/((1 + i) \times ((1 + i)^n - 1)/i)) \times N_C =$ | E35 × E30 or $(I_{M1} \times N_C)$ = annualized minimum ground rent 1: Displays the annualized "minimum ground rent 1" for reference. |
| F36 | If $(I_M >= (I_L/N_C), I_M$, else: $(I_L/N_C) \times (1 + i) \times N_C =$ | E36 × E30 or $(I_{M2} \times N_C)$ = annualized minimum ground rent 2: Displays the annualized "minimum ground rent 2" for reference. |
| G7 | Underwriting Date | User Defined = Underwriting Date: Entering an underwriting date triggers an automatic table look-up of the key cost of funds "In" rate $(CoF_{IN})$ as set by investor or sponsor terms. The example given uses the treasury yield rate for the term duration set in Cell G8. The key cost of funds rate can be any tabulated market rate index. |

-continued

| | | |
|---|---|---|
| G8 | N | User Defined = The embedded call tenure (N), a.k.a. embedded call term: <br> The embedded call tenure (N) is the land tenancy period prior to the expiration of the embedded call contract. <br> The period of time prior to the lessee opting to exercise its right to purchase the land underlying its leasehold estate differs from the period of time set forth by the long-term lease contract provisions set at origination. The lessee agrees to pay the terminal rent ($I_T$) set in Cell F28 if the embedded call right is not exercised, deciding instead to remain as a tenant under the long-term lease contract set at origination. |
| G12 | V | User Defined = Overall Property Value (V): <br> The total value is the lesser of the appraised market value or the contract selling price. The method employs the land value to. |
| G14 | $V_L$ | User Defined = A Fee simple Land Value ($V_L$): <br> The market land value is the absolute upper limit of the land par value, which the method will recognize. The source of the market land value is a land value appraisal as of the origination date. |
| G16 | $I_L$ | User Defined = market ground rent (NOI) ($I_L$): <br> The market ground rent (NOI) source is a land value appraisal as of the origination date. The user may enter any initial value greater than zero. The method will calculate and automatically adjust the market ground rent (NOI) the method determines it needs to support the land par value conclusion. <br> If the final market ground rent is greater than the user defined initial market ground rent value, the method will notify the user of an underwriting concern should the method determine the necessary rental is greater than what the appraisal report indicated was obtainable in the marketplace. |
| G18 | cScore | User Defined = cScore: <br> The user initially enters a cScore that may be any positive value expressed as a percentage of 1. The method ultimately assigns the final cScore value by automatically changing the cScore value as it seeks an optimum "minimum ground rent 1" ($I_{M1}$) value. |
| G20 | A | User Defined = land value appreciation rate (A): <br> Established at origination, typically as a factor of capital investor terms. The rate contributes to establishing the terminal rent ($I_T$) and the embedded call settlement price ($L_S$). The value may be positive for land value appreciation or negative for land value depreciation. <br> The method employs land value appreciation rate (A) (Cell G20) to calculate the land appreciation base factor in Cell F32 and land appreciation factor #1 in Cell F33. These two factors combine to calculate the Terminal Rent ($I_T$) in Cell F28. Cell F28 flows to Cell F29 to calculate the $CoF_{OUT}$, then on to Cell E37 where the investor cost of funds are compared and tested against operational Constraint #2 in Cell G37. In addition, the land value appreciation rate (A) is used to determine the embedded call settlement price ($L_S$) (Cell E42). <br> The effective rate of A = $(A/N_C) = R_A$. |
| G29 | $M_R$ | User Defined = annual mortgage interest rate ($R_M$): <br> The prevailing or quoted annual mortgage rate determined as of the origination date. |
| G31 | $N_M$ | User Defined = mortgage amortization term ($N_M$): <br> The prevailing or quoted annual mortgage amortization term. |
| G32 | $(R_M/N_C)/(1 - (1/(1 + (R_M/N_C))^{\wedge}(N_C \times N_M)))$ = | $(G29/E30)/(1 - (1/(1 + (G29/E30))^{\wedge}(E30 \times G31)))$ = mortgage debt constant (f). <br> The mortgage constant (factor 6) is a level periodic installment, which will pay interest and provide full amortization or recapture of an investment of one dollar in a given number of periods with interest at a given rate per period. <br> Divide the "minimum market rent 2" ($I_{M2}$) by the mortgage debt constant (f) and the result is the total cash proceeds obtainable if the periodic installment $I_{M2}$ were applied toward a mortgage under market terms; the interest rate and amortization term may be the prevailing rates at the time of origination. |
| G33 | $(1/(1 + i)^n$ = | $(1/(1 + (E29/E30)))^{\wedge}(E31 \times E30)$ = factor 4: <br> The reversion factor is the present value of $1 with Interest, where Cell E29 is the investor defined annual cost of funds at origination ($CoF_{IN}$), to be collected at a given future time when discounted at the effective interest rate for the number of periods from origination to the date of collection. <br> The method multiplies factor 4 (Cell G33) times par value ($L_V$) (Cell F40) returning its present value discounted at the cost of fund rate ($CoF_{IN}$), which results in the land sale proceeds ($L_P$) to be paid to the leasehold as a single installment at origination in exchange for the land title. |
| G35 | $MIN(M_E)$ = | MIN(E38) = Objective Function: <br> The goal of the method is to minimize the value of mortgage equivalency calculation (Cell E38) by repeatedly and progressively reducing minimum rent 2 ($I_{M2}$) within the limits of the computational constraints until the lowest possible mortgage equivalency if found as a quotient of Cells E36/G33. |
| G36 | $COUNT(I_L, cScore)$ = | COUNT(G16, G18) = Decision Variables: <br> The method automatically adjusts decision variables. The market ground rent ($I_L$) (Cell G16) and the cScore (Cell G18) are the decision variables, which change when the results of one or several computational constraint calculations do not meet prescribed results. <br> Elapsed time and the total number of trial iterations set limits to process automation, and if a solution is not found within these limits, the tabulated solution closest to satisfying the computational constraints is displayed. |

-continued

| | | |
|---|---|---|
| G37 | (If $(I_{M1} >= ((I_L/N_C) \times (1 + i)), I_{M1}$, else: = $((I_L/N_C) \times (1 + i)))/(R_M/N_C)/$ $(1 - (1/(1 + (R_M/N_C)) \; (N_C \times N_M))) <=$ $(V_L - (\text{If } (I_{M1} >= ((I_L/N_C) \times (1 + i)), I_{M1}, \text{else:}((I_L/N_C) \times (1 + i))) \times ((1 + i)^n - 1)/i)) \times (1/(1 + i)^n)$ | E38 <= E41 or $M_E <= L_P$ = Constraint #1: Constraint #1 tests the mortgage equivalency ($M_E$) (Cell E38) ensuring that $M_E$ is less than or equal to the land sale proceeds ($L_P$) (Cell E36). The land sale proceeds are funds made available to acquire the subject land at the initial property title transfer. If the quotient of "minimum ground rent 2" ($I_{M2}$) divided by the mortgage debt constant (f) results in a $M_E$ value that is greater than the land sale proceeds ($L_P$), the method will notify the originator that the lessee should apply the installment of $I_{M2}$ toward a mortgage loan. |
| G38 | $(I_T/L_V) - I = -0.000001 =$ | E37 = −0.000001 → Constraint #2: Constraint #2 tests (cell E37), the sum of the $CoF_{IN}$ (I) rate and the quotient of terminal rent ($I_T$) divided by the land par value ($L_V$) equals a minus 0.000001. The terminal rent yield or the $CoF_{OUT}$ rate equals the $CoF_{IN}$ rate. |
| G39 | $I_{M1} >= (I_{M2} - 0.000001) =$ | E35 >= E36 −0.000001 = Constraint #3: Constraint #3 ensures "minimum ground rent 1" ($I_{M1}$) (Cell E35) is greater than or equal to the sum of "minimum ground rent 2" ($I_{M2}$) (Cell E36) minus 0.000001. Ensures there is balance in determining the minimum rent. Two approaches converge results; "minimum ground rent 1" is a function of the appraised land value and "minimum ground rent 2" is a function of market ground rent. The convergence of the two methods becomes the basis of the terminal rent and its dependent calculations. |

The invention claimed is:

1. A method for establishing an electronic land title registry, the method comprising:

providing a Registered Asset Identifier (RAI) including a geo-referenced address based on a global coordinate position that specifies locations on the surface of the Earth corresponding to land subject to a land title deed;

recording a land title deed and the RAI in association with one another in a local land court so as to legally associate the land title deed with the RAI;

transmitting the RAI to an electronic land title registry database in communication with a land title registry process adapted to store electronic documents associated with the RAI and allow retrieval of the documents based upon entry by an accessing party of predetermined information associated with the RAI;

transmitting from a recording party an electronic version of the land title deed and a registered land asset contract associated with the land to be recorded in association with the RAI in the electronic land title registry database as a registered land asset;

receiving and appending from an appending party other information relating to the registered land asset and corresponding RAI;

accessing, at a subsequent time, by the accessing party, over the party-accessible computer network, the electronic land title registry database, and using a mechanism associated therewith performing at least one of retrieving, verifying, analyzing, and gathering appended information associated with the registered asset in association with the RAI; and facilitating, at a subsequent time, by at least one of the recording party, the appending party or the accessing party, over the party-accessible computer network, a clearing and settlement process of the registered land asset, the recorded land asset contract and the appended information associated with the registered land asset and corresponding RAI;

wherein the registered land asset defines both a leasehold estate subject to a lease and a purchase option and the land subject to the land title deed upon which the leasehold estate resides, and wherein the registered land asset contract provides a leaseholder an option to purchase the land by an end of a given term and the registered land asset is available for purchase by a purchasing party and sale by a selling party by accessing the corresponding RAI through a database that is available via a network so as to facilitate one of either a purchase transaction or sale transaction; and wherein the other information includes appraisal information related to an appraised value the land subject to the land title deed including at least (a) a market ground rent of the land subject to the land title deed, (b) a land capitalization rate and (c) a fee simple land value of the land subject to the land title deed and the leasehold estate, and further comprising operating an interim pricing process in communication with the land title registry database to determine a community score (cScore) that modifies the calculated market land value for each registered land asset based upon externalities associated with a property underlying the registered land asset including associated community data, the cScore being associated with each registered land asset within a community subject to the community data.

2. A method according to claim 1, wherein the geo-referenced address comprises a universal transverse mercator (UTM) grid code.

3. A method according to claim 1, wherein the RAI is appended with a sequential equity allocation lien (the "SEAL") identifier.

4. A method according to claim 3, wherein the SEAL identifier includes one of:

a date associated with the SEAL identifier, a time associated with the SEAL identifier, a document associated with the SEAL identifier, document type associated with the SEAL identifier and a document preparer associated with the SEAL identifier.

5. A method according to claim 1, wherein the RAI is appended with a vendor identification number (the "VIN").

6. A method according to claim 1, further comprising assigning the registered land asset associated with the registered land asset contract and recording the assignment of the registered land asset in association with the RAI in the electronic land title registry.

7. A method according to claim 1, further comprising creating a property transaction database, associated with the electronic land title registry database and accessible over the communications network by each of the recording party, the accessing party and appending party, by providing information related to transactions associated with each RAI.

8. A method according to claim 7, further comprising creating a location characteristic database associated with the electronic land title registry database by providing socioeconomic data associated with each RAI.

9. A method according to claim 8, further comprising calculating values for each registered land asset so as to generate a market land value associated with a RAI on the basis of information from the property transaction database and the location characteristic database.

10. A method according to claim 9 wherein the market land value is employed by an option pricing process to generate an option price for the leaseholder to purchase the land, and appending the option price in association with the RAI in the land title registry database.

11. The method of claim 1, wherein the interim pricing process approximates the cScore for each registered land asset in an absence of a predetermined amount of the community data or transaction data with respect to the registered land asset.

12. A method according to claim 11 further comprising offering the registered land asset contract via the land registry database for purchase thereof, and associating the investor as a party capable of accessing the registered land asset database over the communications network.

13. An electronically stored registered land asset contract associated with the RAI produced according to the method of claim 12, and thereby defining a financial instrument adapted for public trading and electronic exchange.

14. A method according to claim 1 wherein the accessing party is at least one of a holder of a leasehold estate on the registered land asset or a land asset investor.

* * * * *